(12) United States Patent
Choi et al.

(10) Patent No.: US 10,536,242 B2
(45) Date of Patent: Jan. 14, 2020

(54) METHOD AND APPARATUS FOR PERFORMING REPETITIVE TRANSMISSION OF INFORMATION IN TIME DIVISION DUPLEX BASED CELL IN WIRELESS COMMUNICATION SYSTEM

(71) Applicant: Samsung Electronics Co., Ltd., Gyeonggi-do (KR)

(72) Inventors: Seung-Hoon Choi, Gyeonggi-do (KR); Young-Bum Kim, Seoul (KR); Hyo-Jin Lee, Gyeonggi-do (KR); Jin-Young Oh, Seoul (KR); Dong-Han Kim, Gyeonggi-do (KR); Ju-Ho Lee, Gyeonggi-do (KR); Youn-Sun Kim, Gyeonggi-do (KR); Hyoung-Ju Ji, Seoul (KR); Hee-Don Gha, Gyeonggi-do (KR); Tae-Han Bae, Seoul (KR); Jeong-Ho Yeo, Gyeonggi-do (KR); Young-Woo Kwak, Gyeonggi-do (KR); Hoon-Dong Noh, Gyeonggi-do (KR); Cheol-Kyu Shin, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 35 days.

(21) Appl. No.: 15/542,609

(22) PCT Filed: Jan. 8, 2016

(86) PCT No.: PCT/KR2016/000188
§ 371 (c)(1),
(2) Date: Jul. 10, 2017

(87) PCT Pub. No.: WO2016/111582
PCT Pub. Date: Jul. 14, 2016

(65) Prior Publication Data
US 2018/0337752 A1    Nov. 22, 2018

Related U.S. Application Data

(60) Provisional application No. 62/240,270, filed on Oct. 12, 2015, provisional application No. 62/204,694, (Continued)

(51) Int. Cl.
*H04L 1/18* (2006.01)
*H04L 5/00* (2006.01)
*H04L 5/14* (2006.01)

(52) U.S. Cl.
CPC .......... *H04L 1/1812* (2013.01); *H04L 5/0044* (2013.01); *H04L 5/0055* (2013.01); *H04L 5/1469* (2013.01)

(58) Field of Classification Search
CPC ... H04L 1/1812; H04L 5/0044; H04L 5/0055; H04L 5/1469; H04L 1/1887;
(Continued)

(56) References Cited

U.S. PATENT DOCUMENTS 9,749,116 B2 *  8/2017  Kang .................... H04L 1/1854
9,876,615 B2 *  1/2018  You ....................... H04L 5/0048
(Continued)

FOREIGN PATENT DOCUMENTS

CN    1522075     8/2004
CN    101009512   8/2007
(Continued)

OTHER PUBLICATIONS

Ericsson, "Physical Channel Timing Relationships for MTC", R1-144558, 3GPP TSG-RAN WG1 Meeting #79, Nov. 17-21, 2014, 4 pages.
(Continued)

*Primary Examiner* — Michael Thier
*Assistant Examiner* — Nevena Zecevic Sandhu
(74) *Attorney, Agent, or Firm* — The Farrell Law Firm, P.C.

(57) ABSTRACT

The present disclosure relates to a 5G or pre-5G communication system to be provided for supporting a higher data
(Continued)

transfer rate beyond a 4G communication system such as LTE. According to the present disclosure, there is provided a method for supporting repetitive transmission of uplink data by a base station in a mobile communication system operating in a time division duplex (TDD) based cell including at least one subframe for uplink transmission and at least one subframe for downlink transmission comprising repeatedly transmitting uplink data scheduling information in a downlink subframe where an uplink hybrid automatic repeat request (HARQ) process is defined and repeatedly receiving uplink data in uplink subframes which start from an uplink subframe according to an HARQ transmission timing of an HARQ process defined in a downlink subframe where the repetitive transmitting of the uplink data scheduling information is complete.

20 Claims, 30 Drawing Sheets

Related U.S. Application Data filed on Aug. 13, 2015, provisional application No. 62/196,585, filed on Jul. 24, 2015, provisional application No. 62/174,886, filed on Jun. 12, 2015, provisional application No. 62/161,398, filed on May 14, 2015, provisional application No. 62/145,207, filed on Apr. 9, 2015, provisional application No. 62/139,347, filed on Mar. 27, 2015, provisional application No. 62/101,632, filed on Jan. 9, 2015.

(58) Field of Classification Search
CPC ....... H04L 1/1816; H04L 1/1819; H04L 1/08; H04L 1/189; H04B 1/50; H04W 4/005; H04W 72/0413
See application file for complete search history.

(56) References Cited

U.S. PATENT DOCUMENTS

| | | | |
|---|---|---|---|
| 9,907,060 | B2 | 2/2018 | Yang et al. |
| 2010/0195575 | A1 | 8/2010 | Papasakellariou et al. |
| 2014/0003349 | A1 | 1/2014 | Kang et al. |
| 2014/0045507 | A1 | 2/2014 | Bontu et al. |
| 2014/0112217 | A1 | 4/2014 | Ahn et al. |
| 2014/0112289 | A1 | 4/2014 | Kim et al. |
| 2015/0078224 | A1* | 3/2015 | Xiong .............. H04L 1/1887 370/280 |
| 2015/0245323 | A1 | 8/2015 | You et al. |
| 2016/0143017 | A1* | 5/2016 | Yang .............. H04L 1/1812 370/329 |
| 2016/0308647 | A1 | 10/2016 | Kwak et al. |

FOREIGN PATENT DOCUMENTS

| | | |
|---|---|---|
| CN | 101119184 | 2/2008 |
| CN | 101222309 | 7/2008 |
| CN | 103493419 | 1/2014 |
| EP | 3 047 579 | 7/2016 |
| JP | 2014060772 | 4/2014 |
| KR | 1020140010152 | 1/2014 |
| KR | 1020150070925 | 6/2015 |
| WO | WO 2012/118334 | 9/2012 |
| WO | WO 2014/077577 | 5/2014 |
| WO | WO 2015/042038 | 3/2015 |

OTHER PUBLICATIONS

Samsung, "DL/UL HARQ Timing for Low Cost MTC UEs in Enhanced Coverage", R1-151586, 3GPP TSG RAN WG1 #80b, Apr. 20-24, 2015, 3 pages.
European Search Report dated Dec. 21, 2017 issued in counterpart application No. 16735203.8-1875, 12 pages.
PCT/ISA/210 Search Report issued on PCT/KR2016/000188 (pp. 4).
PCT/ISA/237 Written Opinion issued on PCT/KR2016/000188 (pp. 8).
3rd Generation Partnership Project; Technical Specification Group Radio Access Network; Evolved Universal Terrestrial Radio Access (E-UTRA); Physical Layer Procedures (Release 12), 3GPP TS 36.213 V12.3.0, Sep. 26, 2014, 212 Pages.
European Search Report dated May 8, 2019 issued in counterpart application No. 19153742.2-1219, 6 pages.
Chinese Office Action dated Nov. 4, 2019 issued in counterpart application No. 201680005018.8, 13 pages.

* cited by examiner

METHOD AND APPARATUS FOR PERFORMING REPETITIVE TRANSMISSION OF INFORMATION IN TIME DIVISION DUPLEX BASED CELL IN WIRELESS COMMUNICATION SYSTEM

PRIORITY

This application is a National Phase Entry of PCT International Application No. PCT/KR2016/000188, which was filed on Jan. 8, 2016, and claims priority to U.S. Provisional Application Nos. 62/101,632, 62/139,347, 62/145,207, 62/161,398, 62/174,886, 62/196,585, 62/204,694, and 62/240,270, which were filed on Jan. 9, 2015, Mar. 27, 2015, Apr. 9, 2015, May 14, 2015, Jun. 12, 2015, Jul. 24, 2015, Aug. 13, 2015, and Oct. 12, 2015, respectively, the contents of each of which are incorporated herein by reference.

TECHNICAL FIELD

The present disclosure relates to cellular wireless communication systems, and more specifically, to schemes for communicating control channels by low-cost terminals. Further, the present disclosure relates to schemes for transmitting channel information on serving cells to base stations in wireless communication systems having multiple cells. Further, the present disclosure relates to scheduling schemes for data communication by lower-cost terminals.

DISCUSSION OF RELATED ART

To meet the demand for wireless data traffic having increased since deployment of 4G ($4^{th}$-Generation) communication systems, efforts have been made to develop an improved 5G ($5^{th}$-Generation) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Generally, mobile communication systems have been developed to guarantee user activity while providing voice services. Mobile communication systems have been expanding service areas from voice to data, and the systems have been grown to provide high-speed data services. However, more evolved mobile communication systems are required to live up to users' desire for higher-speed services and lacking resources that are faced by the current mobile communication systems.

Mobile communication system advances to broadband wireless communication system to provide high data rate and high-quality packet data services, such as 3rd generation partnership (3GPP) high speed packet access (HSPA), long term evolution (LTE), or evolved universal terrestrial radio access (E-UTRA), 3GPP2 high rate packet data (HRPD), ultra mobile broadband (UMB), and institute of electrical and electronics engineers (IEEE) 802.16e communication standards.

The 3GPP LTE is now underway for standardization as a next-generation communication system. LTE is the technology implementing high-speed packet-based communication with a transmission speed up to 100 Mbps. To that end, various approaches are being discussed, and some examples include simplifying the network architecture to reduce the number of nodes over a communication path and making radio protocols as close to radio channel as possible.

LTE system adopts orthogonal frequency division multiplexing (OFDM) for downlink and single carrier frequency division multiple access (SC-FDMA) for uplink. Such multiple access scheme allocates and operates time-frequency resources carrying data or control information per user not to overlap, i.e., to maintain orthogonality, to thereby differentiate each user's data or control information. The orthogonal frequency division multiple access (OFDM) transmission scheme transmits data via multiple carriers, and this is a sort of multi-carrier modulation scheme that parallelizes symbols inputted in series and modulates the same into multiple multi-carriers, i.e., multiple subcarrier channels with mutual orthogonality and transmits the same.

The LTE system adopts HARQ (Hybrid Automatic Repeat request) scheme that re-transmits corresponding data through the physical layer in case decoding fails at the initial stage of transmission. By the HARQ scheme, if the receiver fails to precisely decode data, the receiver transmits information indicating the decoding failure (NACK; Negative Acknowledgement) to the transmitter so that the transmitter may re-transmit the corresponding data through the physical layer. The receiver raises the data reception capability by combining the data re-transmitted by the transmitter with the data for which decoding has failed. Further, in case the receiver precisely decode data, the receiver may transmit information indicating decoding succeeds (ACK; Acknowledgement) to the transmitter so that the transmitter may transmit new data.

FIG. 1 is a view illustrating a basic structure of time-frequency domain which is radio resource domain where the data or control channel is transmitted on downlink in the LTE system.

In FIG. 1, the horizontal axis refers to the time domain, and the vertical axis refers to the frequency domain. In the time domain, the minimum transmission unit is an OFDM symbol, and $N_{symb}$ 102 OFDM symbols come together to configure one slot 106, and two slots come together to configure one subframe 105. The slot is 0.5 ms long, and the subframe is 1.0 ms long. One radio frame 114 is a time domain unit consisting of ten subframes. In the frequency domain, the minimum transmission unit is subcarrier, and the bandwidth of the overall system transmission band consists of a total of $N_{BW}$ (104) subcarriers.

In the OFDM scheme, a modulated signal is positioned in a 2-dimensional resource constituted of time and frequency. The resources on the time axis are differentiated by different OFDM symbols and they are orthogonal to each other. The resources on the frequency axis are differentiated by different subcarriers and they are also orthogonal to each other. That is, in the OFDM scheme, one minimum unit resource may be indicated by designating a particular OFDM symbol on the time axis and a particular subcarrier on the frequency axis, and this is called a resource element (RE) 112. Since different REs maintain the orthogonality even when undergoing frequency selective channel, signals transmitted via different REs may be received on the reception side without mutual interference.

The physical channel is a channel of a physical layer transmitting a modulated symbol obtained by modulating one or more coded bit streams. The orthogonal frequency division multiple access (OFDMA) system may configure and transmit a plurality of physical channels depending on the receiver or the purpose of information streams transmitted. The RE where one physical channel should be disposed and transmitted should be previously agreed between the transmitter and the receiver, and such rule is referred to as mapping.

In the time-frequency domain, the basic unit of resources is RE 112, and this may be represented with OFDM symbol indexes and subframe indexes. Resource block (RB) 108 or physical resource block (PRB) is defined with $N_{symb}$ (102) continuous OFDM symbols in the time domain and $N_{RB}$ (110) continuous subcarriers in the frequency domain. Accordingly, one RB 108 includes Nsymb×NRB REs (112). Generally, the minimum transmission unit of data is RB. Generally, in the LTE system, Nsymb=7, NRB=12, and, NBW and NRB are proportional to the bandwidth of system transmission band. The data rate increases in proportion to the number of RBs scheduled for terminal. The LTE system defines and operates six transmission bandwidths. For the frequency division duplex (FDD) system differentiating and operating downlink and uplink with frequencies, downlink transmission bandwidth may differ from uplink transmission bandwidth. The channel bandwidth refers to a radio frequency (RF) bandwidth corresponding to the system transmission bandwidth.

Table 1 represents the correlation between system transmission bandwidth and channel bandwidth defined in the LTE system. For example, the LTE system having a 10 MHz channel bandwidth has a transmission bandwidth consisting of 50 RBs.

TABLE 1

| | Channel bandwidth $BW_{Channel}$ [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

Downlink control information is transmitted within first N OFDM symbols in the subframe. Generally, N={1, 2, 3}. Accordingly, N is varied depending on the amount of control information to be transmitted in the current subframe. The control information may include a control channel transmission period indicator indicating how many OFDM symbols the control information is transmitted over, scheduling information on downlink data or uplink data, and HARQ ACK/NACK signal.

In the LTE system, the scheduling information on downlink data or uplink data is transferred through downlink control information (DCI) from the base station to the terminal. Uplink (UL) means radio link through which the terminal transmits data or control signal to the base station, and downlink (DL) means radio link through which the base station transmits data or control signal to the terminal. DCI defines various formats, and a defined DCI format applies and operates depending on whether scheduling information (i.e., UL grant) for uplink data or scheduling information (i.e., DL grant) for downlink data, whether control information is small-sized compact DCI, whether spatial multiplexing applies using multiple antennas, and whether DCI for power control or not. For example, DCI format 1 that is scheduling control information (DL grant) for downlink data may be configured to include at least the following control information.

Resource allocation type 0/1 flag): notifies whether resource allocation type is type 0 or type 1. Type 0 allocates resources in RBG (resource block group) units by applying bitmap scheme. In the LTE system, the basic unit of scheduling is RB (resource block) represented in time and frequency domain resources, and RBG consists of a plurality of RBs and becomes the basic unit of scheduling in the type 0 scheme. Type 1 allows for allocation of a particular RB in the RBG.

Resource block assignment: notifies RB allocated for data transmission. resource represented according to system bandwidth and resource allocation scheme is determined.

Modulation and coding scheme (MCS: notifies the size of transport block that is data to be transmitted and modulation scheme used for data transmission.

HARQ process number: notifies process number of HARQ.

New data indicator: notifies whether HARQ initial transmission or re-transmission.

Redundancy version: notifies redundancy version of HARQ.

TPC (Transmit Power Control) command for PUCCH (Physical Uplink Control CHannel): notifies transmit power control command for uplink control channel PUCCH.

The DCI undergoes channel coding and modulation and is transmitted through downlink physical control channel PDCCH (Physical downlink control channel) or EPDCCH (Enhanced PDCCH). The PDCCH region that is a control channel region and the ePDCCH region transmitted in the data channel region are split in the time domain and transmitted. This is for quickly receiving and demodulating control channel signals.

Generally, the DCI is subject to channel coding independently for each terminal and is then configured of independent PDCCH and transmitted. PDCCH in the time domain is mapped and transmitted during control channel transmission period. The position of mapping of PDCCH in the frequency domain is determined by the identifier (ID) of each terminal and spread over the overall system transmission band. That is, in such form, one control channel is split into smaller units of control channels that are then distributed over the overall downlink transmission band.

The downlink data is transmitted through physical channel for downlink data transmission, PDSCH (physical downlink shared channel). PDSCH is transmitted after the control channel transmission period, and the specific mapping position in the frequency domain, modulation scheme, or other scheduling information are notified by the DCI transmitted through the PDCCH.

Through the MCS consisting of five bits among the control information constituting the DCI, the base station notifies the terminal of the modulation scheme that has applied to the PDSCH to be transmitted and the size of data to be transmitted, i.e., transport block size (TBS). The TBS corresponds to the size before applying channel coding for error correction to the data (i.e., transport block (TB)) to be transmitted by the base station.

Physical uplink channels are generally divided into control channels (PUCCH) and data channels (PUSCH). When there is no data channel, a response channel to the downlink data channel and other feedback information may be transmitted through the control channel, and when the data channel is present, such channel and data may be transmitted through the data channel.

The LTE system supports the following modulation schemes: quadrature phase shift keying (QPSK), 16 quadrature amplitude modulation (16QAM), 64QAM, and their respective modulation orders (i.e., Qm) are 2, 4, and 6. That is, QPSK may transmit two bits per symbol, 16QAM four bits per symbol, and 64QAM six bits per symbol.

Generally, time division duplex (TDD) communication system uses common frequency for downlink and uplink and operate distinctively between communication of uplink signals and communication of downlink signals in the time domain. LTE TDD transmits uplink signals and downlink signals with the signals differentiated per subframe. Depending on uplink and downlink traffic load, uplink/downlink subframes may be evenly separated or more subframes may be assigned for downlink than uplink or more subframes may be assigned for uplink than downlink.

TABLE 2

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

Table 2 shows TDD uplink-downlink configuration defined in LTE. In Table 2, D denotes subframe configured for downlink transmission, U denotes subframe configured for uplink transmission, and S denotes special subframe consisting of downlink pilot time slot (DwPTS) and guard period (GP), uplink pilot time slot (UpPTS). In DwPTS, like normal subframe, control information may be transmitted on downlink, and in case DwPTS is long enough depending on the configuration of the special subframe, downlink data transmission is also possible. GP is an interval to take transmission shift from downlink to uplink and its length is determined depending on network settings. UpPTS is used for random access channel (RACH) transmission for random access or sounding reference signal (SRS) transmission of terminal necessary to estimate uplink channel status.

For example, in case of TDD UL-DL configuration #6, downlink data and control information may be transmitted in subframes #0, #5, and #9, and uplink data and control information may be transmitted in subframes #2, #3, #4, #7, and #8. In subframes #1 and #6 corresponding to the special subframe, downlink control information, and in some cases, downlink data, may be transmitted, and SRS or RACH transmission is possible on uplink.

In TDD system, downlink or uplink signal transmission is permitted only for a particular time period, and thus, specific timing relations between uplink/downlink physical channels mutually related, such as control channel for data scheduling, data channel scheduled, and HARQ ACK/NACK channel corresponding to data channel need to be defined.

Further, 3GPP LTE Rel-10 adopted bandwidth expanding technology to support more data traffic than LTE rel-8. The above technology which is called bandwidth extension or Carrier Aggregation (CA) may extend band to increase the volume of data transmitted as much as the band extended as compared with LTE rel-8 terminal transmitting data within a single band. Each of the bands is called component carrier (CC), and LTE rel-8 terminal has been specified to have one component carrier for each of downlink and uplink. Further, downlink component carrier and uplink component carrier connected thereto via system information block (SIB)-2 are collectively called cell. The SIB-2 connection between the downlink component carrier and the uplink component carrier is transmitted through a terminal-dedicated signal. CA-supporting terminal may receive downlink data through multiple serving cells and transmit uplink data.

In Rel-10, when the base station has difficulty sending PDCCH (physical downlink control channel) in a particular serving cell to a particular terminal, a carrier indicator field (CIF) may be configured as a field to indicate that PDCCH is transmitted through other serving cell and the corresponding PDCCH indicates the PDSCH (physical downlink shared channel) or PUSCH (physical uplink shared channel) of other serving cell. The CIF may be configured in CA-supporting terminal. The CIF has been defined to be able to indicate other serving cell by adding three bits to the PDCCH information in the particular serving cell, and the CIF is included only upon cross carrier scheduling, and in case CIF is not included, cross-carrier scheduling is not performed. When CIF is present in downlink allocation information (DL assignment), the CIF indicates the serving cell where the PDSCH scheduled by DL assignment is to be transmitted, and when the CIF is present in uplink resource allocation information (UL grant), the CIF indicates the serving cell where the PUSCH scheduled by the UL grant is to be transmitted.

As such, LTE-10 defines the CA, enabling multiple serving cells to be configured for a terminal. The terminal periodically or aperiodically transmits channel information on multiple serving cells to the base station in order for data scheduling on the base station.

Meanwhile, the concept of expanding the number of serving cells up to 32 using unlicensed bands for LTE-13 is now in discussion. In such case, transmissions of channel information on multiple serving cells in one subframe may conflict with each other. Accordingly, highlighted is a need for a method for supporting an operation of the terminal that may periodically transmit channel information on as many serving cells as possible in one subframe.

Further, for low-cost terminals having the maximum bandwidth limited to less than 20 MHz (e.g., 1.4 MHz), there is a need for communication operations differentiated from those of typical legacy LTE terminals because the low-cost terminals support only some subband in the whole channel bandwidth.

SUMMARY

According to the present disclosure, there are provided a control channel transmission method and apparatus for low-cost terminals supporting repetitive transmission to enhance coverage.

According to the present disclosure, there are provided a method and apparatus for transmitting channel information on multiple serving cells by a terminal without wasting transmission resources of downlink control channels in a wireless communication system supportive of carrier aggregation. According to the present disclosure, there are provided a method and apparatus for increasing transmission by performing scheduling optimized for serving cells by receiving channel information periodically transmitted from a terminal.

According to the present disclosure, there are provided schemes for transmitting channel information on multiple serving cells by a terminal without wasting transmission resources of downlink control channels in a wireless communication system supportive of carrier aggregation.

There are proposed a method for configuring periodic channel information transmission for multiple serving cells without wasting PDCCH transmission resources by the base station under the CA situation and a method for transmitting channel information for the serving cells.

According to the present disclosure, described is a method for configuring UCI PUSCH (uplink control information PUSCH) transmission for allowing the terminal to perform periodic channel information transmission operation on multiple serving cells without the base station wasting PDCCH transmission resources.

According to the present disclosure, there are provided scheduling methods and communication methods for operating both normal LTE terminal and low-cost terminal in the same system.

According to the present disclosure, there is proposed a method for supporting repetitive transmission of uplink data by a base station in a mobile communication system operating in a time division duplex (TDD) based cell including at least one subframe for uplink transmission and at least one subframe for downlink transmission comprising repeatedly transmitting uplink data scheduling information in downlink subframes where an uplink hybrid automatic repeat request (HARQ) process is defined and repeatedly receiving uplink data in uplink subframes which start from an uplink subframe according to an HARQ transmission timing of an HARQ process defined in a downlink subframe where the repetitive transmitting of the uplink data scheduling information is complete.

According to the present disclosure, there is proposed a method for performing repetitive transmission of uplink data by a terminal in a mobile communication system operating in a time division duplex (TDD) based cell including at least one subframe for uplink transmission and at least one subframe for downlink transmission comprising repeatedly receiving uplink data scheduling information in downlink subframes where an uplink hybrid automatic repeat request (HARQ) process is defined and repeatedly transmitting uplink data in uplink subframes which start from an uplink subframe according to an HARQ transmission timing of an HARQ process defined in a downlink subframe where the repetitive receiving of the uplink data scheduling information is complete.

According to the present disclosure, there is provided a base station in a mobile communication system operating in a time division duplex (TDD) based cell including at least one subframe for uplink transmission and at least one subframe for downlink transmission comprising a controller controlling an operation of repeatedly transmitting uplink data scheduling information in downlink subframes where an uplink hybrid automatic repeat request (HARQ) process is defined and controlling an operation of repeatedly receiving uplink data in uplink subframes which start from an uplink subframe according to an HARQ transmission timing of an HARQ process defined in a downlink subframe where the repetitive transmitting of the uplink data scheduling information is complete and a transceiver repeatedly transmitting the scheduling information and repeatedly receiving the uplink data under the control of the controller.

According to the present disclosure, there is provided a terminal in a mobile communication system operating in a time division duplex (TDD) based cell including at least one subframe for uplink transmission and at least one subframe for downlink transmission comprising a controller controlling an operation of repeatedly receiving uplink data scheduling information in downlink subframes where an uplink hybrid automatic repeat request (HARQ) process is defined and controlling an operation of repeatedly transmitting uplink data in uplink subframes which start from an uplink subframe according to an HARQ transmission timing of an HARQ process defined in a downlink subframe where the repetitive receiving of the uplink data scheduling information is complete and a transceiver repeatedly receiving the scheduling information and repeatedly transmitting the uplink data under the control of the controller.

According to the present disclosure, there is proposed a method for supporting repetitive transmission of uplink data by a base station in a mobile communication system operating in a time division duplex (TDD) type cell including at least one subframe for uplink transmission and at least one subframe for downlink transmission comprising repeatedly transmitting uplink data scheduling information in a downlink subframe and repeatedly receiving uplink data in an uplink subframe corresponding to an HARQ transmission timing of a downlink subframe where the repetitive transmission of the scheduling information is complete or a closest downlink subframe having an uplink HARQ process defined that comes after the downlink subframe.

According to the present disclosure, there is proposed a method for repeatedly transmitting uplink data by a terminal in a mobile communication system operating in a time division duplex (TDD) type cell including at least one subframe for uplink transmission and at least one subframe for downlink transmission comprising repeatedly receiving uplink data scheduling information in a downlink subframe and repeatedly transmitting uplink data in an uplink subframe corresponding to an HARQ transmission timing of a downlink subframe where the repetitive reception of the scheduling information is complete or a closest downlink subframe having an uplink HARQ process defined that comes after the downlink subframe.

According to the present disclosure, there is proposed a method for supporting repetitive transmission of uplink data by a base station in a mobile communication system operating in a time division duplex (TDD) type cell including at least one subframe for uplink transmission and at least one subframe for downlink transmission comprising repeatedly transmitting uplink data scheduling information in a downlink subframe and repeatedly receiving uplink data in a closest uplink subframe that comes a first number of subframes after a downlink subframe where the repetitive transmission of the scheduling information is complete.

According to the present disclosure, there is proposed a method for repeatedly transmitting uplink data by a terminal in a mobile communication system operating in a time division duplex (TDD) type cell including at least one subframe for uplink transmission and at least one subframe for downlink transmission comprising repeatedly receiving uplink data scheduling information in a downlink subframe and repeatedly transmitting uplink data in a closest uplink subframe that comes a first number of subframes after a downlink subframe where the repetitive reception of the scheduling information is complete.

According to the present disclosure, there is proposed a method for supporting repetitive transmission of uplink data by a base station in a mobile communication system operating in a time division duplex (TDD) type cell including at least one subframe for uplink transmission and at least one subframe for downlink transmission comprising repeatedly transmitting scheduling information so that the repetitive transmission is complete in a downlink subframe having an uplink HARQ process defined and repeatedly receiving uplink data from an uplink subframe according to an HARQ transmission timing of an HARQ process defined in the downlink subframe where the repetitive transmission of the scheduling information is complete.

According to the present disclosure, there is proposed a method for performing repetitive transmission of uplink data by a terminal in a mobile communication system operating in a time division duplex (TDD) type cell including at least one subframe for uplink transmission and at least one subframe for downlink transmission comprising completing the repetitive reception of the scheduling information in a downlink subframe having an uplink HARQ process and repeatedly transmitting uplink data from an uplink subframe according to an HARQ transmission timing of an HARQ process defined in the downlink subframe where the repetitive reception of the scheduling information is complete.

According to the present disclosure, there is proposed a method for repeatedly transmitting downlink data by a base station in a mobile communication system operating in a time division duplex (TDD) type cell including at least one subframe for uplink transmission and at least one subframe for downlink transmission comprising repeatedly transmitting downlink data scheduling information in a downlink subframe and repeatedly transmitting downlink data in a closest downlink subframe that comes a first number of subframes after a downlink subframe where the repetitive transmission of the scheduling information is complete.

According to the present disclosure, there is proposed a method for repeatedly receiving downlink data by a terminal in a mobile communication system operating in a time division duplex (TDD) type cell including at least one subframe for uplink transmission and at least one subframe for downlink transmission comprising repeatedly receiving downlink data scheduling information in a downlink subframe and repeatedly receiving downlink data in a closest downlink subframe that comes a first number of subframes after a downlink subframe where the repetitive reception of the scheduling information is complete.

According to the present disclosure, there is proposed a method for supporting repetitive transmission of uplink data by a base station in a mobile communication system operating in a frequency division duplex (FDD) type cell including at least one subframe for uplink transmission and at least one subframe for downlink transmission comprising repeatedly transmitting downlink data scheduling information in a downlink subframe and repeatedly receiving uplink data from an uplink subframe that comes a first number of subframes after a downlink subframe where the repetitive transmission of the scheduling information is complete.

According to the present disclosure, there is proposed a method for repeatedly transmitting uplink data by a terminal in a mobile communication system operating in an FDD type cell including at least one subframe for uplink transmission and at least one subframe for downlink transmission comprising repeatedly receiving downlink data scheduling information in a downlink subframe and repeatedly transmitting uplink data from an uplink subframe that comes a first number of subframes after a downlink subframe where the repetitive reception of the scheduling information is complete.

According to the present disclosure, there is proposed a method for repeatedly transmitting downlink data by a base station in a mobile communication system operating in an FDD type cell including at least one subframe for uplink transmission and at least one subframe for downlink transmission comprising repeatedly transmitting downlink data scheduling information in a downlink subframe and repeatedly transmitting downlink data from a downlink subframe that comes a first number of subframes after a downlink subframe where the repetitive transmission of the scheduling information is complete.

According to the present disclosure, there is proposed a method for repeatedly receiving downlink data by a terminal in a mobile communication system operating in an FDD type cell including at least one subframe for uplink transmission and at least one subframe for downlink transmission comprising repeatedly receiving downlink data scheduling information in a downlink subframe and repeatedly receiving downlink data from a downlink subframe that comes a first number of subframes after a downlink subframe where the repetitive reception of the scheduling information is complete.

According to the present disclosure, there is proposed a method for receiving periodic channel information by a base station in a wireless communication system comprising transmitting higher layer signaling including uplink resource information for transmission of the periodic channel information, a transmission period of the periodic channel information, and a transmission offset of the periodic channel information and receiving uplink control information including periodic channel information on at least one serving cell through a resource indicated by the uplink resource information, wherein the transmission period and transmission offset of the periodic channel information for at least two serving cells among the multiple serving cells are set to the same value by the higher layer signaling.

According to the present disclosure, there is proposed a method for transmitting periodic channel information by a terminal in a wireless communication system comprising receiving higher layer signaling including uplink resource information for transmission of the periodic channel information, a transmission period of the periodic channel information, and a transmission offset of the periodic channel information and transmitting uplink control information including periodic channel information on at least one serving cell through a resource indicated by the uplink resource information, wherein the transmission period and transmission offset of the periodic channel information for at least two serving cells among the multiple serving cells are set to the same value by the higher layer signaling.

According to the present disclosure, there is proposed a base station receiving periodic channel information in a wireless communication system comprising a controller controlling the operation of transmitting higher layer signaling including uplink resource information for transmission of the periodic channel information, a transmission period of the periodic channel information, and a transmission offset of the periodic channel information and controlling the operation of receiving uplink control information including periodic channel information on at least one serving cell through a resource indicated by the uplink resource information and a transceiver transmitting the higher layer signaling and receiving the uplink control information under the control of the controller, wherein the transmission period and transmission offset of the periodic channel information for at least two serving cells among the multiple serving cells are set to the same value by the higher layer signaling.

According to the present disclosure, there is proposed a terminal transmitting periodic channel information in a wireless communication system comprising a controller controlling the operation of receiving higher layer signaling including uplink resource information for transmission of the periodic channel information, a transmission period of the periodic channel information, and a transmission offset of the periodic channel information and controlling the operation of transmitting uplink control information including periodic channel information on at least one serving cell through a resource indicated by the uplink resource information and a transceiver receiving the higher layer signaling and transmitting the uplink control information under the control of the controller, wherein the transmission period and transmission offset of the periodic channel information for at least two serving cells among the multiple serving cells are set to the same value by the higher layer signaling.

According to the present disclosure, there is proposed a method for supporting communication by a terminal operating on a subband that is a region corresponding to six consecutive physical resource blocks (PRBs) in the frequency domain, comprising including and transmitting downlink control information (DCI) for the terminal in a first subband designated for the terminal, wherein the DCI includes resource block assignment information including a subband indicator, and wherein the subband indicator indicates a second subband where uplink data transmission or downlink data reception by the terminal is to be performed.

According to the present disclosure, there is proposed a method for communication by a terminal operating on a subband that is a region corresponding to six PRBs in the frequency domain, comprising receiving DCI for the terminal in a first subband designated for the terminal, wherein the DCI includes resource block assignment information including a subband indicator, and wherein the subband indicator indicates a second subband where uplink data transmission or downlink data reception by the terminal is to be performed.

According to the present disclosure, there is proposed a base station supporting communication by a terminal operating on a subband that is a region corresponding to six PRBs in the frequency domain, comprising a controller controlling the operation of including and transmitting DCI for the terminal in a first subband designated for the terminal and a transceiver transmitting the DCI under the control of the controller, wherein the DCI includes resource block assignment information including a subband indicator, and wherein the subband indicator indicates a second subband where uplink data transmission or downlink data reception by the terminal is to be performed.

According to the present disclosure, there is proposed a terminal operating on a subband that is a region corresponding to six PRBs in the frequency domain, comprising a controller controlling the operation of receiving DCI for the terminal in a first subband designated for the terminal and a transceiver receiving the DCI under the control of the controller, wherein the DCI includes resource block assignment information including a subband indicator, and wherein the subband indicator indicates a second subband where uplink data transmission or downlink data reception by the terminal is to be performed.

According to the present disclosure, uplink HARQ transmission is supported for low-cost terminal supportive of repetitive transmission to enhance coverage, and thus, coverage may be enhanced, and the same uplink HARQ transmission timing as in existing LTE terminals is used to simplify base station scheduling.

According to the present disclosure, control information may be transmitted when transmitting channel information of terminal using data channel in the system having up to 32 cells aggregated. According to the present disclosure, there is provided a method in which cells are grouped to transmit control information. Resources for one terminal by the base station may be used for data transmission of another terminal by efficiently multiplexing channel information with data channel resources without waste of resources. The base station may receive channel information for multiple serving cells from the terminal and perform optimal scheduling on the serving cells to increase the volume of transmission.

The present disclosure provides communication methods for low-cost terminals to allow LTE terminals and low-cost terminals to efficiently co-exist in the system.

DETAILED DESCRIPTION

Figure 1:
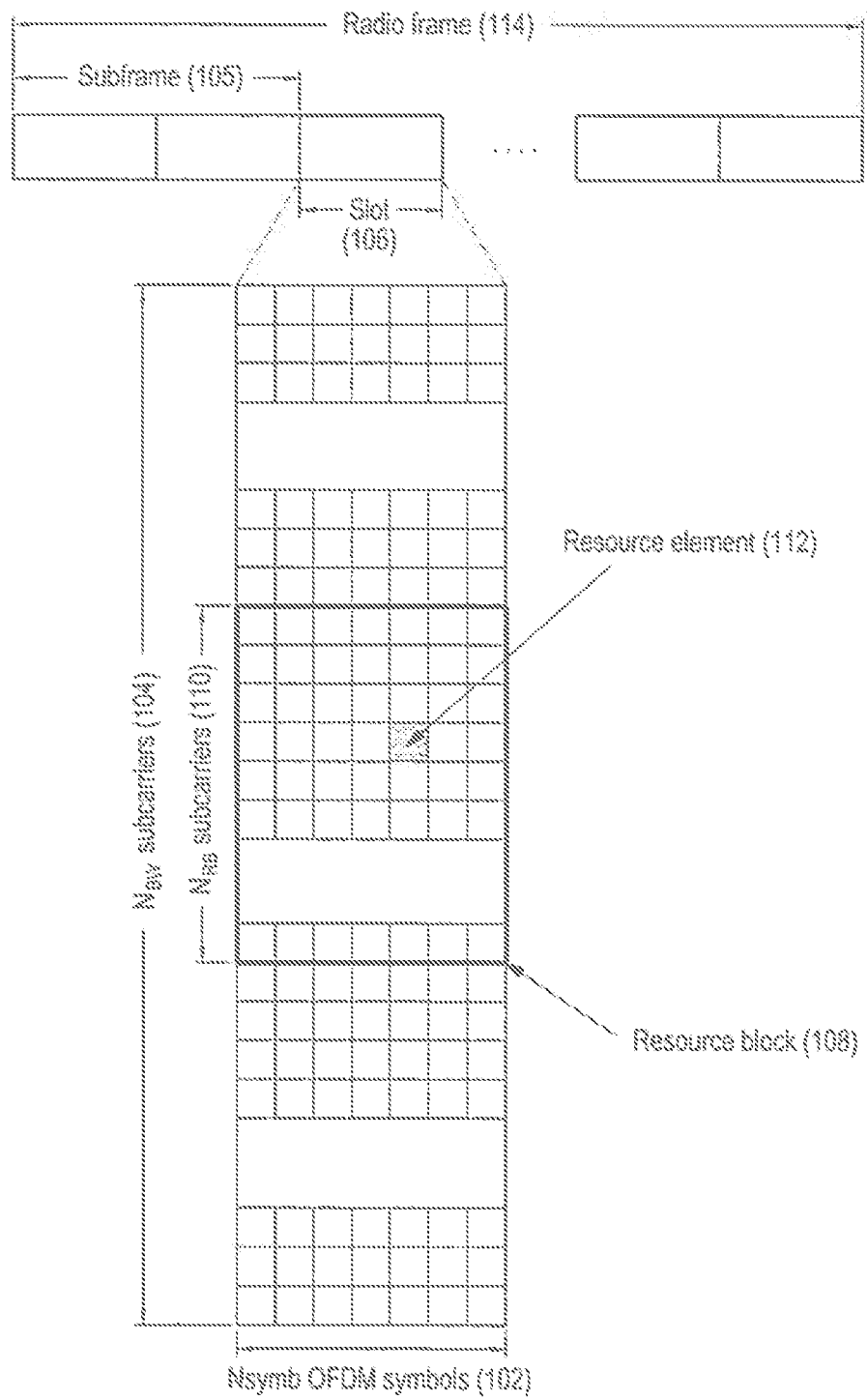
FIG. 1 is a view illustrating a basic structure of time-frequency domain which is radio resource domain where the data or control channel is transmitted on downlink in the LTE system.

Hereinafter, embodiments of the present disclosure are described in detail with reference to the accompanying drawings. When determined to make the subject matter of the present disclosure unclear, the detailed of the known functions or configurations may be skipped. The terms as used herein are defined considering the functions in the present disclosure and may be replaced with other terms according to the intention or practice of the user or operator. Therefore, the terms should be defined based on the overall disclosure.

Hereinafter, according to this disclosure, the long term evolution (LTE) system and the LTE-advanced (LTE-A) system are described as examples, but the present disclosure may also apply to other communication systems adopting base station scheduling without limited thereto. The description of embodiments of the present disclosure primarily targets advanced E-UTRA (or LTE-A) supporting carrier aggregation but the subject matter of the present disclosure may also be applicable to other communication systems with a similar technical background with minor changes without significantly departing from the scope of the present disclosure, and this may be possible under the determination of those skilled in the art to which the present disclosure pertains. For example, the subject matter of the present disclosure may be applicable to multicarrier HSPA supporting carrier aggregation.

Before detailing the present disclosure, some terms as used herein may be interpreted as follows, for example. However, it should be noted that the present disclosure is not limited thereto.

The base station is an entity communicating with a UE and may be denoted BS, NodeB (NB), eNodeB (eNB), or AP (Access Point).

The user equipment is an entity communicating with a base station, may be denoted UE, mobile station (MS), mobile equipment (ME), device, or terminal.

Reference signal (RS) is a signal that enables the terminal to estimate channel, and this reference signal may be received from the base station. The reference signals for the LTE communication system include the common reference signal (CRS) and the demodulation reference signal (DMRS), a dedicated reference signal.

The CRS is a reference signal transmitted over the overall downlink band and receivable by all the UEs and is used for channel estimation, configuring feedback information by the UE, and demodulation of data channel. The DMRS is a reference signal transmitted over the overall downlink band. The DMRS is used for demodulation of a data channel by a particular UE and channel estimation, but not used for configuring feedback information unlike the CRS. Accordingly, the DMRS is transmitted through a PRB resource that is to be scheduled by the UE.

HARQ-ACK signal refers to an acknowledge (ACK) or negative ACK (NACK) signal transmitted in the HARQ procedure and is simply referred to as 'HARQ-ACK.'

Hereinafter, according to the present disclosure, a scheme for supporting repetitive transmission by a low-cost terminal is described with reference to FIGS. 2 to 14, a periodic channel information transmission scheme in a system supporting multiple serving cells is described in connection with FIGS. 15 to 17, a resource allocation and communication scheme by a low-cost terminal is described in connection with FIGS. 18 to 27, and devices for supporting embodiments of the present disclosure are described in connection with FIGS. 28 and 29.

In LTE TDD system, first, the uplink/downlink timing relation of physical downlink shared channel (PDSCH), which is a physical channel for downlink data transmission, and its corresponding physical uplink control channel (PUCCH) or physical uplink shared channel (PUSCH)

which is a physical channel through which uplink HARQ ACK/NACK is transmitted is as follows.

The terminal, if receiving PDSCH that has been transmitted in subframe n−k from the base station, may transmit uplink HARQ ACK/NACK for the PDSCH in uplink subframe n. Here, k is a component of set K, and K is defined in Table 3.

TABLE 3

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Table 4 re-summarizes, according to the definitions in Table 3, subframes where uplink HARQ ACK/NACK is transmitted for PDSCH when the PDSCH is transmitted in each downlink subframe (D) or special subframe (S) n in each TDD UL-DL configuration.

TABLE 4

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | D 4 | S 6 | U | U | U | D 4 | S 6 | U | U | U |
| 1 | D 7 | S 6 | U | U | D 4 | D 7 | S 6 | U | U | D 4 |
| 2 | D 7 | S 6 | U | D 4 | D 8 | D 7 | S 6 | U | D 4 | D 8 |
| 3 | D 4 | S 11 | U | U | U | D 7 | D 6 | D 6 | D 5 | D 5 |
| 4 | D 12 | S 6 | U | U | D 8 | D 7 | D 7 | D 6 | D 5 | D 4 |
| 5 | D 12 | S 6 | U | D 9 | D 8 | D 7 | D 6 | D 5 | D 4 | D 13 |
| 6 | D 7 | S 7 | U | U | D 8 | D 7 | S 7 | U | U | D 5 |

Figure 2:
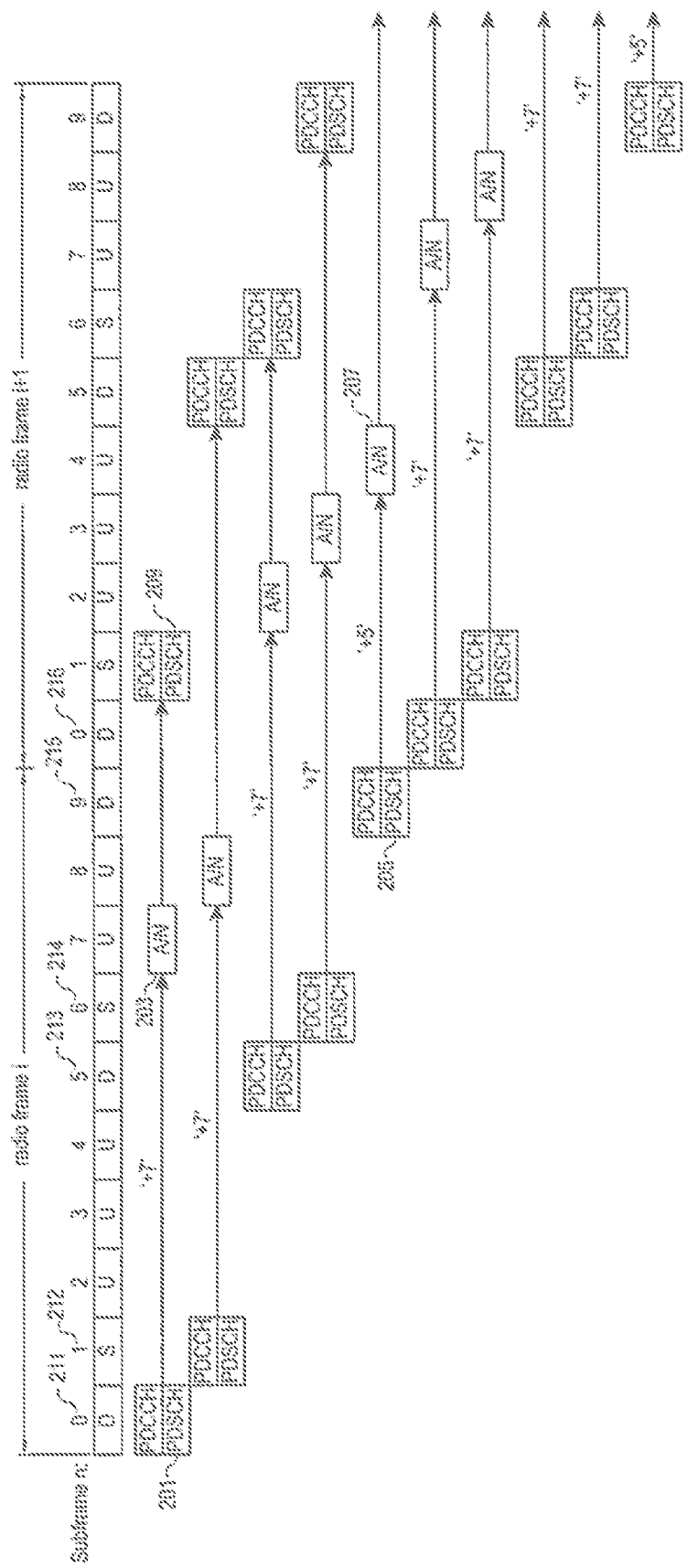
FIG. 2 is a view illustrating an operation example of subframes in a TDD frame.

FIG. 2 is a view illustrating an operation example of subframes in a TDD frame.

Table 4 is described below with reference to FIG. 2. Here, FIG. 2 is a view exemplifying, as per the definitions in Table 4, the subframe where uplink HARQ ACK/NACK corresponding to PDSCH is transmitted when the PDSCH is transmitted in each downlink or special subframe in TDD UL-DL configuration #6 of Table 4.

For example, the uplink HARQ ACK/NACK corresponding to the PDSCH 201 transmitted from the base station in subframe #0 211 of radio frame i is transmitted by the terminal in subframe #7 of radio frame i (203). Here, the downlink control information DCI including scheduling information on PDSCH 201 is transmitted through PDCCH in the same subframe 211 as the subframe transmitted where the PDSCH is transmitted. As another example, the uplink HARQ ACK/NACK corresponding to the PDSCH 205 transmitted from the base station in subframe #9 215 of radio frame i is transmitted by the terminal in subframe #4 of radio frame i+1 (207). Likewise, the downlink control information DCI including scheduling information on PDSCH 205 is transmitted through PDCCH in the same subframe 215 as the subframe transmitted where the PDSCH is transmitted.

In LTE system, downlink HARQ adopts asynchronous HARQ scheme, which is a scheme where the data retransmission time is not fixed. As used herein, downlink HARQ refers to an HARQ (initial transmission, ACK/NACK, or retransmission) whose transmission direction is downlink. The reason why downlink HARQ adopts asynchronous HARQ scheme is that not fixing transmission time would make little trouble even because in the LTE TDD system downlink transmission generally use more subframes than uplink transmission. That is, in case the base station receives feedback of HARQ NACK from the terminal for the transmitted HARQ initial transmission data, the base station freely determines the transmission time of next HARQ retransmission data by scheduling operation. The terminal buffers the HARQ data determined to have an error as a result of determining the received data for HARQ operation and then performs combining with next HARQ retransmission data. Here, in order to maintain the reception buffer capacity of the terminal within a predetermined range, the maximum number of downlink HARQ processes per TDD UL-DL configuration is defined as in Table 5. One HARQ process is mapped to one subframe in the time domain.

TABLE 5

| TDD UL/DL configuration | Maximum number of HARQ processes |
|---|---|
| 0 | 4 |
| 1 | 7 |
| 2 | 10 |
| 3 | 9 |
| 4 | 12 |
| 5 | 15 |
| 6 | 6 |

Referring to the example shown in FIG. 2, the terminal, if determining that the PDSCH 201 transmitted from the base station subframe #0 211 of radio frame i has an error, transmits HARQ NACK in subframe #7 of radio frame i (203). When receiving the HARQ NACK 203, the base station may configure retransmission data for the PDSCH 201 with the PDSCH 209 and transmit together with PDCCH. Referring to FIG. 2, the maximum number of downlink HARQ processes in TDD UL-DL configuration #6 is six as per the definitions shown in Table 5 above. That is, there are a total of six downlink HARQ processes 211, 222, 213, 214, 215, and 216 between the initial transmission PDSCH 201 and the retransmission PDSCH 209.

Unlike downlink HARQ, in LTE system, uplink HARQ adopts synchronous HARQ scheme, which is a scheme where the data retransmission time is fixed. As used herein, uplink HARQ refers to an HARQ (initial transmission, ACK/NACK, or retransmission) whose transmission direction is downlink. The reason why uplink HARQ adopts synchronous HARQ scheme is that in the LTE TDD system uplink transmission generally use fewer subframes than downlink transmission, and thus the terminal cannot freely choose and use uplink resources. That is, the timing relation in uplink/downlink timing between the physical channel for uplink data transmission, PUSCH (physical uplink shared channel), and its precedent downlink control channel, PDCCH, and the physical channel where HARQ ACK/NACK corresponding to the PUSCH is transmitted, PHICH (physical hybrid indicator channel) is fixed by the following rule.

The terminal, when receiving PDCCH including uplink scheduling information transmitted from the base station in subframe n or PHICH where downlink HARQ ACK/NACK is transmitted from, transmits uplink data corresponding to the control information through PUSCH in subframe n+k. Here, k is as defined in Table 6.

TABLE 6

| TDD UL/DL Configuration | DL subframe number n | | | | | | | | | |
|---|---|---|---|---|---|---|---|---|---|---|
| | 0 | 1 | 2 | 3 | 4 | 5 | 6 | 7 | 8 | 9 |
| 0 | | 4 | 6 | | | | 4 | 6 | | |
| 1 | | | 6 | | 4 | | | 6 | | 4 |
| 2 | | | | 4 | | | | | 4 | |
| 3 | 4 | | | | | | | 4 | 4 | |
| 4 | | | | | | | | | 4 | 4 |
| 5 | | | | | | | | | 4 | |
| 6 | | 7 | 7 | | | | 7 | 7 | | 5 |

If the terminal receives PHICH carrying downlink HARQ ACK/NACK from the base station in subframe i, the PHICH corresponds to the PUSCH transmitted from the terminal in subframe i−k. Here, k is as defined in Table 7.

TABLE 7

| TDD UL/DL Configuration | DL subframe number i | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 | | | | 7 | 4 | | | |
| 1 | | 4 | | | 6 | | 4 | | | 6 |
| 2 | | | | 6 | | | | | 6 | |
| 3 | 6 | | | | | | | 6 | 6 | |
| 4 | | | | | | | | 6 | 6 | |
| 5 | | | | | | | 6 | | | |
| 6 | | 6 | 4 | | | | 7 | 4 | | 6 |

Figure 3:
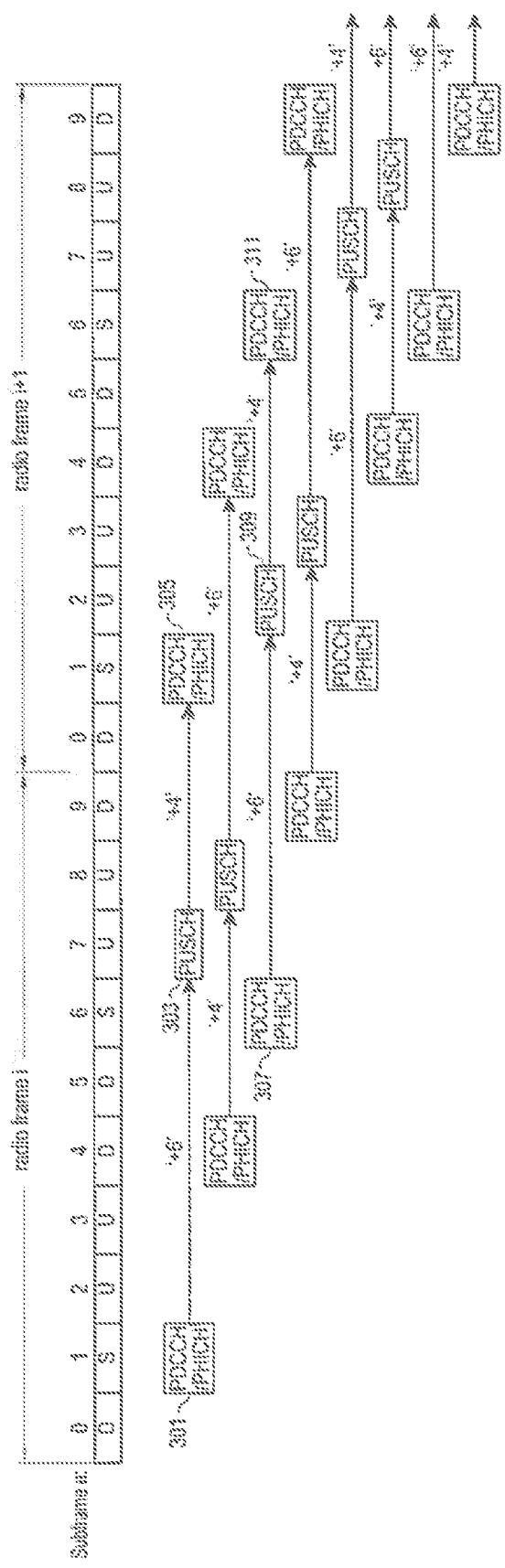
FIG. 3 is a view illustrating another operation example of subframes in a TDD frame.

FIG. 3 is a view illustrating an operation example of subframes in a TDD frame.

FIG. 3 is a view illustrating an example according to the definitions in Tables 6 and 7, as to the subframe where uplink PUSCH corresponding to PDCCH or PHICH is transmitted when the PDCCH or the PHICH is transmitted in each downlink or special subframe in case of TDD UL-DL configuration #1, and the subframe where PHICH is transmitted corresponding to the PUSCH.

For example, the uplink PUSCH corresponding to the PDCCH or PHICH 301 transmitted from the base station in subframe #1 of radio frame i is transmitted by the terminal in subframe #7 (=1+6) of radio frame i (303). The base station transmits the PHICH corresponding to the PUSCH to the terminal in subframe #1 of radio frame i+1 (305). As another example, the uplink PUSCH corresponding to the PDCCH or PHICH 307 transmitted from the base station in subframe #6 of radio frame i is transmitted by the terminal in subframe #2 of radio frame i+1 (309). The base station transmits the PHICH corresponding to the PUSCH to the terminal in subframe #6 of radio frame i+1 (311).

Further, LTE TDD system may pose limitations, regarding PUSCH transmission, the downlink transmission of PDCCH or PHICH corresponding to the PUSCH in a particular downlink subframe, guaranteeing minimum transmission/reception processing time of base station and terminal. For example, in case of TDD UL-DL configuration #1 of Tables 6 and 7, PDCCH for scheduling the PUSCH or PHICH corresponding to the PUSCH is not transmitted in subframe #0 #5.

The LTE system operating as above may support lower-cost/lower-complexity terminals (UEs) by limiting some functions of the terminal. Such low-cost terminals are anticipated to be appropriate for machine-type communication (MTC) or machine-to-machine (M2M services for remote metering, security, or logistics. Further, low-cost terminals are expected as means to implement cellular-based Internet of things (cIoT).

For low costs or low complexity, the number of receive antennas of terminal may be limited to one, to reduce costs of RF components of terminal or TBS processable by the present disclosure may be set with an upper cap to reduce costs of data receiving buffer of the terminal. Common LTE terminals are equipped with broadband signal communication functionality for a minimum of 20 MHz band regardless of the system transmission bandwidth, and by comparison, low-cost terminals are limited as having 20 MHz or less maximum bandwidth to lead to additional cost savings and reduced complexity. For example, in the 20 MHz channel bandwidth LTE system, low-cost terminals only supportive of 1.4 MHz channel bandwidth may be defined for their operation. Further, low-cost terminals may have limited coverage when they are located at a particular position, e.g., cell boundary, and for enhanced coverage for low-cost terminals, repetitive transmission is taken into account. Such repetitive transmission is apparently applicable to enhanced coverage for normal LTE terminals. Here, there is a need for defining HARQ communication operation for low-cost terminals performing repetitive transmission in a coverage enhancing mode differentiated from normal LTE terminals with no coverage limit, and a specific method is proposed according to the present disclosure.

To achieve the goals set forth above, the following embodiments are proposed.

According to an embodiment of the present disclosure, repetitive transmission of information for uplink data scheduling to a low-cost terminal in a TDD cell is performed (only) in downlink subframes having an uplink HARQ process defined, and uplink data for the repetitive transmission is transmitted based on the HARQ timing of the HARQ process defined in a downlink subframe where the repetitive transmission is complete, and HARQ-ACKs for the uplink data may be repeatedly transmitted based on the HARQ timing of the HARQ process defined in the uplink subframe where the repetitive transmission of uplink data is complete.

According to an embodiment of the present disclosure, repetitive transmission of downlink signals for uplink data scheduling to a low-cost terminal in a TDD cell is performed in all downlink subframes, uplink data is transmitted based on the HARQ timing of the subframe where the repetitive transmission is complete or the closest downlink subframe having an uplink HARQ process defined which comes after the downlink subframe where the repetitive transmission is complete, and the HARQ-ACKs for the uplink data may be transmitted based on the HARQ timing of the HARQ process defined in the uplink subframe where the repetitive transmission of uplink data is complete.

According to an embodiment of the present disclosure, repetitive transmission for uplink data scheduling to a low-cost terminal in a TDD cell is performed in all downlink subframes, transmission of uplink data is started in the closest (earliest) uplink subframe coming p1 subframes from the downlink subframe where the repetitive transmission is complete, repetitive transmission of uplink data is performed in all subsequent uplink subframes, transmission of HARQ-ACKs is started in the closest downlink subframe coming p2 subframes after the uplink subframe where the repetitive transmission of the UCI PUSCH data is complete, and HARQ-ACKs may be repeatedly transmitted in all subsequent downlink subframes.

According to an embodiment of the present disclosure, repetitive transmission for uplink data scheduling to a low-cost terminal in a TDD cell is transmitted to be complete in the downlink subframe having an uplink HARQ process defined, transmission of uplink data is started in the uplink subframe according to the HARQ timing of the HARQ process defined in the downlink subframe where the repetitive transmission is complete, repetitive transmission of uplink data is performed in all subsequent uplink subframes, transmission of HARQ-ACKs is started in the downlink subframe according to the HARQ timing of the HARQ process defined in the uplink subframe where repetitive transmission of the uplink data is complete, and HARQ-ACKs may be repeatedly transmitted in all subsequent subframes.

According to an embodiment of the present disclosure, repetitive transmission for downlink data scheduling to a low-cost terminal in a TDD cell is performed in all downlink subframes, transmission of downlink data is started in the closest downlink subframe coming k1 subframes after the downlink subframe where the repetitive transmission is complete, repetitive transmission of downlink data is performed in all subsequent downlink subframes, transmission of HARQ-ACKs is started in the closest uplink subframe coming k2 subframes after the downlink subframe where the repetitive transmission of the downlink data is complete, and HARQ-ACKs may be repeatedly transmitted in all subsequent uplink subframes.

According to an embodiment of the present disclosure, repetitive transmission for uplink data scheduling to a low-cost terminal in a FDD cell is performed in all downlink subframes, transmission of uplink data is started in the uplink subframe coming k1 subframes from the downlink subframe where the repetitive transmission is complete, repetitive transmission of uplink data is performed in all subsequent uplink subframes, transmission of HARQ-ACKs is started in the closest downlink subframe coming k2 subframes after the uplink subframe where the repetitive transmission of the UCI PUSCH data is complete, and HARQ-ACKs may be repeatedly transmitted in all subsequent downlink subframes.

According to an embodiment of the present disclosure, repetitive transmission for downlink data scheduling to a low-cost terminal in an FDD cell is performed in all downlink subframes, repetitive transmission of downlink data is started in the downlink subframe coming m1 subframes after the downlink subframe where the repetitive transmission is complete, repetitive transmission of the downlink data is performed in all subsequent downlink subframes, transmission of HARQ-ACKs is started in the uplink subframe coming k2 subframes after the downlink subframe where the repetitive transmission of downlink data is complete, and HARQ-ACKs may be repeatedly transmitted in all subsequent uplink subframes.

Figure 4:
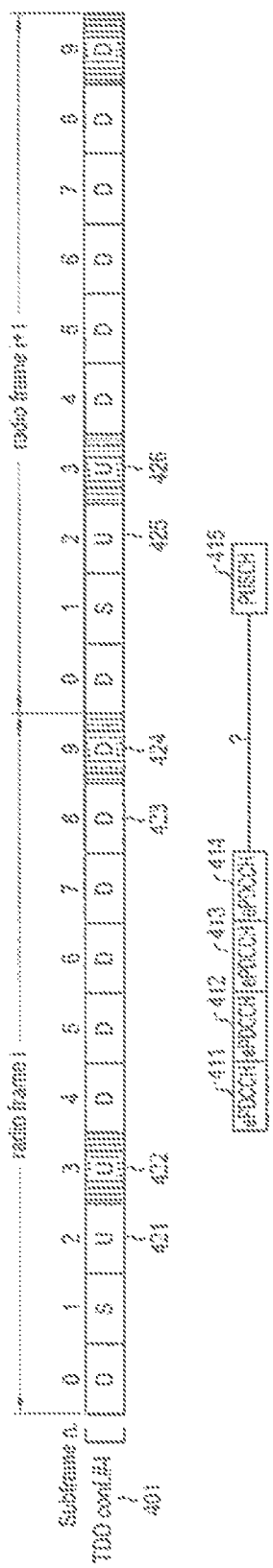
FIG. 4 is a view illustrating a problematic situation to be solved according to the present disclosure.

FIG. 4 is a view illustrating a problematic situation to be solved according to the present disclosure.

FIG. 4 exemplifies a static TDD-based LTE cell 401.

It is assumed that the terminal (e.g., a low-cost terminal) is always set in coverage enhancing mode, and in case it is set in the coverage enhancing mode, it may communicate data through reception transmission/reception. Downlink subframes and uplink subframes are configured in the cell 401 according to TDD UL-DL configuration #4. The terminal may obtain TDD UL-DL configuration for the cell from system information or higher layer information. The coverage enhancing mode of the terminal may be set by a higher layer signaling from the base station, and the terminal always operating in the coverage enhancing mode may signal to the base station that it is always operating in the coverage enhancing mode.

A TDD-based downlink subframe and uplink subframe configure one HARQ process. That is, the subframes having such pattern as shown in FIG. 4 are subframes configuring one HARQ process. For example, uplink subframe #2 421 and downlink subframe #8 423 configure one uplink HARQ process, and uplink subframe #3 422 and downlink subframe #9 424 configure one uplink HARQ process.

Further, the terminal receiving uplink scheduling information in downlink subframe #8 423 of radio frame i transmits uplink data in uplink subframe #2 425 of next radio frame (radio frame i+1) based on the uplink HARQ timing according to the uplink HARQ process configuration. Further, the terminal receiving uplink scheduling information in downlink subframe #9 424 of radio frame i transmits uplink data in uplink subframe #3 426 of next radio frame (radio frame i+1) based on the uplink HARQ timing according to the uplink HARQ process configuration.

However, in FIG. 4, downlink subframes #0, #1, #4, #5, #6, and #7 of radio frame i do not configure uplink HARQ process, and it may be seen that downlink subframes #0, #1, #4, #5, #6, and #7 have no uplink HARQ timing defined based on uplink HARQ process.

A channel reception method between base station and terminal for repetitive transmission/reception may be defined depending on channel types as follows.

TABLE 8

| Channel and signal | Receiving method |
| --- | --- |
| (e)PDCCH | Chase Combining |
| (e)PHICH | Chase Combining |
| PUSCH | Incremental Redundancy |
| PDSCH | Incremental Redundancy |
| PUCCH | Chase Combining |
| PRACH | Chase Combining |
| PBCH | Chase Combining |
| PSS/SSS | Chase Combining |
| SRS | Chase Combining |
| CRS/CSI-RS/PRS | Chase Combining |

Configuration information related to repetitive transmission of the terminal, i.e., repetitive transmission start subframe, repetitive transmission count, or frequency resource information where repetitive transmission channel is transmitted, may be previously transmitted to the terminal. In FIG. 4, it is assumed that a total of four times of repetitive transmission is set. The base station transmits uplink data scheduling information 411, 412, 413, and 414 to the terminal in subframe #4, subframe #5, subframe #6, and subframe #7. At this time, downlink subframe #7 has not uplink HARQ process defined. Accordingly, the terminal faces the situation where it cannot be aware of the uplink subframe which uplink data 415 (e.g., PUSCH) for the scheduling information 411, 412, 413, and 414 repeatedly transmitted should be transmitted through.

Figure 5:
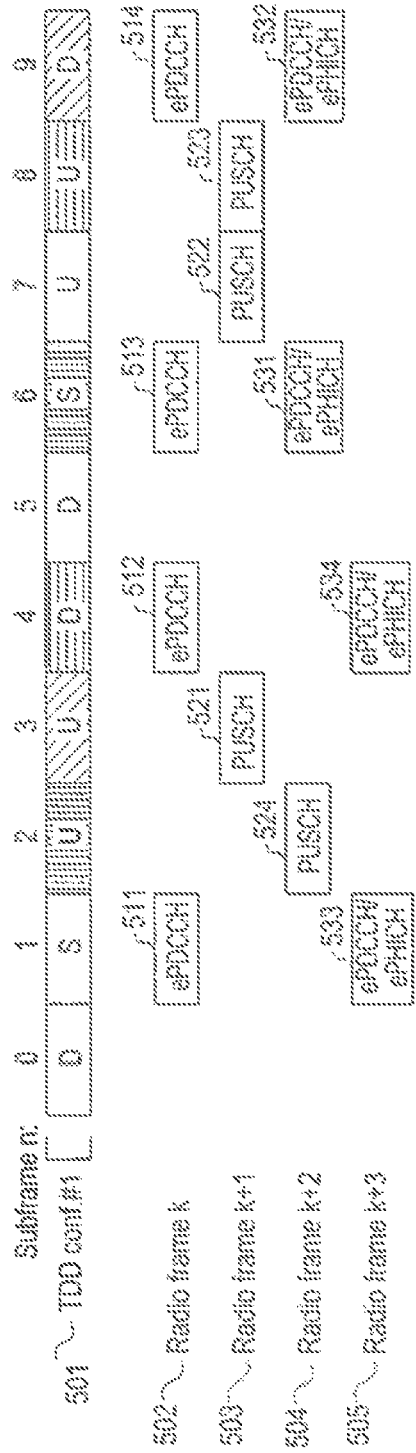
FIG. 5 is a view illustrating a method for transmitting a control channel according to an embodiment of the present disclosure.

FIG. 5 is a view illustrating a method for transmitting a control channel according to an embodiment of the present disclosure.

FIG. 5 exemplifies a static TDD-based LTE cell 501. In the exemplified scheme, the base station performs repetitive transmission on the uplink data scheduling information (only) in downlink subframes having LTE cell uplink HARQ process defined so that the terminal performs uplink HARQ transmission according to the defined uplink HARQ process timing.

It is assumed that the terminal (e.g., a low-cost terminal) is always set in coverage enhancing mode, and in case it is set in the coverage enhancing mode, it may communicate data through reception transmission/reception. Downlink subframes and uplink subframes are configured in the cell 501 according to TDD UL-DL configuration #1. The terminal may obtain TDD UL-DL configuration for the cell 501 from system information (e.g., system information block (SIB) information) or higher layer information (i.e., higher layer signaling). The coverage enhancing mode of the terminal may be set by a higher layer signaling from the base station, and the terminal always operating in the coverage enhancing mode may signal to the base station that it is always operating in the coverage enhancing mode. Or, the terminal may set itself to operate in the coverage enhancing mode through reception of system information or a random access procedure or the terminal may be set to operate in the coverage enhancing mode by the base station.

A TDD-based downlink subframe and uplink subframe may configure one uplink HARQ process. The subframes having such pattern as shown in FIG. 5 configure one HARQ process. However, since the number of uplink subframes is not always the same as the number of downlink subframes, all of the subframes included in one radio frame do not configure HARQ process. For example, in FIG. 5, downlink subframes #0 and #5 do not configure uplink HARQ process, and it may be seen that no uplink HARQ timing is defined for downlink subframes #0 and #5. Accordingly, the HARQ transmission scheme shown in FIG. 5 may advantageously apply to the situations where the number of downlink subframes configuring no uplink HARQ process in the radio frame is smaller as compared with other UL-DL configurations (i.e., among the UL-DL configurations, ones having relatively more downlink subframes configuring HARQ processes). For a reason, many of the subframes configuring a radio frame configure uplink HARQ process, and thus, even when repetitive transmission is performed only with the subframes configuring the uplink HARQ process, not much time is consumed for transmission, and there is no need of specifying an additional rule for HARQ process, thus leading to minimized influence on the standards.

Repetitive transmission-related information on the base station and the terminal, e.g., repetitive transmission start subframe, repetitive transmission count, information on frequency resources for transmitting repetitive transmission channel, or information on groups of downlink or uplink subframes where repetitive transmission may be conducted, may be previously transmitted to the terminal or transmitted to the terminal via a L1 (Layer 1, physical layer) signal. In FIG. 5, it is assumed that a total of four times of repetitive transmission is set. Although FIG. 5 illustrates an example in which the uplink scheduling information, uplink data, and HARQ-ACK are set to have the same number of times of repetition, such pieces of information may be set to be different from each other by a higher layer signal or may be adjusted to be different dynamically by an L1 signal.

The base station transmits uplink data scheduling information to the terminal through repetitive transmission in subframe #1, subframe #4, subframe #6, and subframe #9 of radio frame k 502 (511, 512, 513, and 514). Subframe #1, subframe #4, subframe #6, and subframe #9 are subframes having uplink HARQ process defined therein, and the base station does not perform repetitive transmission in subframe #0 and subframe #5 having no uplink HARQ process defined.

After repetitive transmission of uplink scheduling information as many times as the repetition count as set, the terminal may perform repetitive transmission for uplink data transmission based on the uplink HARQ timing defined in subframe #9 of radio frame k 502 that is the last subframe of repetitive transmission. The subframe forming HARQ process with subframe #9 of radio frame k 502 is subframe #3. Accordingly, the terminal may perform repetitive transmission on uplink data from subframe #3 of radio frame k+1 503 by following the uplink HARQ process defined in subframe #9 (521). Subsequently, the terminal performs repetitive transmission on uplink data in subframe #2 of radio frame k+2 504 and subframes #7 and #8 of radio frame k+1 503 as many times as the remaining repetition count (522, 523, and 524). Here, it may be seen that the uplink subframes where uplink data transmission is performed have uplink HARQ process defined therein (the subframes having a pattern as shown in FIG. 5).

Next, repetitive transmission of HARQ-ACKs (through EPDCCH or ePHICH) may be performed from subframe #6 of radio frame k+2 504 according to the uplink HARQ timing based on the uplink HARQ process defined in subframe #2 of radio frame k+2 504 (531). The HARQ-ACK through ePDCCH or ePHICH is an HARQ signal transmitted from the base station for the PUSCHs 521, 522, 523, and 524 transmitted on uplink from the terminal. Subsequently, the base station may perform repetitive transmission of HARQ-ACKs in subframe #9 of radio frame k+2 504, subframe #1 of radio frame k+3 505, and subframe #4 of radio frame k+3 505 as many times as the remaining repetition count (532, 533, and 534). Additionally, if there is uplink data retransmission, the terminal may perform uplink data repetitive transmission based on the uplink HARQ timing defined in subframe #4 of radio frame k+2 504.

As exemplified in FIG. 5, determining the uplink transmission start subframe based on the subframes where uplink data scheduling information is transmitted (i.e., determining ePDCCH-to-PUSCH HARQ timing) and determining HARQ-ACK transmission start subframe based on the subframes where uplink data is transmitted (i.e., determining PUSCH-to-HARQ-ACK timing) may apply to both the base station and the terminal, or any one of the ePDCCH-to-PUSCH HARQ timing determination and the PUSCH-to-HARQ-ACK timing determination may apply thereto. For example, since the subframes for downlink HARQ-ACK transmission are not insufficient in the radio frame (unlike the subframes for uplink data transmission), a subframe for HARQ-ACK transmission may be dynamically determined by the base station, and in such case, the PUSCH-to-HARQ-ACK timing determination scheme might not apply.

Figure 6A:
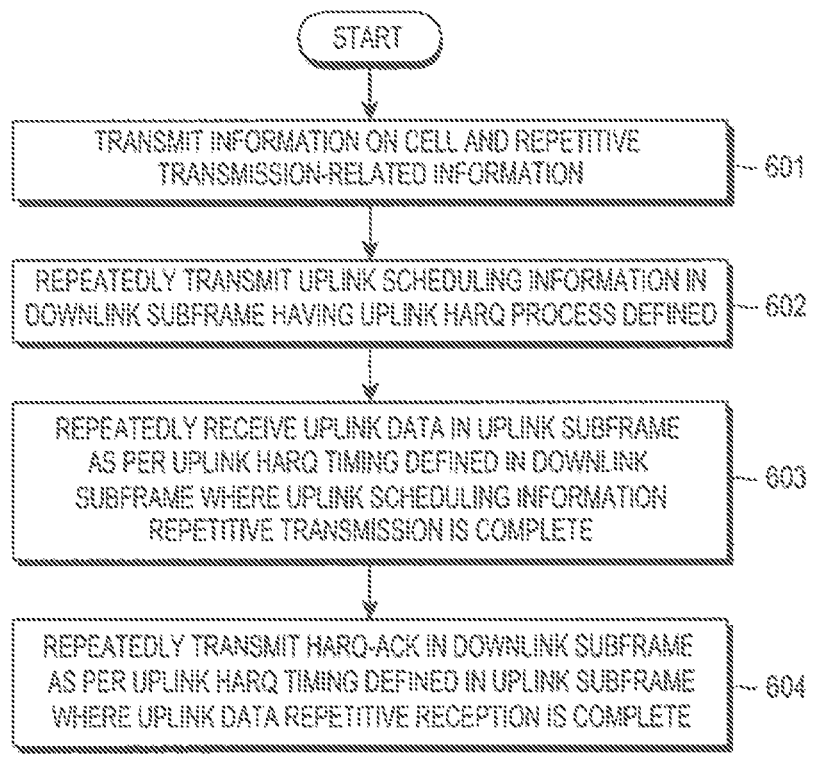
FIG. 6*a* is a flowchart illustrating an operation by a base station for a control channel transmission method according to an embodiment of the present disclosure.

FIG. 6a is a flowchart illustrating an operation by a base station for a control channel transmission method according to an embodiment of the present disclosure.

FIG. 6a exemplifies a method for performing repetitive transmission on an uplink HARQ process by a base station as shown in FIG. 5.

In step 601, the base station transmits information on LTE cell to the terminal, configures repetitive transmission-related information, and transmits the same to the terminal.

The information on LTE cell may be UL-DL configuration information or special subframe configuration information. The information on LTE cell may be transmitted to the terminal through system information (e.g., SIB information) or higher layer information (i.e., higher layer signaling). The repetitive transmission-related information, e.g., repetitive transmission start subframe, repetitive transmission count, information on frequency resources for transmitting repetitive transmission channel, or information on groups of (downlink or uplink) subframes where repetitive transmission may be conducted, may be transmitted to the terminal via system information, higher layer information, or L1 signal. Here, it is assumed that the terminal (e.g., a low-cost terminal) is always set in coverage enhancing mode, and in case it is set in the coverage enhancing mode, it may communicate data through reception transmission/reception. The coverage enhancing mode of the terminal may be set by a higher layer signaling from the base station, and the terminal always operating in the coverage enhancing mode may signal to the base station that it is always operating in the coverage enhancing mode. Or, the terminal may set itself to operate in the coverage enhancing mode through reception of system information or a random access procedure or the terminal may be set to operate in the coverage enhancing mode by the base station.

In step 602, the base station repeatedly transmits the uplink scheduling information (only) in downlink subframes having uplink HARQ process defined based on the configured repetitive transmission-related information.

In step 603, the base station repeatedly receives uplink data based on the configured repetitive transmission-related information in the uplink subframe according to the uplink HARQ timing based on the uplink HARQ process of the downlink subframe where the repetitive transmission of uplink scheduling information is complete. Taking an example as shown in FIG. 5, when the base station completes the repetitive transmission of uplink scheduling information in subframe #9 of radio frame k 502, the subframe according to the uplink HARQ timing based on the uplink HARQ process of subframe #9 is subframe #3. Accordingly, the base station may start repetitive reception from subframe #3 of radio frame k+1 503.

In step 604, the base station repeatedly transmits HARQ-ACKs (through ePDCCH or ePHICH) based on the configured repetitive transmission-related information in the downlink subframe according to the uplink HARQ timing based on the uplink HARQ process of the uplink subframe where the repetitive reception of uplink data is complete. Taking an example as shown in FIG. 5, when the base station completes the repetitive reception of uplink data in subframe #2 of radio frame k+2 504, the downlink subframe according to the uplink HARQ timing based on the uplink HARQ process of subframe #2 is subframe #6. Accordingly, the base station may start repetitive transmission of HARQ-ACKs from subframe #6 of radio frame k+2 504.

Figure 6B:
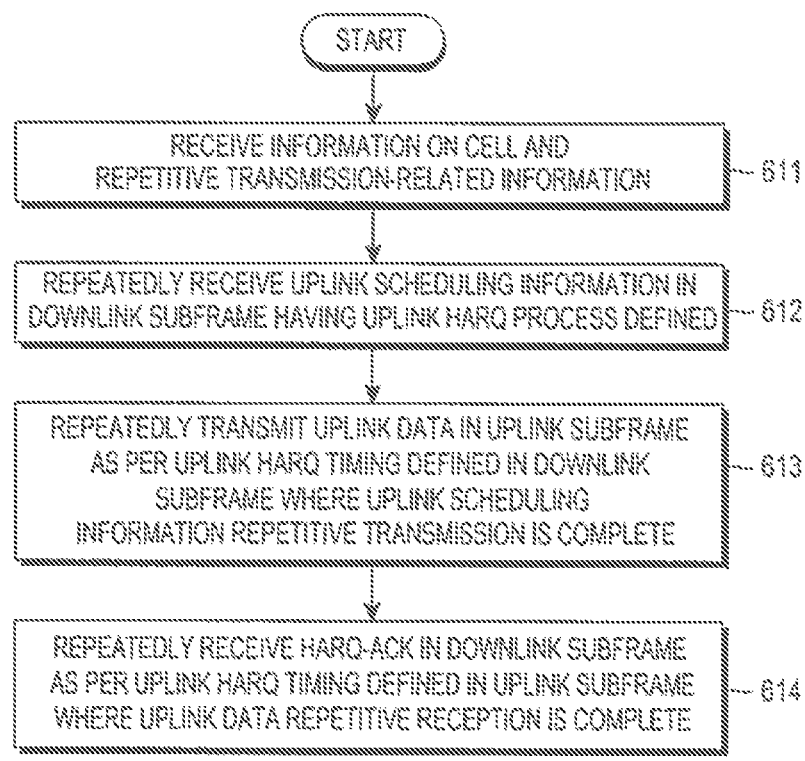
FIG. 6*b* is a flowchart illustrating an operation by a terminal for a control channel transmission method according to an embodiment of the present disclosure.

FIG. 6b is a flowchart illustrating an operation by a terminal for a control channel transmission method according to an embodiment of the present disclosure.

FIG. 6b exemplifies a method for performing repetitive transmission on an uplink HARQ process by a terminal as shown in FIG. 5.

In step 611, the terminal receives information on LTE cell from the base station and receives repetitive transmission-related information configured by the base station.

The information on LTE cell may be UL-DL configuration information or special subframe configuration information. The information on LTE cell may be received from the base station through system information (e.g., SIB information) or higher layer information (i.e., higher layer signaling). The repetitive transmission-related configuration information, e.g., repetitive transmission start subframe, repetitive transmission count, information on frequency resources for transmitting repetitive transmission channel, or information on groups of downlink or uplink subframes where repetitive transmission may be conducted, may be received from the base station via system information, higher layer information, or L1 signal. The repetitive transmission-related information, e.g., repetitive transmission start subframe, repetitive transmission count, information on frequency resources for transmitting repetitive transmission channel, or information on groups of (downlink or uplink) subframes where repetitive transmission may be conducted, may be transmitted to the terminal via system information, higher layer information, or L1 signal. Here, it is assumed that the terminal (e.g., a low-cost terminal) is always set in coverage enhancing mode, and in case it is set in the coverage enhancing mode, it may communicate data through reception transmission/reception. The coverage enhancing mode of the terminal may be set by a higher layer signaling from the base station, and the terminal always operating in the coverage enhancing mode may signal to the base station that it is always operating in the coverage enhancing mode. Or, the terminal may set itself to operate in the coverage enhancing mode through reception of system information or a random access procedure or the terminal may be set to operate in the coverage enhancing mode by the base station.

In step 612, the terminal repeatedly receives uplink scheduling information based on the received repetitive transmission-related information in (only) downlink subframes having the uplink HARQ process defined.

In step 613, the terminal repeatedly transmits uplink data based on the received repetitive transmission-related information in the uplink subframe according to the uplink HARQ timing based on the uplink HARQ process of the downlink subframe where the repetitive reception of uplink scheduling information is complete. Taking an example as shown in FIG. 5, when the terminal completes the repetitive reception of uplink scheduling information in subframe #9 of radio frame k 502, the subframe according to the uplink HARQ timing based on the uplink HARQ process of subframe #9 is subframe #3. Accordingly, the terminal may start repetitive transmission of uplink data from subframe #3 of radio frame k+1 503.

In step 614, the terminal repeatedly receives HARQ-ACKs (through ePDCCH or ePHICH) based on the received repetitive transmission-related information in the downlink subframe according to the uplink HARQ timing based on the uplink HARQ process of the uplink subframe where the repetitive transmission of uplink data is complete. Taking an example as shown in FIG. 5, when the terminal completes the repetitive transmission of uplink data in subframe #2 of radio frame k+2 504, the downlink subframe according to the uplink HARQ timing based on the uplink HARQ process of subframe #2 is subframe #6. Accordingly, the terminal may start repetitive reception of HARQ-ACKs from subframe #6 of radio frame k+2 504.

Figure 7:
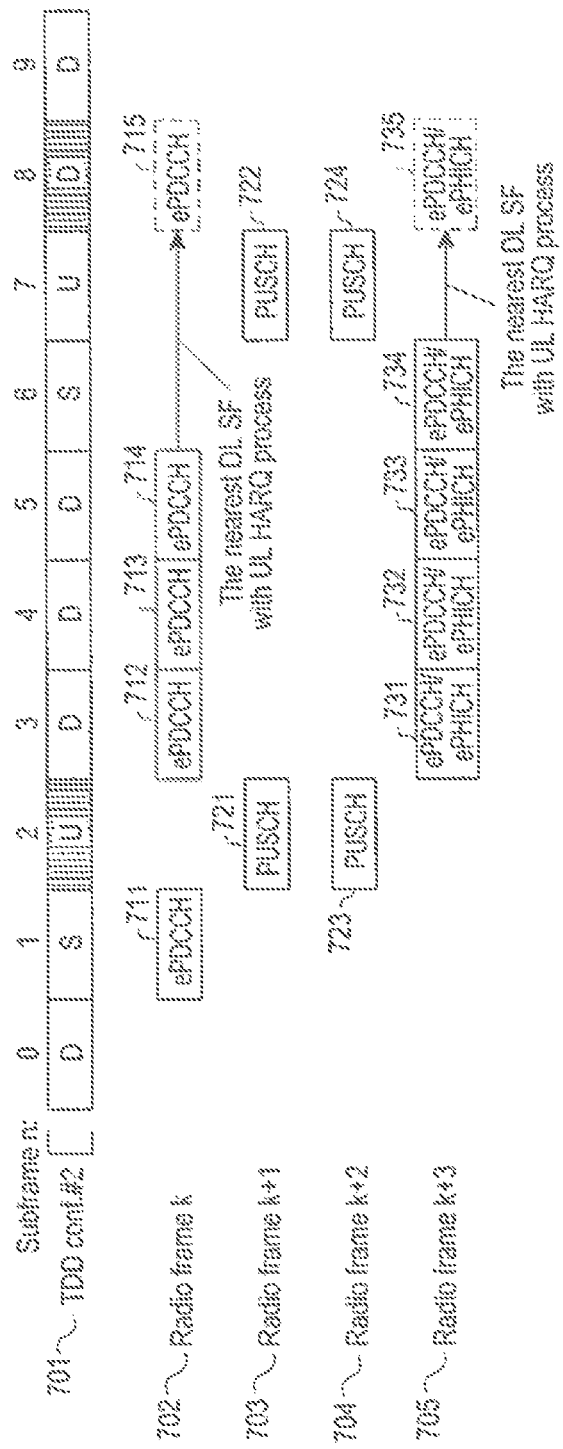
FIG. 7 is a view illustrating a method for transmitting a control channel according to an embodiment of the present disclosure.

FIG. 7 is a view illustrating a method for transmitting a control channel according to an embodiment of the present disclosure.

FIG. 7 exemplifies a static TDD-based LTE cell 701. The base station may perform repetitive transmission of uplink data scheduling information in all the downlink subframes regardless of the uplink HARQ process defined in the LTE cell. Accordingly, according to this embodiment, there is exemplified a scheme in which a new uplink HARQ timing is defined, and the base station and the terminal performs uplink HARQ communication according to the new uplink HARQ timing.

It is assumed that the terminal (e.g., a low-cost terminal) is always set in coverage enhancing mode, and in case it is set in the coverage enhancing mode, it may communicate data through reception transmission/reception. Downlink subframes and uplink subframes are configured in the cell 701 according to TDD UL-DL configuration #2. The terminal may obtain TDD UL-DL configuration for the cell 501 from system information (e.g., SIB information) or higher layer information (i.e., higher layer signaling). The coverage enhancing mode of the terminal may be set by a higher layer signaling from the base station, and the terminal always operating in the coverage enhancing mode may signal to the base station that it is always operating in the coverage enhancing mode. Or, the terminal may set itself to operate in the coverage enhancing mode through reception of system information or a random access procedure or the terminal may be set to operate in the coverage enhancing mode by the base station.

A TDD-based downlink subframe and uplink subframe may configure one uplink HARQ process. The subframes having such pattern as shown in FIG. 7 configure one HARQ process. In FIG. 7, downlink subframes #0, #1, #4, #5, #6, and #9 of radio frame i do not configure uplink HARQ process, and it may be seen that subframes #0, #1, #4, #5, #6, and #9 have no uplink HARQ timing defined based on uplink HARQ process. Accordingly, the HARQ transmission scheme shown in FIG. 7 may advantageously apply to the situations where the number of downlink subframes configuring no uplink HARQ process in the radio frame is larger as compared with other UL-DL configurations (i.e., among the UL-DL configurations, ones having relatively fewer downlink subframes configuring HARQ processes). For a reason, many of the subframes configuring a radio frame do not configure uplink HARQ process, and thus, it would take long to perform repetitive transmission only with the subframes configuring uplink HARQ process. Accordingly, it is advantageous in minimizing transmission time to perform repetitive transmission in all the downlink subframes regardless of whether HARQ process is configured in the example shown in FIG. 7, and there is a need of introducing a new uplink HARQ timing. Although the introduction of such new uplink HARQ timing might influence the standards, it would be advantageous in leading to minimized transmission time to perform repetitive transmission in all the downlink subframes in the example shown in FIG. 7.

Repetitive transmission-related information on the base station and the terminal, e.g., repetitive transmission start subframe, repetitive transmission count, information on frequency resources for transmitting repetitive transmission channel, or information on groups of downlink or uplink subframes where repetitive transmission may be conducted, may be previously transmitted to the terminal or transmitted to the terminal via a L1 (Layer 1, physical layer) signal.

A group of uplink or downlink subframes may be a group of downlink subframes for transmission of, e.g., uplink or downlink scheduling. If the repetitive transmission-related information is transmitted to the terminal and configured, the terminal may attempt to detect PDCCH (or ePDCCH) for uplink or downlink scheduling only in at least one downlink subframe in the group of downlink subframes. Further, the terminal may also try to detect PDCCH (or ePDCCH) for uplink or downlink scheduling only in at least one downlink subframe within the group of downlink subframes also for the PDCCH (or ePDCCH) for scheduling retransmission data after repetitive transmission of uplink data by the uplink scheduling or repetitive transmission of downlink data by downlink scheduling.

In FIG. 7, it is assumed that a total of four times of repetitive transmission is set. Although the instant embodiment illustrates an example in which the uplink scheduling information, uplink data, and HARQ-ACK are set to have the same number of times of repetition, such pieces of information may be set to be different from each other by a higher layer signal or may be adjusted to be different dynamically by an L1 signal.

The base station transmits uplink data scheduling information to the terminal through repetitive transmission in subframe #1, subframe #3, subframe #4, and subframe #5 of radio frame k 702 (711, 712, 713, and 714). Although FIG. 7 illustrates an example in which uplink scheduling information is transmitted in consecutive downlink subframes, repetitive transmission of uplink scheduling information may also be performed only in the downlink subframes configured by the higher signal in the group of downlink subframes where repetitive transmission may be performed.

Since the repetitive transmission of scheduling information has been complete in downlink subframe #5 of radio frame k 702 which has no uplink HARQ process defined, there is a need of defining a new uplink HARQ transmission timing in downlink subframe #5. In the instant embodiment, the base station or the terminal may determine uplink HARQ transmission timing under the assumption that the repetitive transmission has been complete in subframe #5 or the closest (or earliest coming) downlink subframe coming after subframe #5 and having an uplink HARQ process defined and may perform uplink data transmission based on the determined HARQ transmission timing (715).

Referring to FIG. 7, the repetitive transmission of scheduling information (ePDCCH) is complete in the downlink subframe having no uplink HARQ process defined, like subframe #5. The terminal starts the repetitive transmission of uplink data in subframe #2 of radio frame k+1 703 according to the HARQ transmission timing of subframe #8 under the assumption that the repetitive transmission has been complete in the closest subframe (i.e., subframe #8 of radio frame k 702) of the downlink subframes having uplink HARQ process defined and coming after subframe #5 (721). However, if the repetitive transmission of the scheduling information is complete in the subframe (e.g., subframe #3 or subframe #8) having an uplink HARQ process defined, the terminal may be able to perform uplink data transmission based on the HARQ transmission timing in the subframe where it has been complete. Subsequently, the terminal performs uplink data transmission in subframe #7 of radio frame k+1 703, subframe #2 of radio frame k+2 704, and subframe #7 of radio frame k+2 704 to perform repetitive transmission as many as the repetition count as set (i.e., four times) (722, 723, and 724). Here, the uplink subframes where uplink data transmission is performed are always subframes having uplink HARQ process defined therein.

Next, repetitive transmission of HARQ-ACKs (through EPDCCH or ePHICH) is started from the subframe according to the uplink HARQ timing based on the uplink HARQ process defined in subframe #7 of radio frame k+2 704 (i.e., subframe #3 of radio frame k+3 705) (731). That is, the base station performs HARQ-ACK repetitive transmission from subframe #3 of radio frame k+3 705 (731). The base station performs HARQ-ACK transmission in subframe #4, subframe #5, and subframe #6 of radio frame k+3 705 (732, 733, and 734). Alternatively, repetitive transmission of HARQ-ACKs (through ePDCCH or ePHICH) may be performed from the closest subframe in the group of downlink subframes where repetitive transmission may be performed, as configured by a higher signal, among the subframes coming after subframe #3 as per the uplink HARQ timing based on the uplink HARQ process, and the terminal may perform detection on the HARQ-ACKs only in some subframes of the subframe group.

If there is additional uplink data retransmission, the terminal may perform uplink data retransmission. Since no HARQ process is defined in subframe #6 of radio frame k+3 705, the terminal should determine the HARQ timing for retransmission. Here, the terminal may perform uplink data retransmission based on the uplink HARQ timing according to the uplink HARQ process of the closest downlink subframe under the assumption that the repetitive transmission of HARQ-ACKs 734 has been complete in the closest downlink subframe (i.e., subframe #8 of radio frame k+3 705) having an uplink HARQ process defined and coming after subframe #6 of radio frame k+3 705. That is, the terminal may repeatedly perform uplink data retransmission based on the uplink HARQ timing of subframe #8 (i.e., in subframe #2 of the next radio frame) under the assumption that HARQ-ACK (ePDCCH or ePHICH) transmission has been complete in subframe #8.

As exemplified in FIG. 7, determining the uplink transmission start subframe based on the subframes where uplink data scheduling information is transmitted (determining ePDCCH-to-PUSCH HARQ timing) and determining HARQ-ACK transmission start subframe based on the subframes where uplink data is transmitted (i.e., determining PUSCH-to-HARQ-ACK timing) may apply to both the base station and the terminal, or any one of the ePDCCH-to-PUSCH HARQ timing determination and the PUSCH-to-HARQ-ACK timing determination may apply thereto. For example, since the subframes for downlink HARQ-ACK transmission are not insufficient in the radio frame (unlike the subframes for uplink data transmission), a subframe for HARQ-ACK transmission may be dynamically determined by the base station, and in such case, the PUSCH-to-HARQ-ACK timing determination scheme might not apply.

Figure 8A:
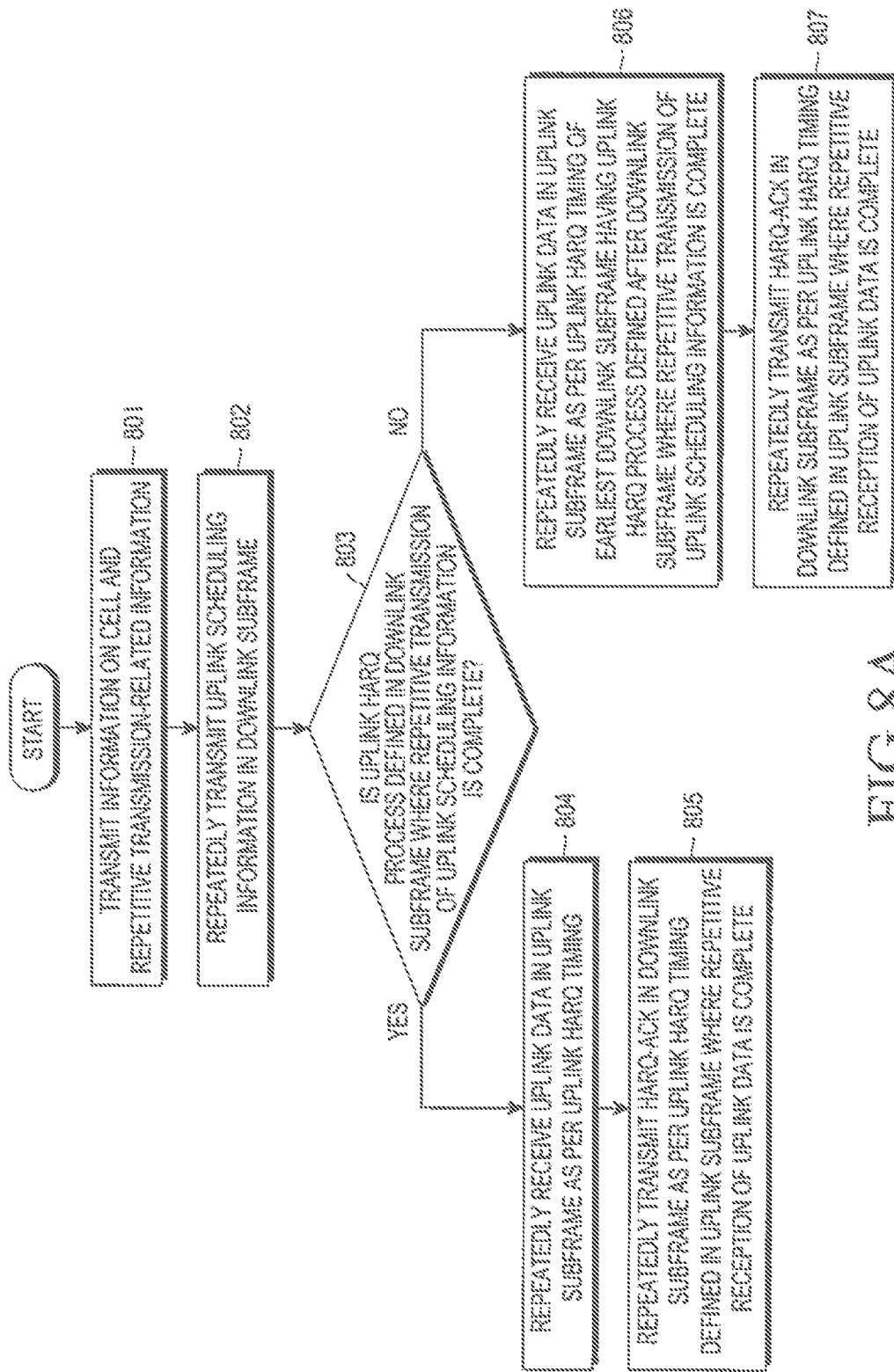
FIG. 8*a* is a view illustrating a method for transmitting a control channel by a base station according to an embodiment of the present disclosure.

FIG. 8a is a view illustrating a method for transmitting a control channel by a base station according to an embodiment of the present disclosure.

FIG. 8a exemplifies operations by the base station to perform repetitive transmission on uplink HARQ process shown in FIG. 7.

In step 801, the base station transmits information on LTE cell to the terminal, configures repetitive transmission-related information, and transmits the same to the terminal.

The information on LTE cell may be UL-DL configuration information and special subframe configuration information. The information on LTE cell may be transmitted to the terminal through system information (e.g., SIB information) or higher layer information (i.e., higher layer signaling). The repetitive transmission-related information, e.g., repetitive transmission start subframe, repetitive transmission count, information on frequency resources for transmitting repetitive transmission channel, or information on groups of (downlink or uplink) subframes where repetitive transmission may be conducted, may be transmitted to the terminal via system information, higher layer information, or L1 signal. Here, it is assumed that the terminal (e.g., a low-cost terminal) is always set in coverage enhancing mode, and in case it is set in the coverage enhancing mode, it may communicate data through reception transmission/reception. The coverage enhancing mode of the terminal may be set by a higher layer signaling from the base station, and the terminal always operating in the coverage enhancing mode may signal to the base station that it is always operating in the coverage enhancing mode. Or, the terminal may set itself to operate in the coverage enhancing mode through reception of system information or a random access procedure or the terminal may be set to operate in the coverage enhancing mode by the base station.

In step 802, the base station repeatedly transmits uplink scheduling information based on the configured repetitive transmission-related information in all the downlink subframes or downlink subframes in a group of downlink subframes where the configured repetitive transmission may be performed by a higher layer signal.

In step 803, the base station determines whether uplink HARQ process is defined in the downlink subframe where repetitive transmission of uplink scheduling information is complete.

If the uplink HARQ process is defined, the base station repeatedly receives uplink data based on the configured repetitive transmission-related information from the uplink subframe according to the uplink HARQ timing based on the uplink HARQ process in step 804. In step 805, the base station repeatedly transmits HARQ-ACKs (through ePDCCH or ePHICH) based on the configured repetitive transmission-related information in the downlink subframe according to the uplink HARQ timing based on the uplink HARQ process of the uplink subframe where the repetitive reception of uplink data is complete. Alternatively, in step 805, the base station may repeatedly transmit HARQ-ACKs (through ePDCCH or ePHICH) based on the configured repetitive transmission-related information from the closest subframe in the group of downlink subframes where the configured repetitive transmission may be performed by a higher layer signal among the subframes coming after the downlink subframe according to the uplink HARQ timing based on the uplink HARQ process.

If the uplink HARQ process is not defined, the base station repeatedly receives uplink data based on the configured repetitive transmission-related information in the uplink subframe according to the uplink HARQ timing based on the uplink HARQ process of the closest downlink subframe having an uplink HARQ process defined and coming after the downlink subframe where the repetitive transmission of uplink scheduling information is complete, in step 806. In step 807, the base station repeatedly transmits HARQ-ACKs (through ePDCCH or ePHICH) based on the configured repetitive transmission-related information in the downlink subframe according to the uplink HARQ timing based on the uplink HARQ process of the uplink subframe where the repetitive reception of uplink data is complete. Alternatively, in step 807, the base station may repeatedly transmit HARQ-ACKs (through ePDCCH or ePHICH) as specified in the configured repetitive transmission-related information from the closest subframe in the group of downlink subframes where the configured repetitive transmission may be performed by a higher layer signal among the subframes coming after the downlink subframe according to the uplink HARQ timing based on the uplink HARQ process.

Figure 8B:
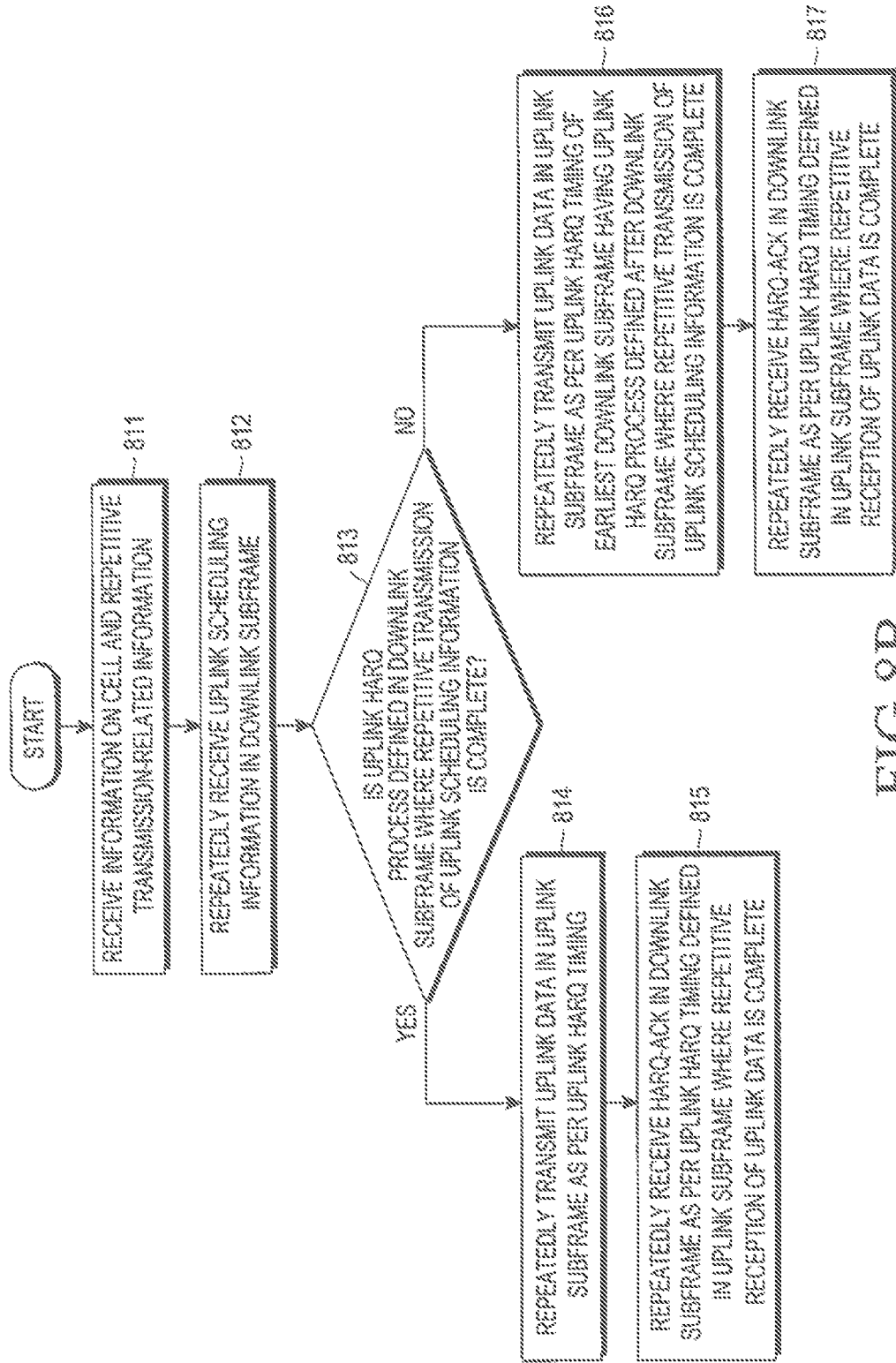
FIG. 8*b* is a view illustrating a method for transmitting a control channel by a terminal according to an embodiment of the present disclosure.

FIG. 8*b* is a view illustrating a method for transmitting a control channel by a terminal according to an embodiment of the present disclosure.

FIG. 8*b* exemplifies operations by the terminal to perform repetitive transmission on uplink HARQ process shown in FIG. 7.

In step 811, the terminal receives information on LTE cell from the base station and receives repetitive transmission-related configuration information configured by the base station.

The information on LTE cell may be UL-DL configuration information and special subframe configuration information. The information on LTE cell may be received from the base station through system information (e.g., SIB information) or higher layer information (i.e., higher layer signaling). The repetitive transmission-related information, e.g., repetitive transmission start subframe, repetitive transmission count, information on frequency resources for transmitting repetitive transmission channel, or information on groups of (downlink or uplink) subframes where repetitive transmission may be conducted, may be transmitted to the terminal via system information, higher layer information, or L1 signal. Here, it is assumed that the terminal (e.g., a low-cost terminal) is always set in coverage enhancing mode, and in case it is set in the coverage enhancing mode, it may communicate data through reception transmission/reception. The coverage enhancing mode of the terminal may be set by a higher layer signaling from the base station, and the terminal always operating in the coverage enhancing mode may signal to the base station that it is always operating in the coverage enhancing mode. Or, the terminal may set itself to operate in the coverage enhancing mode through reception of system information or a random access procedure or the terminal may be set to operate in the coverage enhancing mode by the base station.

In step 812, the terminal repeatedly receives uplink scheduling information based on the received repetitive transmission-related information in all the downlink subframes or downlink subframes in a group of downlink subframes where the configured repetitive transmission may be performed by a higher layer signal.

In step 813, the terminal determines whether uplink HARQ process is defined in the downlink subframe where repetitive transmission of uplink scheduling information is complete.

If the uplink HARQ process is defined, the terminal repeatedly transmits uplink data based on the received repetitive transmission-related information from the uplink subframe according to the uplink HARQ timing based on the uplink HARQ process in step 814. In step 815, the terminal repeatedly receives HARQ-ACKs (through ePDCCH or ePHICH) as specified in the received repetitive transmission-related information in the downlink subframe according to the uplink HARQ timing based on the uplink HARQ process of the uplink subframe where the repetitive transmission of uplink data is complete. Alternatively, in step 815, the terminal may repeatedly receive HARQ-ACKs (through ePDCCH or ePHICH) as specified in the received repetitive transmission-related information from the closest subframe in the group of downlink subframes where the configured repetitive transmission may be performed by a higher layer signal among the subframes coming after the downlink subframe according to the uplink HARQ timing based on the uplink HARQ process.

If the uplink HARQ process is not defined, the terminal repeatedly transmits uplink data as specified in the received repetitive transmission-related information in the uplink subframe according to the uplink HARQ timing based on the uplink HARQ process of the closest downlink subframe having an uplink HARQ process defined and coming after the downlink subframe where the repetitive transmission of uplink scheduling information is complete, in step 816. In step 817, the terminal repeatedly receives HARQ-ACKs (through ePDCCH or ePHICH) as specified in the received repetitive transmission-related information in the downlink subframe according to the uplink HARQ timing based on the uplink HARQ process of the uplink subframe where the repetitive transmission of uplink data is complete. Alternatively, in step 817, the terminal may repeatedly receive HARQ-ACKs (through ePDCCH or ePHICH) as specified in the received repetitive transmission-related information from the closest subframe in the group of downlink subframes where the configured repetitive transmission may be performed by a higher layer signal among the subframes coming after the downlink subframe according to the uplink HARQ timing based on the uplink HARQ process.

Figure 9:
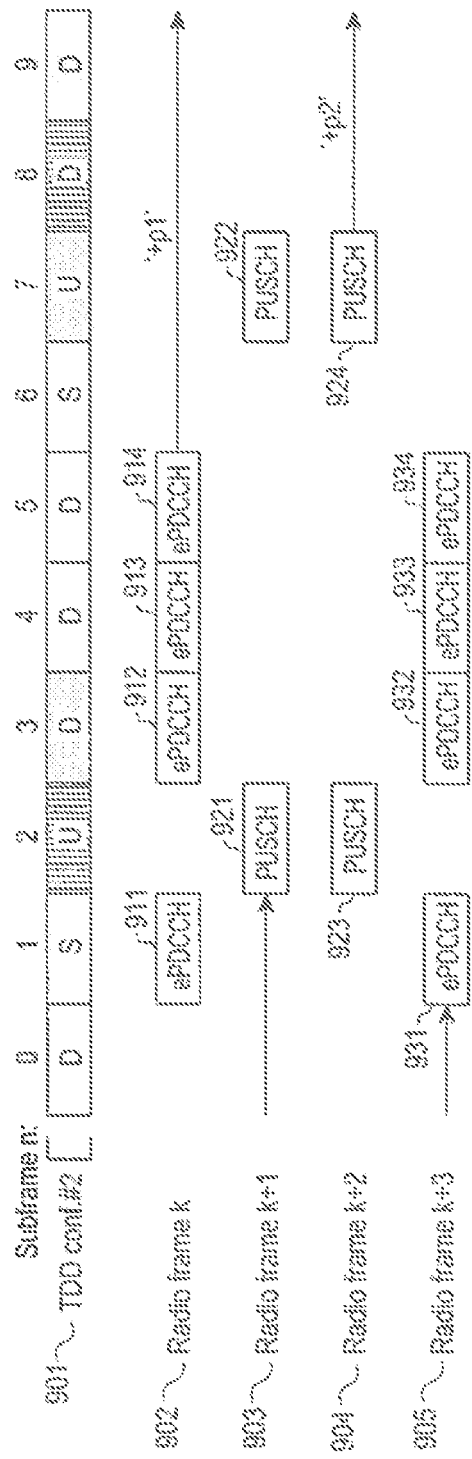
FIG. 9 is a view illustrating a method for transmitting a control channel according to an embodiment of the present disclosure.

FIG. 9 is a view illustrating a method for transmitting a control channel according to an embodiment of the present disclosure.

FIG. 9 exemplifies a static TDD-based LTE cell 901. The base station may perform repetitive transmission of uplink data scheduling information in all the downlink subframes regardless of the uplink HARQ process defined in the LTE cell. Accordingly, according to this embodiment, there is exemplified a scheme in which a new uplink HARQ timing is defined, and the base station and the terminal performs uplink HARQ communication according to the new uplink HARQ timing.

It is assumed that the terminal (e.g., a low-cost terminal) is always set in coverage enhancing mode, and in case it is set in the coverage enhancing mode, it may communicate data through reception transmission/reception. Downlink subframes and uplink subframes are configured in the cell 901 according to TDD UL-DL configuration #2. The terminal may obtain TDD UL-DL configuration for the cell from system information (e.g., SIB information) or higher layer information (i.e., higher layer signaling). The coverage enhancing mode of the terminal may be set by a higher layer signaling from the base station, and the terminal always operating in the coverage enhancing mode may signal to the base station that it is always operating in the coverage enhancing mode. Or, the terminal may set itself to operate in the coverage enhancing mode through reception of system information or a random access procedure or the terminal may be set to operate in the coverage enhancing mode by the base station.

A TDD-based downlink subframe and uplink subframe may configure one uplink HARQ process. The subframes having such pattern as shown in FIG. 9 configure one HARQ process. In FIG. 9, downlink subframes #0, #1, #4, #5, #6, and #9 of radio frame i do not configure uplink HARQ process, and it may be seen that subframes #0, #1, #4, #5, #6, and #9 have no uplink HARQ timing defined based on uplink HARQ process. Accordingly, the HARQ transmission scheme shown in FIG. 9 may advantageously apply to the situations where the number of downlink subframes configuring no uplink HARQ process in the radio frame is larger as compared with other UL-DL configurations (i.e., among the UL-DL configurations, ones having relatively fewer downlink subframes configuring HARQ processes). For a reason, many of the subframes configuring a radio frame do not configure uplink HARQ process, and thus, it would take long to perform repetitive transmission only with the subframes configuring uplink HARQ process. Accordingly, it is advantageous in minimizing transmission time to perform repetitive transmission in all the downlink subframes regardless of whether HARQ process is configured in the example shown in FIG. 9, and there is a need of introducing a new uplink HARQ timing. Although the introduction of such new uplink HARQ timing might influence the standards, it would be advantageous in leading to minimized transmission time to perform repetitive transmission in all the downlink subframes in the example shown in FIG. 9.

Repetitive transmission-related information on the base station and the terminal, e.g., repetitive transmission start subframe, repetitive transmission count, information on frequency resources for transmitting repetitive transmission channel, or information on groups of downlink or uplink subframes where repetitive transmission may be conducted, may be previously transmitted to the terminal or transmitted to the terminal via a L1 (Layer 1, physical layer) signal.

A group of uplink or downlink subframes may be a group of downlink subframes for transmission of, e.g., uplink or downlink scheduling. If the repetitive transmission-related information is transmitted to the terminal and configured, the terminal may attempt to detect PDCCH (or ePDCCH) for uplink or downlink scheduling only in at least one downlink subframe in the group of downlink subframes. Further, the terminal may also try to detect PDCCH (or ePDCCH) for uplink or downlink scheduling only in at least one downlink subframe within the group of downlink subframes also for the PDCCH (or ePDCCH) for scheduling retransmission data after repetitive transmission of uplink data by the uplink scheduling or repetitive transmission of downlink data by downlink scheduling.

In FIG. 9, it is assumed that a total of four times of repetitive transmission is set. Although the instant embodiment illustrates an example in which the uplink scheduling information, uplink data, and HARQ-ACK are set to have the same number of times of repetition, such pieces of information may be set to be different from each other by a higher layer signal or may be adjusted to be different dynamically by an L1 signal.

The base station transmits uplink data scheduling information to the terminal through repetitive transmission in subframe #1, subframe #3, subframe #4, and subframe #5 of radio frame k 902 (911, 912, 913, and 914). Although FIG. 9 illustrates an example in which uplink scheduling information is transmitted in consecutive downlink subframes, repetitive transmission of uplink scheduling information may also be performed only in the downlink subframes configured by the higher signal in the group of downlink subframes where repetitive transmission may be performed.

In FIG. 9, repetitive transmission of uplink scheduling information has been complete in subframe #5, and the terminal may perform repetitive transmission of uplink data from the closest uplink subframe (i.e., subframe coming earliest) among uplink subframes coming after a predetermined number (i.e., p1) of subframes. p1 may be set as one of multiple values by a higher layer signal (higher layer signaling) or may be fixed to a particular value by a standard (an agreement previously defined). For example, p1 may be fixed to 4. Here, repetitive transmission of uplink data by the terminal may be initiated from the closest uplink subframe coming p1 subframes after subframe #5 of radio frame k 902, i.e., subframe #2 of radio frame k+1 903 (921).

That is, in the embodiment shown in FIG. 9, the terminal performs uplink data transmission in the closest uplink subframe coming after p1 subframes after the downlink subframe where the repetitive transmission is complete, regardless of whether the uplink HARQ process is defined in the subframe where repetitive transmission is complete. Although repetitive transmission of uplink data scheduling is complete in subframes having uplink HARQ process defined like subframe #3 or subframe #8, the terminal may perform uplink data transmission in the uplink subframe first coming p1 subframes after the subframe where it is complete regardless of the defined HARQ process.

After the repetitive transmission 921 of uplink data is started by the terminal in subframe #2 of radio frame k+1 903, the terminal performs uplink data repetitive transmission as many times as the repetition count as set. That is, the terminal performs uplink data repetitive transmission in subframe #7 of radio frame k+1 903 and subframe #2 and subframe #7 of radio frame k+2 904 (922, 923, and 924).

Next, repetitive transmission of HARQ-ACKs (through ePDCCH or ePHICH) is performed from subframe #1 of radio frame k+3 905, which is the closest downlink subframe coming a predetermined number (i.e., p2) subframes after subframe #7 of radio frame k+2 904. Alternatively, repetitive transmission of HARQ-ACKs (ePDCCH or ePHICH) may also be performed from the closest subframe in the group of downlink subframes where the configured repetitive transmission may be performed by a higher layer signal among the subframes coming p2 subframes after subframe #7. Here, the terminal may detect HARQ-ACK (ePDCCH or ePHICH) in the subframes within the group of downlink subframes. p2 may be set as one of multiple values by a higher layer signal (higher layer signaling) or may be fixed to a particular value by a standard (an agreement previously defined). For example, p2 may be fixed to 4. Here, repetitive transmission of HARQ-ACKs (ePDCCH or ePHICH) by the terminal may be initiated from the closest downlink subframe coming p2 subframes after subframe #5 of radio frame k+2 904, i.e., subframe #1 of radio frame k+3 905 (931).

After the repetitive transmission (931) of HARQ-ACKs (ePDCCH or ePHICH) is initiated by the base station in subframe #1 of radio frame k+3 905, the base station performs repetitive transmission of HARQ-ACKs (ePDCCH or ePHICH) in subframe #3, subframe #4, and subframe #5 of radio frame k+3 905 as many times as the repetition count as set (932, 933, and 934).

Additionally, if there is retransmission of uplink data, the repetitive transmission of uplink data may be performed in the closest uplink subframe coming p1 subframes after subframe #5 of radio frame k+3 905. As described in connection with FIG. 9, determining the uplink transmission start subframe based on the subframes where uplink data scheduling information is transmitted (determining ePDCCH-to-PUSCH HARQ timing) and determining HARQ-ACK transmission start subframe based on the subframes where uplink data is transmitted (i.e., determining PUSCH-to-HARQ-ACK timing) may apply to both the base station and the terminal, or any one of the ePDCCH-to-PUSCH HARQ timing determination and the PUSCH-to-HARQ-ACK timing determination may apply thereto. For example, the ePDCCH-to-PUSCH HARQ timing determination may apply while the PUSCH-to-HARQ-ACK timing determination does not.

Figure 10A:
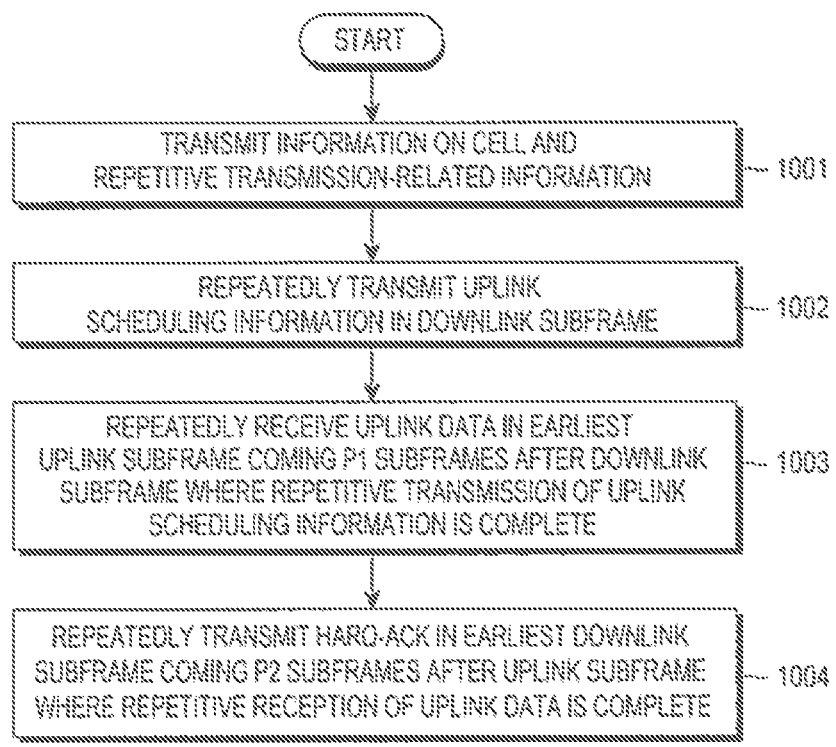
FIG. 10*a* is a flowchart illustrating an operation by a base station for a control channel transmission method according to an embodiment of the present disclosure.

FIG. 10a is a flowchart illustrating an operation by a base station for a control channel transmission method according to an embodiment of the present disclosure.

FIG. 10a exemplifies operations by the base station to perform repetitive transmission on uplink HARQ process shown in FIG. 9.

In step 1001, the base station transmits information on LTE cell to the terminal and configures and transmits at least one of repetitive transmission-related information and HARQ timing information to the terminal.

The information on LTE cell may be UL-DL configuration information and special subframe configuration information. The information on LTE cell may be transmitted to the terminal through system information (e.g., SIB information) or higher layer information (i.e., higher layer signaling). The repetitive transmission-related information, e.g., repetitive transmission start subframe, repetitive transmission count, information on frequency resources for transmitting repetitive transmission channel, or information on groups of (downlink or uplink) subframes where repetitive transmission may be conducted, may be transmitted to the terminal via system information, higher layer information, or L1 signal. The HARQ timing information may be information indicating p1 and p2 as shown in FIG. 9, and this information may be transmitted through system information (e.g., SIB information) or higher layer information (i.e., higher layer signaling). Alternatively, the HARQ timing information may be fixed to a particular following the standard, and in such case, this information might not be transmitted to the terminal. It is assumed that the terminal (e.g., a low-cost terminal) is always set in coverage enhancing mode, and in case it is set in the coverage enhancing mode, it may communicate data through reception transmission/reception. The coverage enhancing mode of the terminal may be set by a higher layer signaling from the base station, and the terminal always operating in the coverage enhancing mode may signal to the base station that it is always operating in the coverage enhancing mode. Or, the terminal may set itself to operate in the coverage enhancing mode through reception of system information or a random access procedure or the terminal may be set to operate in the coverage enhancing mode by the base station.

In step 1002, the base station repeatedly transmits uplink scheduling information based on the configured repetitive transmission-related information in all the downlink subframes or downlink subframes in a group of downlink subframes where the configured repetitive transmission may be performed by a higher layer signal.

In step 1003, the base station repeatedly receives uplink data based on the configured repetitive transmission-related information in the closest uplink subframe coming p subframes after the downlink subframe where the repetitive transmission of uplink scheduling information is complete.

In step 1004, the base station repeatedly transmits HARQ-ACKs (ePDCCH or ePHICH) based on the configured repetitive transmission-related information in the closest subframe within the group of downlink subframes where the configured repetitive transmission may be performed by a higher layer signal among the subframes coming after the p2 subframes or the closest downlink subframe coming p2 subframes after the uplink subframe where the repetitive reception of uplink data is complete.

Figure 10B:
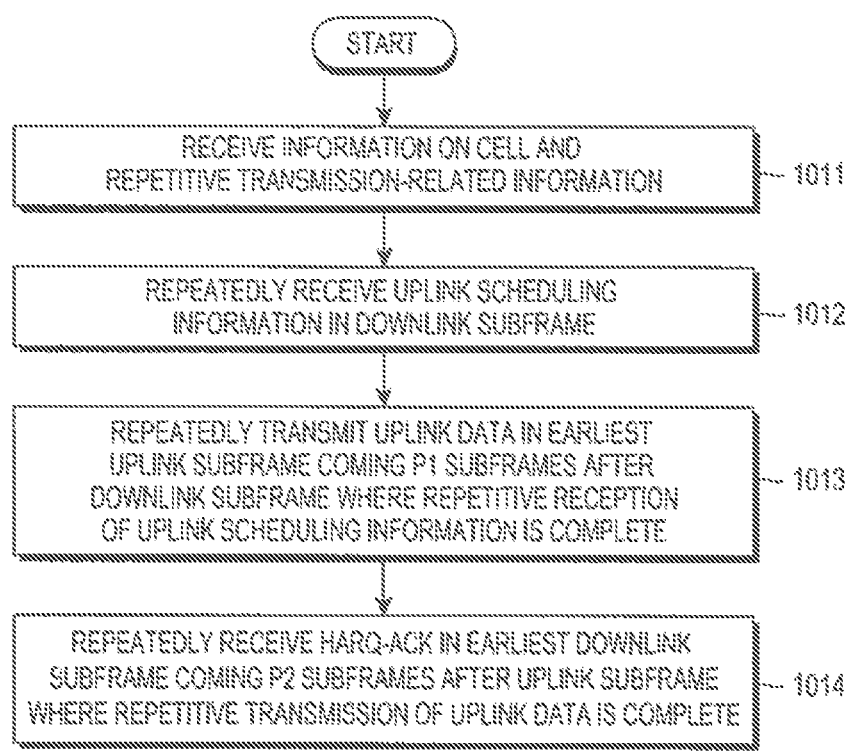
FIG. 10*b* is a flowchart illustrating an operation by a terminal for a control channel transmission method according to an embodiment of the present disclosure.

FIG. 10b is a flowchart illustrating an operation by a terminal for a control channel transmission method according to an embodiment of the present disclosure.

FIG. 10b describes operations by the terminal to perform repetitive transmission on uplink HARQ process shown in FIG. 9.

In step 1011, the terminal receives information on LTE cell from the base station and receives at least one of HARQ timing information and repetitive transmission-related configuration information configured by the base station.

The information on LTE cell may be UL-DL configuration information and special subframe configuration information. The information on LTE cell may be received from the base station through system information (e.g., SIB information) or higher layer information (i.e., higher layer signaling). The repetitive transmission-related information, e.g., repetitive transmission start subframe, repetitive transmission count, information on frequency resources for transmitting repetitive transmission channel, or information on groups of (downlink or uplink) subframes where repetitive transmission may be conducted, may be transmitted to the terminal via system information, higher layer information, or L1 signal. The HARQ timing information may be information indicating p1 and p2 as shown in FIG. 9, and this information may be transmitted through system information (e.g., SIB information) or higher layer information (i.e., higher layer signaling). Alternatively, the HARQ timing information may be fixed to a particular following the standard, and in such case, this information might not be transmitted to the terminal. It is assumed that the terminal (e.g., a low-cost terminal) is always set in coverage enhancing mode, and in case it is set in the coverage enhancing mode, it may communicate data through reception transmission/reception. The coverage enhancing mode of the terminal may be set by a higher layer signaling from the base station, and the terminal always operating in the coverage enhancing mode may signal to the base station that it is always operating in the coverage enhancing mode. Or, the terminal may set itself to operate in the coverage enhancing mode through reception of system information or a random access procedure or the terminal may be set to operate in the coverage enhancing mode by the base station.

In step 1012, the terminal repeatedly receives uplink scheduling information based on the received repetitive transmission-related information in all the downlink subframes or downlink subframes in a group of downlink subframes where the configured repetitive transmission may be performed by a higher layer signal.

In step 1013, the terminal repeatedly transmits uplink data based on the configured repetitive transmission-related information in the closest uplink subframe coming p1 subframes after the downlink subframe where the repetitive reception of uplink scheduling information is complete.

In step 1014, the terminal repeatedly receives HARQ-ACKs (ePDCCH or ePHICH) based on the received repetitive transmission-related information in the closest subframe within the group of downlink subframes where the configured repetitive transmission may be performed by a higher layer signal among the subframes coming after the p2 subframes or the closest downlink subframe coming p2 subframes after the uplink subframe where the repetitive transmission of uplink data is complete.

Figure 11:
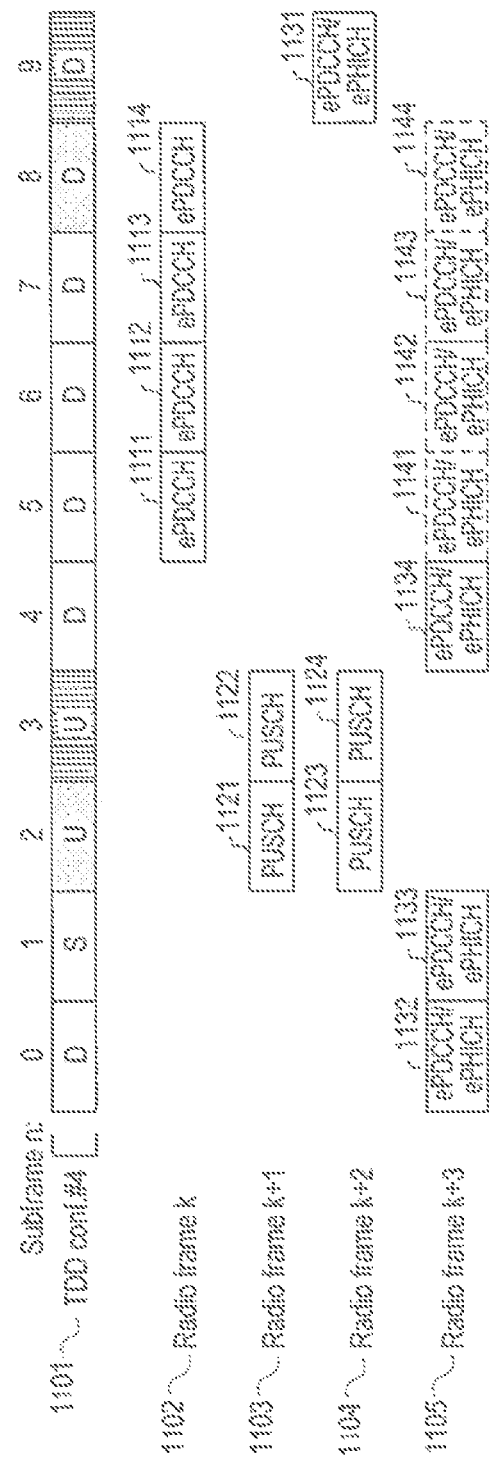
FIG. 11 is a view illustrating a method for transmitting a control channel according to an embodiment of the present disclosure.

FIG. 11 is a view illustrating a method for transmitting a control channel according to an embodiment of the present disclosure.

FIG. 11 exemplifies a static TDD-based LTE cell 1101. The base station performs transmission so that the repetitive transmission of uplink data scheduling information is finished in the downlink subframe having the uplink HARQ process of LTE cell defined. That is, the base station may have the repetitive transmission of uplink data scheduling information ended in the downlink subframe having the uplink HARQ process defined by adjusting the subframe where the repetitive transmission of uplink data scheduling information is initiated or dynamically adjusting (reducing or increasing) the number of times of repetitive transmission. Accordingly, the terminal may perform uplink HARQ repetitive transmission according to the uplink HARQ timing of the subframes having the uplink HARQ process defined.

Downlink subframes and uplink subframes are configured in the cell 1101 according to TDD UL-DL configuration #4. The terminal may obtain TDD UL-DL configuration for the cell from system information (e.g., SIB information) or higher layer information (i.e., higher layer signaling). It is assumed that the terminal (e.g., a low-cost terminal) is always set in coverage enhancing mode, and in case it is set in the coverage enhancing mode, it may communicate data through reception transmission/reception. The coverage enhancing mode of the terminal may be set by a higher layer signaling from the base station, and the terminal always operating in the coverage enhancing mode may signal to the base station that it is always operating in the coverage enhancing mode. Or, the terminal may set itself to operate in the coverage enhancing mode through reception of system information or a random access procedure or the terminal may be set to operate in the coverage enhancing mode by the base station.

A TDD-based downlink subframe and uplink subframe may configure one uplink HARQ process. The subframes having such pattern as shown in FIG. 11 configure one HARQ process. In FIG. 11, downlink subframes #0, #1, #4, #5, #6, and #7 of radio frame i do not configure uplink HARQ process, and it may be seen that subframes #0, #1, #4, #5, #6, and #7 have no uplink HARQ timing defined based on uplink HARQ process. Accordingly, the HARQ transmission scheme shown in FIG. 11 may advantageously apply to the situations where the number of downlink subframes configuring no uplink HARQ process in the radio frame is larger as compared with other UL-DL configurations (i.e., among the UL-DL configurations, ones having relatively fewer downlink subframes configuring HARQ processes). For a reason, many of the subframes configuring a radio frame do not configure uplink HARQ process, and thus, it would take long to perform repetitive transmission only with the subframes configuring uplink HARQ process.

Repetitive transmission-related information on the base station and the terminal, e.g., repetitive transmission start subframe, repetitive transmission count, information on frequency resources for transmitting repetitive transmission channel, or information on groups of downlink or uplink subframes where repetitive transmission may be conducted, may be previously transmitted to the terminal or transmitted to the terminal via a L1 (Layer 1, physical layer) signal.

A group of uplink or downlink subframes may be a group of downlink subframes for transmission of, e.g., uplink or downlink scheduling. If the repetitive transmission-related information is transmitted to the terminal and configured, the terminal may attempt to detect PDCCH (or ePDCCH) for uplink or downlink scheduling only in at least one downlink subframe in the group of downlink subframes. Further, the terminal may also try to detect PDCCH (or ePDCCH) for uplink or downlink scheduling only in at least one downlink subframe within the group of downlink subframes also for the PDCCH (or ePDCCH) for scheduling retransmission data after repetitive transmission of uplink data by the uplink scheduling or repetitive transmission of downlink data by downlink scheduling.

In FIG. 11, it is assumed that a total of four times of repetitive transmission is set. Although the instant embodiment illustrates an example in which the uplink scheduling information, uplink data, and HARQ-ACK are set to have the same number of times of repetition, such pieces of information may be set to be different from each other by a higher layer signal or may be adjusted to be different dynamically by an L1 signal.

The base station transmits uplink data scheduling information to the terminal through repetitive transmission in subframe #5, subframe #6, subframe #7, and subframe #8 of radio frame k 1102 (1111, 1112, 1113, and 1114). The base station performs repetitive transmission four times from subframe #5 so that the repetitive transmission of scheduling information is complete in subframe #8 of radio frame k 1102. subframe #8 of radio frame k 1102 is the subframe having an uplink HARQ process defined.

Next, the terminal repeatedly transmits uplink data (PUSCH) based on the uplink HARQ timing defined in subframe #8 of radio frame k 1102, which is the last subframe of the repetitive transmission of scheduling information. That is, the terminal starts the repetitive transmission of uplink data from subframe #2 of radio frame k+1 1103 based on the uplink HARQ process defined in subframe #8 of radio frame k 1102 (1121). Subsequently, the terminal performs repetitive transmission in subframe #3 of radio frame k+1 1103, subframe #2 of radio frame k+2 1104, and subframe #3 of radio frame k+2 1104 as many times as the remaining repetition count (1122, 1123, and 1124).

Next, repetitive transmission of HARQ-ACKs (ePDCCH or ePHICH) is started from the subframe according to the uplink HARQ timing based on the uplink HARQ process defined in subframe #3 of radio frame k+2 1104 (i.e., subframe #9 of radio frame k+2 1104). That is, the base station starts HARQ-ACK repetitive transmission from subframe #9 of radio frame k+2 1104 (1131). The base station repeatedly transmits HARQ-ACKs in subframe #0, subframe #1, and subframe #4 of radio frame k+3 (1105) as many times as the remaining repetition count (1132, 1133, and 1134).

Additionally, if there is repetitive transmission for uplink data retransmission, transmission HARQ timing needs to be determined. Since no uplink HARQ timing is defined in subframe #4 of radio frame k+3 1105 where the HARQ-ACK repetitive transmission has been complete, the terminal is assumed to perform repetitive transmission of HARQ-ACKs more than the repetition count indicated by an L1 signal or the repetition count as set. The additional repetitive transmission assumed above may have a level value next to the number of times of repetitive transmission (i.e., the repetition count) set by the higher layer signal. For example, if the repetition count may be set to 1, 2, 4, or 8 by a higher layer signal, and the repetition count as set is 4, the terminal may assume that the repetition count is 8 while assuming that four (=8−4) times of repetitive transmission is additionally performed. Or, the additional repetitive transmission assumed may have a count of repetitive transmission up to the subframe having a next uplink HARQ timing defined. For example, the base station may repeatedly transmit HARQ-ACKs (ePDCCH or ePHICH) up to subframe #8 of radio frame k+3 1105, which is the subframe having the next uplink HARQ timing defined (1141, 1142, 1143, and 1144), and the terminal may attempt to receive HARQ-ACKs (ePDCCH or ePHICH) up to subframe #8 of radio frame k+3 1105. The additional repetition count may have a level (or resolution) value that cannot be set by higher layer signals. That is, the additional repetition count may have any other value than 1, 2, 4, or 8. Resultantly, the terminal may perform uplink data repetitive transmission based on the uplink HARQ timing defined in subframe #8 of radio frame k+3 1105, and the base station may repeatedly receive uplink data that is retransmitted based on the uplink HARQ timing.

Alternatively, when the base station performs the HARQ-ACK repetitive transmission from subframe #9 of radio frame k+2 1104, the base station may perform such HARQ-ACK repetitive transmission assuming such a repetition count as to allow the repetitive transmission to be ended in the subframe having an uplink HARQ timing defined, and the terminal may attempt to decode the HARQ-ACKs repeated transmitted in consistence with the operation. Here, the terminal may operate in two ways. First, the terminal may attempt decoding at a repetition count of 1, 2, 4, or 8 that may be set by a higher layer signal or L1 signal while assuming that the repetitive transmission is finished in the subframe having the uplink HARQ timing defined. In the first case, the subframe corresponding to the set repetition count may be always defined as the subframes having the uplink HARQ timing defined. Second, the terminal may attempt to receive the HARQ-ACK repetitive transmission under the assumption that the repetitive transmission is finished in the subframe where the closest uplink HARQ timing is defined, which comes a predetermined number (e.g., 4) subframes after subframe #9. In the second case, the base station and the terminal recognize that repetitive transmission may be performed at any other repetition count than 1, 2, 4, or 8 as settable by a higher layer signal or L1 signal.

Any one or both of the determination of uplink transmission start subframe based on the uplink data scheduling information transmission subframes upon initial transmission as described in connection with FIG. 11 (ePDCCH-to-PUSCH HARQ timing determination) and the determination of uplink data transmission start subframe based on uplink data scheduling information transmission subframes upon retransmission (retransmission ePDCCH-to-PUSCH HARQ timing determination) may apply to the base station and the terminal.

Figure 12:
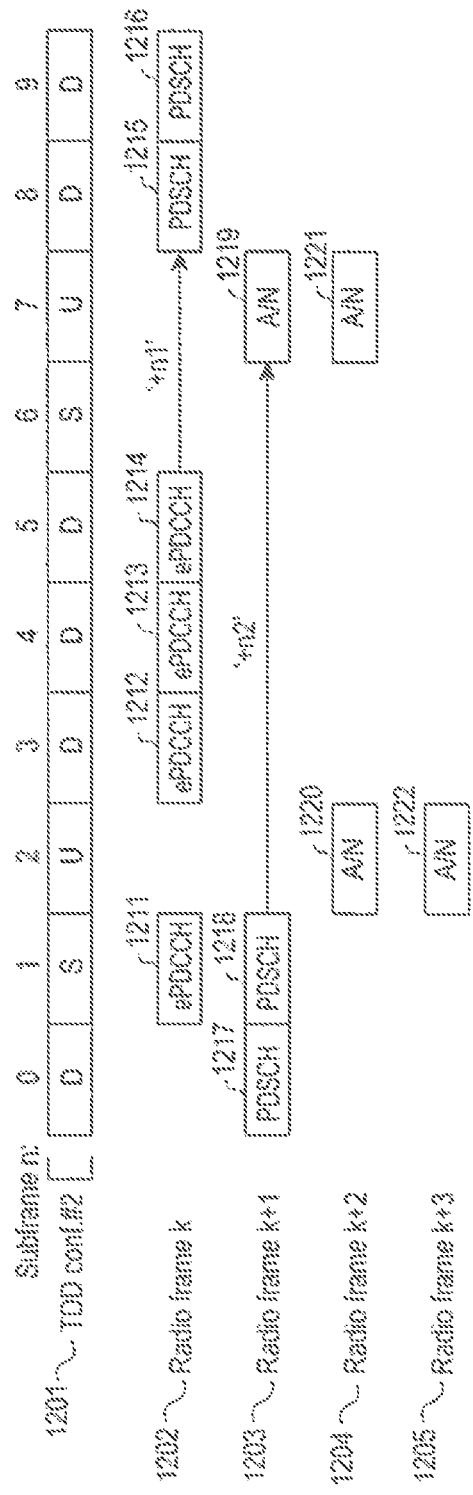
FIG. 12 is a view illustrating a method for transmitting a control channel according to an embodiment of the present disclosure.

FIG. 12 is a view illustrating a method for transmitting a control channel according to an embodiment of the present disclosure.

FIG. 12 exemplifies a static TDD-based LTE cell 1101. Although an example has been described in which the base station transmits uplink data scheduling information, an example where downlink data scheduling information is transmitted is described in connection with FIG. 12. Described is a scheme in which the base station performs repetitive transmission on downlink data scheduling information on LTE cell, the base station performs repetitive transmission of downlink data according to the data transmission timing after the repetitive transmission of the scheduling information, and the terminal repeatedly transmits HARQ-ACKs according to HARQ-ACK transmission timings after the repetitive transmission of the downlink data. Specifically, the base station performs repetitive transmission of downlink data in the closest downlink subframe coming a predetermined number (n1) of subframes after the subframe where the repetitive transmission of downlink data scheduling information has been complete.

Downlink subframes and uplink subframes are configured in the cell 1201 according to TDD UL-DL configuration #2. The terminal may obtain TDD UL-DL configuration for the cell from system information (e.g., SIB information) or higher layer information (i.e., higher layer signaling). It is assumed that the terminal (e.g., a low-cost terminal) is always set in coverage enhancing mode, and in case it is set in the coverage enhancing mode, it may communicate data through reception transmission/reception. The coverage enhancing mode of the terminal may be set by a higher layer signaling from the base station, and the terminal always operating in the coverage enhancing mode may signal to the base station that it is always operating in the coverage enhancing mode. Or, the terminal may set itself to operate in the coverage enhancing mode through reception of system information or a random access procedure or the terminal may be set to operate in the coverage enhancing mode by the base station.

Repetitive transmission-related information on the base station and the terminal, e.g., repetitive transmission start subframe, repetitive transmission count, information on frequency resources for transmitting repetitive transmission channel, or information on groups of downlink or uplink subframes where repetitive transmission may be conducted, may be previously transmitted to the terminal or transmitted to the terminal via a L1 (Layer 1, physical layer) signal.

A group of uplink or downlink subframes may be a group of downlink subframes for transmission of, e.g., uplink or downlink scheduling. If the repetitive transmission-related information is transmitted to the terminal and configured, the terminal may attempt to detect PDCCH (or ePDCCH) for uplink or downlink scheduling only in at least one downlink subframe in the group of downlink subframes. Further, the terminal may also try to detect PDCCH (or ePDCCH) for uplink or downlink scheduling only in at least one downlink subframe within the group of downlink subframes also for the PDCCH (or ePDCCH) for scheduling retransmission data after repetitive transmission of uplink data by the uplink scheduling or repetitive transmission of downlink data by downlink scheduling.

In FIG. 12, it is assumed that a total of four times of repetitive transmission is set. Although the instant embodiment illustrates an example in which the uplink scheduling information, uplink data, and HARQ-ACK are set to have the same number of times of repetition, such pieces of information may be set to be different from each other by a higher layer signal or may be adjusted to be different dynamically by an L1 signal.

The base station transmits downlink data scheduling information to the terminal through repetitive transmission in subframe #1, subframe #3, subframe #4, and subframe #5 of radio frame k 1202 (1211, 1212, 1213, and 1214). Although examples 1211, 1211, 1213, and 1214 have been described in connection with FIG. 12, where downlink scheduling information is transmitted in continuous downlink subframes, repetitive transmission of downlink scheduling information may also be performed in only downlink subframes within the group of downlink subframes where the configured repetitive transmission may be performed by a higher signal.

In FIG. 12, the repetitive transmission of downlink data scheduling information has been complete in subframe #5 of radio frame k 1202, and the base station starts the transmission of downlink data in the closest downlink subframe coming n1 subframes after subframe #5 of radio frame k 1202 (i.e., subframe #8 of radio frame k 1202) (1215). n1 may be set as one of multiple values by a higher layer signal or may be fixed to a particular value by a standard. For example, n1 may be fixed to 3.

After the repetitive transmission (1215) of downlink data is initiated by the base station in subframe #8 of radio frame k 1202, the base station performs repetitive transmission of downlink data in subframe #9 of radio frame k 1202 and subframe #0 and subframe #1 of radio frame k+1 1203 as many times as the remaining repetition count (1216, 1217, and 1218).

The following two schemes are proposed for timings for performing HARQ-ACK repetitive transmission by the terminal for the downlink data transmission.

A first scheme is to perform HARQ-ACK repetitive transmission from subframe #7 of radio frame k+1 1203, which is the closest uplink subframe coming n2 subframes after subframe #1 of radio frame k+1 1203. n2 may be set as one of multiple values by a higher layer signal or may be fixed to a particular value by a standard. For example, n2 may be fixed to 4. Accordingly, the terminal may start HARQ-ACK repetitive reception from subframe #7 of radio frame k+1 1203 (1219). The terminal may perform HARQ-ACK repetitive transmission in subframe #2 and subframe #7 of radio frame k+2 1204 and subframe #2 of radio frame k+3 1205 as many times as the remaining repetition count (1220, 1221, and 1222).

The second scheme is that the terminal determines an uplink subframe for HARQ-ACK transmission from the subframe where downlink data repetitive transmission is complete based on DL-reference UL/DL configuration. The DL-reference UL/DL configuration is a TDD UL-DL configuration received from system information when no enhanced interference management and traffic adaption (eIMTA) is configured or when the terminal does not support the eIMTA or may be eimta-HarqReferenceConfig-r12 defining an uplink HARQ-ACK timing for repetitive transmission of downlink data received from a higher signal when the eIMTA is supported and configured. For example, in case the terminal does not support the eIMTA or has no eIMTA configured, when the DL-reference UL/DL configuration is #2, n2 defined in subframe #1 is 6. Accordingly, HARQ-ACK repetitive transmission may be performed from subframe #7 that is the subframe coming six subframe #s after subframe #1 (1219). The terminal may perform HARQ-ACK repetitive transmission in subframe #2 and subframe #7 of radio frame k+2 1204 and subframe #2 of radio frame k+3 1205 as many times as the remaining repetition count (1220, 1221, and 1222). As another example, in case the eIMTA is configured in the terminal and supported, when the DL-reference UL/DL configuration is #5, n2 defined in subframe #1 is 11. Accordingly, repetitive transmission of HARQ-ACKs may be performed from uplink subframe #2 of radio frame k+2 1204, which is the subframe coming 11 subframes after subframe #1 of radio frame k+1 1203 (1220).

Further, in the embodiment shown in FIG. 12, since repetitive transmission of the same downlink data is performed in each subframe, there is no need of HARQ-ACK multiplexing transmission through time domain bundling in the TDD cell, and the terminal may transmit PUCCH format 1a/1b upon transmission of HARQ-ACK. The transmission resource of PUCCH format 1a/1b may be determined in association with the PRB or subband index of the (E)PDCCH first transmitted or PRB or subband index of the (E)PDCCH transmitted last. Or, the transmission resource of PUCCH format 1a/1b may also be determined through the PRB or subband index of all (E)PDCCHs transmitted repeatedly.

Figure 13:
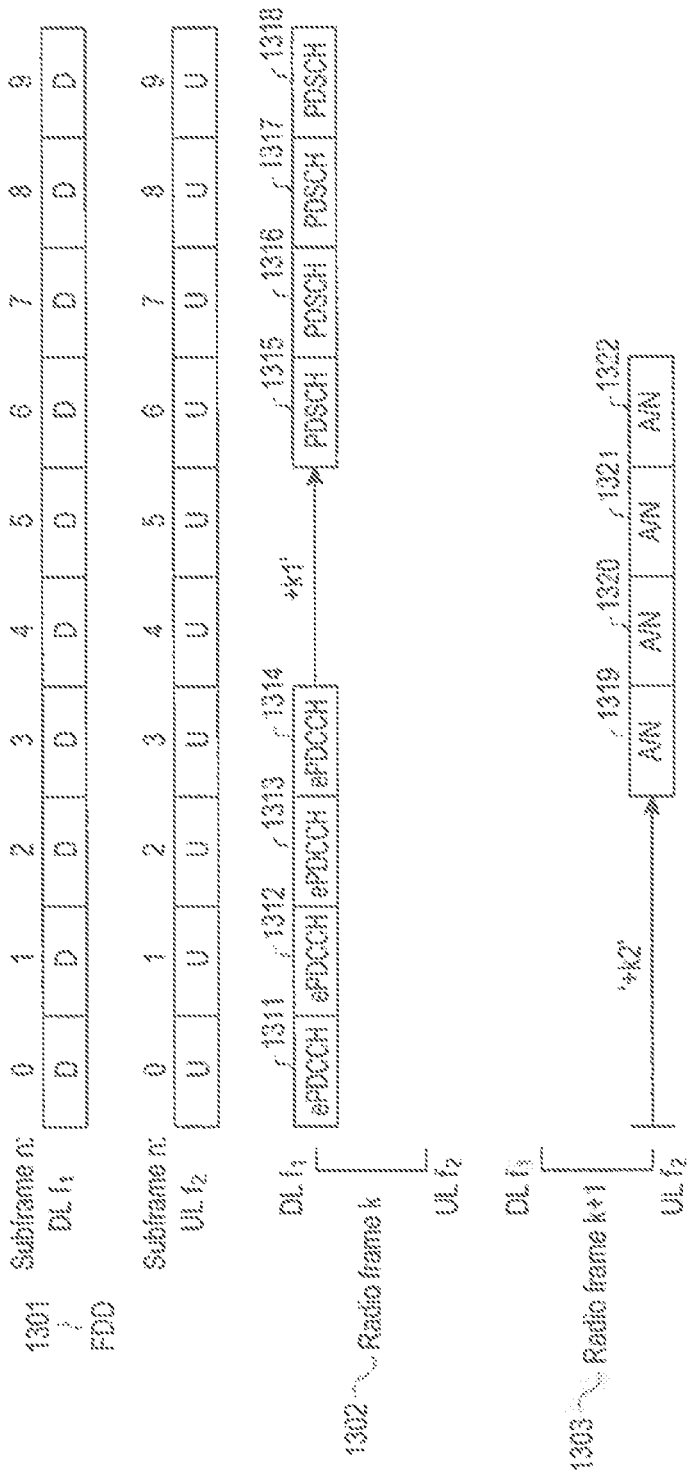
FIG. 13 is a view illustrating a method for transmitting a control channel according to an embodiment of the present disclosure.

FIG. 13 is a view illustrating a method for transmitting a control channel according to an embodiment of the present disclosure.

FIG. 13 exemplifies a FDD-based LTE cell 1301. FIG. 13 illustrates an example in which in the FDD cell the base station transmits downlink data scheduling information. The cell 1301 is of FDD type and has a downlink frequency f1 and an uplink frequency f2. The base station performs repetitive transmission of downlink data scheduling information in the downlink subframe of DL cell f1, after the repetitive transmission of scheduling information is ended, performs downlink data repetitive transmission according to the data transmission timing, and after the transmission of downlink data is ended, repeatedly transmits HARQ-ACKs in uplink subframes of UL cell f2 depending on the HARQ-ACK transmission timing. Specifically, the base station performs downlink data transmission in the downlink subframe k1 subframes after the subframe where the repetitive transmission of the scheduling information has been complete.

The terminal may obtain the downlink frequency f1 while performing cell search and may obtain the uplink frequency f2 by receiving system information from the base station. It is assumed that the terminal (e.g., a low-cost terminal) is always set in coverage enhancing mode, and in case it is set in the coverage enhancing mode, it may communicate data through reception transmission/reception. The coverage enhancing mode of the terminal may be set by a higher layer signaling from the base station, and the terminal always operating in the coverage enhancing mode may signal to the base station that it is always operating in the coverage enhancing mode. Or, the terminal may set itself to operate in the coverage enhancing mode through reception of system information or a random access procedure or the terminal may be set to operate in the coverage enhancing mode by the base station.

Repetitive transmission-related information on the base station and the terminal, e.g., repetitive transmission start subframe, repetitive transmission count, information on frequency resources for transmitting repetitive transmission channel, or information on groups of downlink or uplink subframes where repetitive transmission may be conducted, may be previously transmitted to the terminal or transmitted to the terminal via a L1 (Layer 1, physical layer) signal.

A group of uplink or downlink subframes may be a group of downlink subframes for transmission of, e.g., uplink or downlink scheduling. If the repetitive transmission-related information is transmitted to the terminal and configured, the terminal may attempt to detect PDCCH (or ePDCCH) for uplink or downlink scheduling only in at least one downlink subframe in the group of downlink subframes. Further, the terminal may also try to detect PDCCH (or ePDCCH) for uplink or downlink scheduling only in at least one downlink subframe within the group of downlink subframes also for the PDCCH (or ePDCCH) for scheduling retransmission data after repetitive transmission of uplink data by the uplink scheduling or repetitive transmission of downlink data by downlink scheduling.

In FIG. 13, it is assumed that a total of four times of repetitive transmission is set. Although the instant embodiment illustrates an example in which the uplink scheduling information, uplink data, and HARQ-ACK are set to have the same number of times of repetition, such pieces of information may be set to be different from each other by a higher layer signal or may be adjusted to be different dynamically by an L1 signal.

The base station transmits downlink data scheduling information to the terminal through repetitive transmission in subframe #0, subframe #1, subframe #2, and subframe #3 of radio frame k 1302 (1311, 1312, 1313, and 1314). Although examples 1311, 1312, 1313, and 1314 have been described herein, where downlink scheduling information is transmitted in continuous downlink subframes, repetitive transmission of downlink scheduling information may also be performed in only downlink subframes within the group of downlink subframes where the configured repetitive transmission may be performed by a higher signal.

In FIG. 13, the repetitive transmission of downlink data scheduling information has been complete in subframe #3 of radio frame k 1302, and the transmission of downlink data is started in the downlink subframe coming k1 subframes after subframe #3 of radio frame k 1302 (i.e., subframe #6 of radio frame k 1302) (1315). k1 may be set as one of multiple values by a higher layer signal or may be fixed to a particular value by a standard. For example, k1 may be fixed to 3.

After the repetitive transmission (1315) of downlink data is initiated by the base station in subframe #6 of radio frame k 1302, the base station performs repetitive transmission of downlink data in subframe #7, subframe #8, and subframe #9 of radio frame k 1302 as many times as the remaining repetition count (1316, 1317, and 1318).

Next, repetitive transmission of HARQ-ACKs is started from subframe #3 of radio frame k+1 1303 which is the uplink subframe coming k2 subframes after subframe #9 of radio frame k 1302. k2 may be set as one of multiple values by a higher layer signal or may be fixed to a particular value by a standard. For example, k2 may be fixed to 4. Here, the terminal may perform HARQ-ACK repetitive transmission from subframe #3 of radio frame k 1302 (1319). The terminal may perform HARQ-ACK repetitive transmission in subframe #4, subframe #5, and subframe #6 of radio frame k+1 1303 as many times as the remaining repetition count (1320, 1321, and 1322).

Figure 14:
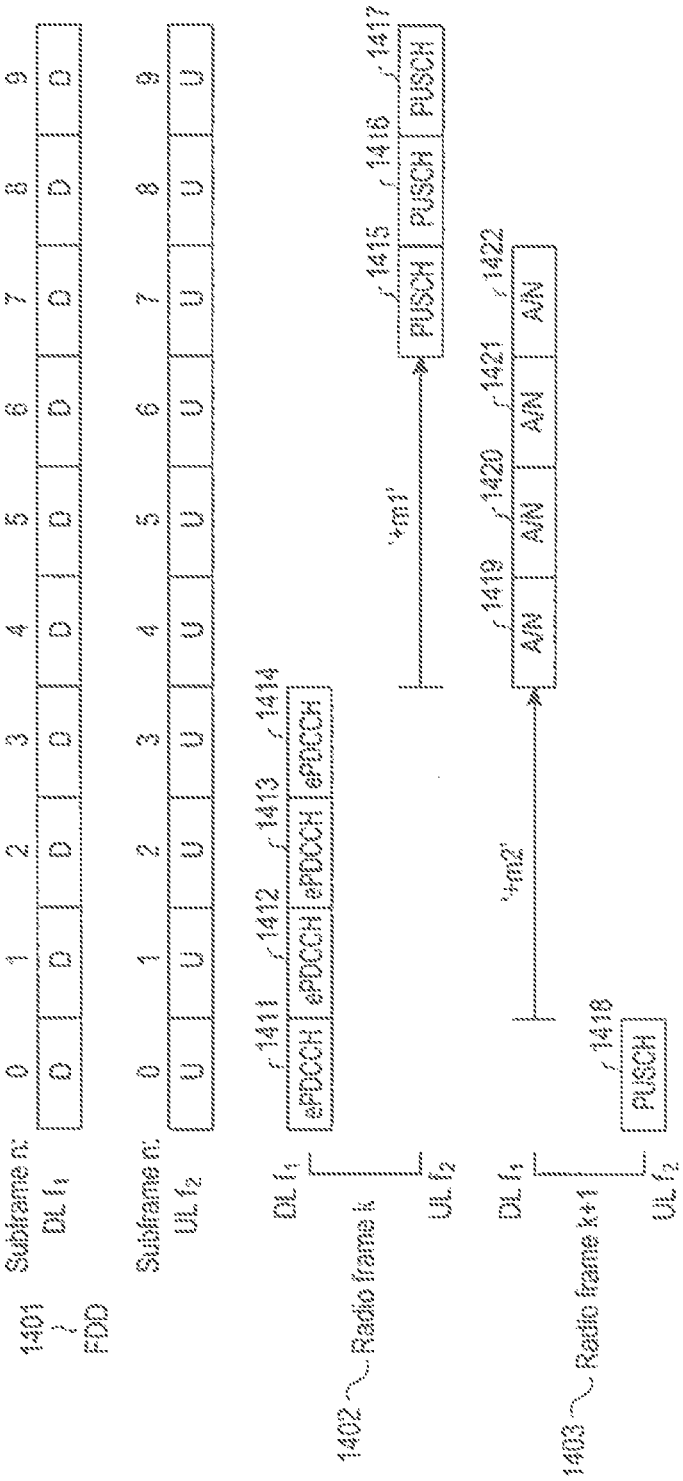
FIG. 14 is a view illustrating a method for transmitting a control channel according to an embodiment of the present disclosure.

FIG. 14 is a view illustrating a method for transmitting a control channel according to an embodiment of the present disclosure.

FIG. 14 exemplifies a FDD-based LTE cell 1401. FIG. 14 illustrates an example in which in the FDD cell the base station transmits uplink data scheduling information. The cell 1301 is of FDD type and has a downlink frequency f1 and an uplink frequency f2. Described is a scheme in which the base station performs repetitive transmission of uplink data scheduling information in the downlink subframe of DL cell f1, the terminal performs uplink data repetitive transmission in the uplink subframe of UL cell f2 according to the new uplink HARQ timing, and the base station performs HARQ transmission according to the new uplink HARQ timing. Specifically, the base station performs uplink data repetitive transmission in the uplink subframe m1 subframes after the subframe where the repetitive transmission of the uplink data scheduling information has been complete.

The terminal may obtain the downlink frequency f1 while performing cell search and may obtain the uplink frequency f2 by receiving system information from the base station. It is assumed that the terminal (e.g., a low-cost terminal) is always set in coverage enhancing mode, and in case it is set in the coverage enhancing mode, it may communicate data through reception transmission/reception. The coverage enhancing mode of the terminal may be set by a higher layer signaling from the base station, and the terminal always operating in the coverage enhancing mode may signal to the base station that it is always operating in the coverage enhancing mode. Or, the terminal may set itself to operate in the coverage enhancing mode through reception of system information or a random access procedure or the terminal may be set to operate in the coverage enhancing mode by the base station.

Repetitive transmission-related information on the base station and the terminal, e.g., repetitive transmission start subframe, repetitive transmission count, information on frequency resources for transmitting repetitive transmission channel, or information on groups of downlink or uplink subframes where repetitive transmission may be conducted, may be previously transmitted to the terminal or transmitted to the terminal via a L1 (Layer 1, physical layer) signal.

A group of uplink or downlink subframes may be a group of downlink subframes for transmission of; e.g., uplink or downlink scheduling. If the repetitive transmission-related information is transmitted to the terminal and configured, the terminal may attempt to detect PDCCH (or ePDCCH) for uplink or downlink scheduling only in at least one downlink subframe in the group of downlink subframes. Further, the terminal may also try to detect PDCCH (or ePDCCH) for uplink or downlink scheduling only in at least one downlink subframe within the group of downlink subframes also for the PDCCH (or ePDCCH) for scheduling retransmission data after repetitive transmission of uplink data by the uplink scheduling or repetitive transmission of downlink data by downlink scheduling.

In FIG. 14, it is assumed that a total of four times of repetitive transmission is set. Although the instant embodiment illustrates an example in which the uplink scheduling information, uplink data, and HARQ-ACK are set to have the same number of times of repetition, such pieces of information may be set to be different from each other by a higher layer signal or may be adjusted to be different dynamically by an L1 signal.

The base station transmits uplink data scheduling information to the terminal through repetitive transmission in subframe #0, subframe #1, subframe #2, and subframe #3 of radio frame k 1402 (1411, 1412, 1413, and 1414). Although examples 1411, 1412, 1413, and 1414 have been described herein, where uplink scheduling information is transmitted in continuous downlink subframes, repetitive transmission of uplink scheduling information may also be performed in only downlink subframes within the group of downlink subframes where the configured repetitive transmission may be performed by a higher signal.

In FIG. 14, the repetitive transmission has been complete in subframe #3 of radio frame k 1402, and the terminal performs the repetitive transmission of uplink data in the uplink subframe coming m1 subframes after subframe #3 of radio frame k 1402 (i.e., subframe #7 of radio frame k 1402) (1415). m1 may be set as one of multiple values by a higher layer signal or may be fixed to a particular value by a standard. For example, m1 may be fixed to 4.

After the repetitive transmission (1415) of uplink data is initiated by the terminal in subframe #7 of radio frame k 1402, the terminal performs repetitive transmission of uplink data in subframe #8 and subframe #9 of radio frame k 1402 and subframe #0 of radio frame k+1 1403 as many times as the remaining repetition count (1416, 1417, and 1418).

Next, repetitive transmission of HARQ-ACKs (ACKs/NACKs for UL grants which are transmitted through ePDCCH, MPDCCH, or M-PDCCH) is started from the downlink subframe (i.e., subframe #4 of radio frame k+1 1403) coming m2 subframes after subframe #0 of radio frame k+1 1403. Or, repetitive transmission of HARQ-ACKs (ePDCCH) may be performed from the closest subframe in the group of downlink subframes where the configured repetitive transmission may be performed by a higher layer signal among the subframes coming m2 subframes after subframe #0 of radio frame k+1 1403. Here, the terminal will detect HARQ-ACK (ePDCCH) only in the subframes within the subframe group. m2 may be set as one of multiple values by a higher layer signal or may be fixed to a particular value by a standard. For example, m2 may be fixed to 4. Accordingly, the base station performs HARQ-ACK (ePDCCH) repetitive transmission from subframe #4 of radio frame k+1 1403 (1419). The base station performs HARQ-ACK (ePDCCH) repetitive transmission in subframe #5, subframe #6, and subframe #7 of radio frame k+1 1403 as many times as the remaining repetition count (1420, 1421, and 1422).

Any one or both of the determination of uplink transmission start subframe based on the uplink data scheduling information transmission subframes as described in connection with FIG. 14 (ePDCCH-to-PUSCH HARQ timing determination) and the determination of HARQ-ACK transmission start subframe based on uplink data transmission subframes (PUSCH-to-HARQ-ACK timing determination) may apply to the base station and the terminal.

In all of the above-described embodiments (FIGS. 5 to 14), since the same data is repeatedly transmitted in each subframe, the 'DL/UL downlink assignment index (DAI)' field and the 'HARQ process number' field defined in the (E)PDCCH of TDD cell may be reserved, fixed to a particular value (e.g., '0'), or the fields may be disregarded by the terminal regardless of what values are set thereto. Or, the (E)PDCCH may be configured without the fields, and the terminal may decode the (E)PDCCH assuming that the payload size of the (E)PDCCH except the fields.

In all of the above-described embodiments (FIGS. 5 to 14), since the same data may be repeatedly transmitted in each subframe, the 'redundancy version' field defined in the (E)PDCCH may be reserved, fixed to a particular value (e.g., '0'), or may be disregarded regardless of what values are set thereto. Or, the (E)PDCCH may be configured without the field, and the terminal may decode the (E)PDCCH assuming that the payload size of the (E)PDCCH except at least the 'redundancy version' field. During each repetitive transmission, the 'redundancy version' may be configured by a higher layer signal or fixed by a standard, and the terminal may decode data according to the redundancy version.

In all of the above-described embodiments (FIGS. 5 to 14), the value set for initial repetitive transmission may be reused as the 'redundancy version' for each retransmission, and the terminal may decode data according to the reused 'redundancy version.'

In all of the above-described embodiments (FIGS. 5 to 14), the number of times of repetitive transmission upon each retransmission may be set by a higher layer signal, and in case data reception fails upon initial repetitive transmission, a larger repetition count may be used upon repetitive transmission through retransmission. That is, the base station may set a repetition count that may be used upon repetitive transmission through retransmission for the terminal by a higher layer signal. Or, in case a larger repetition count is determined by a standard to be used upon repetitive transmission through retransmission, the base station may automatically perform repetitive transmission through retransmission at a larger repetition count, and the terminal may automatically attempt to decode using a larger repetition count upon repetitive reception through retransmission.

Figure 15A:
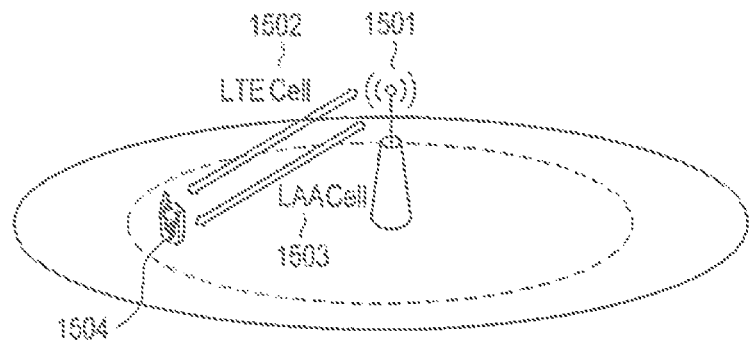
FIG. 15a is a view illustrating a communication network including an LAA cell to which the present disclosure applies.
Figure 15B:
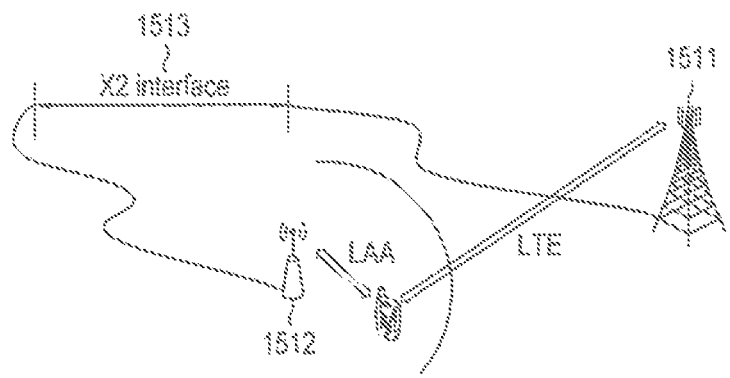
FIG. 15b is a view illustrating a communication network including an LAA cell to which the present disclosure applies.

FIGS. 15*a* and 15*b* are views illustrating a communication network including an LAA cell to which the present disclosure applies.

Considering that the number of licensed bands, such as LTE (this term is used to collectively refer to LTE-A or other advanced versions of LTE) frequency, is limited, it is being researched to provide LTE services on an unlicensed band such as 5 GHz band, and this is called licensed assisted access (LAA). In case LAA is adopted, what is considered is that carrier aggregation (CA) for LTE-A applies so that licensed band LTE cell is operated as a primary serving cell (Pcell), and unlicensed band LAA cell is operated as a secondary serving cell (Scell). Accordingly, like in LTE-A, feedbacks generated in the LAA cell that is an S Cell should be transmitted only from the P cell, and the FDD and TDD1 may apply to the LAA cell.

FIG. 15*a* illustrates an example in which an LTE cell 1502 and an LAA cell 1503 coexist in a single small-sized base station 1501 over a communication network.

The terminal 1504 communicates data with the base station through the LTE cell 1502 and the LAA cell 1503. In this case, there is no limitation on the duplex scheme (i.e., whether FDD or TDD) of the LTE cell 1502 or LAA cell 1503. However, uplink transmission may be performed only through the LTE cell 1502 in case the LTE cell 1502 is a Pcell.

FIG. 15*b* illustrates an example in which an LTE macro base station 1511 for larger coverage and an LAA small-sized base station 1512 for increasing data transmission are installed in a communication network.

There is no limitation on the duplex scheme of the LTE macro base station 1511 or LAA small-sized base station 1512. However, uplink transmission is performed only through the LTE base station 1511 in case the LTE base station 1511 is a Pcell. At this time, the LTE base station 1511 and the LAA base station 1512 are assumed to have an ideal backhaul network. Accordingly, fast inter-base station X2 communication 1513 is possible, and even when uplink transmission is made only to the LTE base station 1511, the LAA base station 1512 may receive relevant control information from the LTE base station 1511 in real-time via the X2 communication 1513. In the systems shown in FIGS. 15A and 15B, the LTE cell and LAA cell each may have a plurality of serving cells and they together may support up to 32 serving cells. Accordingly, the schemes proposed according to the present disclosure may apply to both the system of FIG. 15*a* and the system of FIG. 15*b*.

Meanwhile, in LTE Rel-12, up to five serving cells may be configured in the terminal by CA. The terminal is configured by higher layer information to periodically transmit channel information for data scheduling for the base station.

In the embodiment of the present disclosure, the operation of periodically transmitting control information is called 'periodic channel information transmission', and the 'periodic channel information' is transmitted through uplink control channel (physical uplink control channel, PUCCH) of Pcell. Further, each serving cell independently defines a periodic channel information transmission operation for terminals having CA configured. Types of information to be transmitted in the periodic channel information transmission operation include subband CQI, subband CQI and second PMI, wideband CQI and PMI (precoding matrix indicator), wideband first PMI, wideband CQI and second PMI, wideband CQI and first PMI and second PMI, RI (rank indicator), wideband CQI, RI and first PMI, RI and PTI (precoder type indicator).

Among the pieces of information, information to be transmitted according transmission modes by higher layer information is determined, and transmission information is set to have a period and offset by higher layer information.

In the periodic channel information transmission operation, in case in one subframe periodic channel information transmission times are the same, one subframe has been designed to transmit only periodic channel information for one serving cell through PUCCH of Pcell. Further, also in one serving cell, in case the transmission times of multiple pieces of channel information are identical in one subframe, only one piece of channel information has been designed to be transmitted. In this case, priority is set by the type of information to be transmitted or with a serving cell index, so that among the periodic channel information configured to be transmitted for multiple serving cells, only periodic channel information for one serving cell is transmitted while the periodic channel information for the other serving cells is discarded.

For example, in case transmission times for multiple pieces of channel information for one serving cell are identical, information including RI (rank indication) has a highest priority, and in case transmission times for channel information for multiple serving cells are identical, the one including RI or first PMI has a highest priority, and channel information of the serving cell including wideband CQI has a second highest priority. Further, in case pieces of channel information having the same priority are transmitted for different serving cells, the channel information of serving cell having a lower serving cell index has a higher priority. Indeed, since Rel-10 assumes scenario with two serving cell configurations, periodic channel information transmissions for multiple serving cells would not be highly likely to conflict with each other, and collision may be easily avoided as the base station sets different periodic channel information transmission periods or offsets for serving cells.

However, assuming a scenario with up to 32 serving cell configurations as in Rel-13, it is difficult to avoid collision between periodic channel information transmissions in multiple serving cells simply by allowing the base station to set different periodic channel information transmission periods or offsets for serving cells. Accordingly, the probability that channel information transmission times are identical in one subframe is well larger than that in Rel-12 Further, if the terminal transmits only one periodic channel information only in one serving cell while discarding periodic channel information for the remaining serving cells as defined in Rel-12, the Rel-13-based base station has difficulty doing optimal scheduling on the remaining serving cells, and this negative affects the volume of data transmitted to the terminal.

In case the base station transmits a UL grant including a non-periodic channel information request for transmission of channel information for multiple serving cells, it needs transmit UL grant whenever periodic channel information transmission times become identical in multiple serving cells or in one serving cell, this results in waste of PDCCH transmission resources and resultantly reduced PDCCH resources for scheduling other terminals in the base station. Accordingly, in case up to 32 serving cell configurations are supported for CA in Rel-13, a need comes along for a method for supporting periodic channel information transmission for as many serving cells as possible in one subframe without the need of PDCCH transmission resources.

According to the present disclosure, there are provided schemes for transmitting channel information on multiple serving cells by a terminal without wasting transmission resources of downlink control channels in a wireless communication system supportive of carrier aggregation.

In an embodiment of the present disclosure, UCI PUSCH transmission is described.

The transmission scheme proposed in this disclosure is called UCI PUSCH transmission in order to prevent loss of lots of channel information due to being identical in transmission time between multiple pieces of channel information when transmitting periodic channel information through PUCCH. The UCI PUSCH transmission according to the present disclosure is a method by which multiple pieces of channel information are transmitted through PUSCH.

The mode in which the terminal performs UCI PUSCH transmission may be set by a higher layer signal. According to an embodiment of the present disclosure, the higher layer signal is defined as UCIPUSCHmode. If UCIPUSCHmode is 0, i.e., if UCI PUSCH transmission mode is not configured, the terminal transmits only one channel information through PUCCH in one subframe when transmitting periodic channel information (it follows the Rel-12 operation). If UCIPUSCHmode is 1, i.e., if UCI PUSCH transmission mode is configured, UCI PUSCH transmission is configured in the terminal so that many pieces of channel information may be transmitted through PUSCH in one subframe. The higher layer signal UCIPUSCHmode may be replaced as the transmission resource for transmitting channel information (UCI) being configured by a higher layer signal. That is, the UCI PUSCH operation mode for the terminal may be configured by having the transmission resource for transmitting periodic channel information through PUSCH configured by a higher layer signal.

The UCI PUSCH operation by the terminal after the UCI PUSCH operation mode has been set by higher layer signal is activated as follows. First, in case the transmission times of two or more different pieces of channel information for one serving cell in one subframe are identical, UCI PUSCH is activated instead of PUCCH transmission. Next, in case the transmission times of two or more pieces of channel information for different serving cells in one subframe are identical, UCI PUSCH is activated instead of PUCCH transmission. At this time, the two or more pieces of channel information for different serving cells may be the same type of channel information or different types of channel information.

If UCI PUSCH is activated, the terminal multiplexes channel information for preset at least one or more serving cells by a preset method for transmitting through PUSCH. Here, the pieces of channel information may include all of the pieces of channel information according to the periodic transmission configuration made to be transmitted for each serving cell. As another example, it may include pieces of channel information that could not be transmitted as the channel information transmission times are identical, together with one piece of channel information that may be originally transmitted. The pieces of channel information may be multiplexed in the sequence depending on the type of channel information and serving cell index. That is, the terminal may sort the pieces of channel information per serving cell index, and the sorted pieces of channel information per serving cell index may be resorted and then multiplexed depending on the type of channel information. Or, the terminal may sort the pieces of channel information per type of channel information, and the sorted pieces of channel information per type may be resorted and multiplexed per serving cell index.

The channel information may be multiplexed, coded and modulated with a preset coding rate and modulation scheme, and may be transmitted to the base station through PUSCH over preset transmission resources. The coding rate, modulation scheme, and transmission resource, together with UCI PUSCH operation mode, may be set by higher layer signals. As another example, the coding rate, modulation scheme, and the position of initial resource, i.e., initial PRB start position, may be set by a higher layer signal, and the position of resource, i.e., the start position of PRB, may be set to be different by a predefined hopping pattern whenever each channel information transmission time comes identical. As inputs of the hopping pattern, radio network temporary identity (RNTI), subframe number, and position of initial resource may be used.

According to an embodiment of the present disclosure, serving cells performing UCI PUSCH transmission are described.

The serving cell for transmission of UCI PUSCH may be a Pcell. Since Pcell is set to transmit PUCCH, when two or more periodic channel information transmissions conflict, UCI PUSCH instead of PUCCH may be transmitted from Pcell, and pieces of uplink control information (UCI) transmitted through PUCCH when UCI PUSCH is transmitted may be transmitted through PUSCH (rather than through PUCCH), reducing PUCCH transmit power.

Alternatively, serving cell for UCI PUSCH transmission may be secondary cell (Scell). In this case, one Scell of multiple Scells may be chosen as the serving cell for transmission of UCI PUSCH based on the cell index. As an example, the Scell having the lowest cell index may be chosen as the serving cell for transmission of UCI PUSCH. If UCI PUSCH is transmitted in Scell, the UCI transmission procedure by the terminal may be simply defined. For example, when different TDD UL-DL configurations apply between different bands in inter-band TDD CA, since UCI transmission timings in Scell and Pcell differ, a new terminal procedure should be defined to have UCIs for Scell transmitted in Pcell. However, if UCIs for Scell are transmitted in Scell, no new terminal procedure needs to be defined.

Subsequently, described is a method for grouping serving cells and transmitting through uplink control channel.

Figure 16:
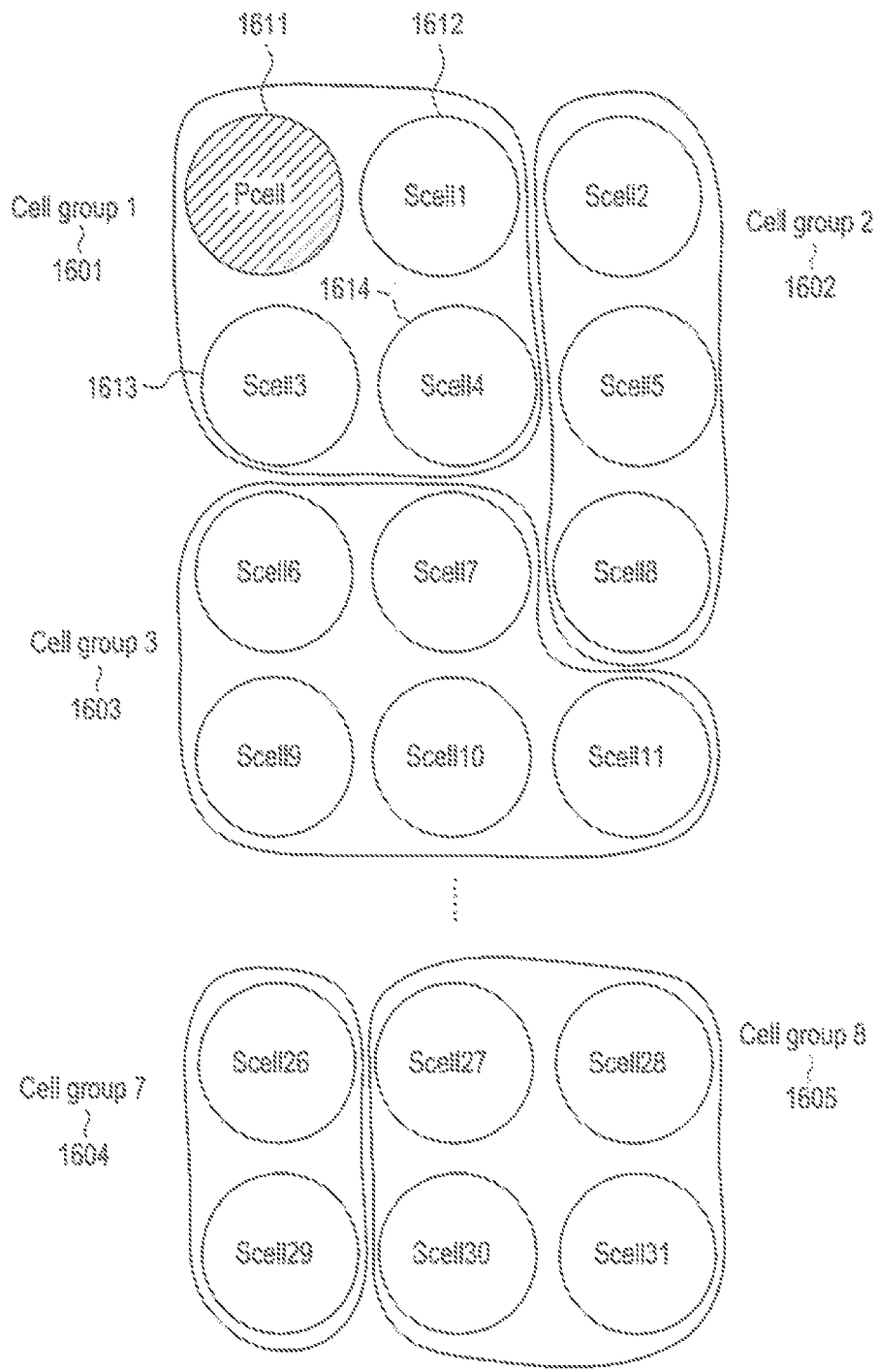
FIG. 16 is a view illustrating a method for transmitting channel information by grouping serving cells according to an embodiment of the present disclosure.

FIG. 16 is a view illustrating a method for transmitting channel information by grouping serving cells according to an embodiment of the present disclosure.

This method (rather than used when channel transmission times of different serving cells are identical) is a method in which serving cells are grouped to transmit the grouping information to the terminal through a higher layer signal, and the terminal transmits the same, together with channel information on the grouped serving cells, through uplink control channel.

The grouping information may indicate a group ID and at least one serving cell included in the group. The uplink control channel through which control information is transmitted may be a PUSCH that is an uplink data channel to transmit a great amount of feedback, and it may also be transmitted from the terminal through a new uplink control format.

Resource information on the PUSCH channel is previously transmitted from the base station to the terminal through a higher layer signal (higher layer signaling), and since the number of serving cells included in each group is already determined, the transmission resource information may be previously configured and transmitted to the terminal by a higher layer signal, and the terminal transmits channel information on the serving cell using the resource information. Accordingly, the transmission resource occupancy may be optimized without waste of transmission resources. The base station may set different transmission periods and offsets for different serving cell groups. As an example, the base station may choose and determine one of offsets and transmission periods of CQI transmission used in PUCCH transmission for the transmission periods and offsets of different serving cell groups. Accordingly, when PUSCH channel is transmitted, PUSCH transmissions including different groups of channel information may be avoided from being identical.

FIG. 16 illustrates an example in which a total of eight serving cell groups (e.g., 1601, 1602, 1603, 1604, and 1605) are configured for the terminal. The example shows that each cell group includes a different number of cells. Further, LAA cell which is unlicensed cell and LTE cell which is licensed cell may be bundled into one cell group, or they may be put in different cell groups. For example, the method of transmitting channel information through PUSCH by the cell grouping method may apply when the number of cells exceeds five, and in case there are five or less cells, channel information is transmitted through PUCCH, and in case at least two or more channel information transmission times are identical, one channel information may be transmitted while the others may be dropped.

Further, the transmission may be performed in different PUCCH formats depending on the amount of channel information supposed to be transmitted in one subframe. For example, in case the pieces of channel information supposed to be transmitted in one subframe may be transmitted in (legacy) PUCCH format 2, the terminal may transmit the channel information in PUCCH format 2, and in case the pieces of channel information supposed to be transmitted in one subframe are for multiple serving cells, the terminal may use a new PUCCH format or may perform the transmission through the PUSCH channel.

In case the pieces of channel information supposed to be transmitted by the terminal in one subframe exceeds the payload size in which the new PUCCH format may send out or the payload size that may be included in the PUSCH PRB upon transmission through the PUSCH channel, the terminal may drop the pieces of channel information regarding a particular cell group while transmitting only the pieces of channel information regarding the remaining cell groups. The selection of the cell group to be dropped may be performed based on the cell group index. As an example, there may be selected k cell groups (k is equal or larger than 1) having lower indexes including the cell group having the lowest cell group index among the cell groups where channel information should be transmitted or k cell groups having higher indexes including the cell group having the highest cell group index. k may be transmitted to the terminal through a higher layer signal, determined by an equation or table, or may be previously determined as a constant. For example, when there is a group of serving cells whose cell group indexes are 1, 2, and 3, if the payload size in which the new PUCCH format may be sent out may include two cell groups, and a higher cell group index is rendered to be dropped, the pieces of channel information on the serving cells with cell group indexes 1 and 2 may be transmitted in the new PUCCH format (or through PUSCH), and the pieces of channel information on the serving cells with cell group index 3 may be dropped.

If the payload size in which transmission may be performed in the new PUCCH format (or through PUSCH) may include channel information on some serving cells of the cell group to be dropped, the channel information on some serving cells of the cell group to be dropped may be additionally transmitted. The selection of some serving cells may be performed depending on the importance of channel information (e.g., RI>wideband CQI>subband CQI), and if the pieces of channel information have the same importance, the selection may be performed depending on serving cell indexes (e.g., a lower index indicates a higher importance). Channel information on serving cells that cannot be transmitted is dropped.

Figure 17:
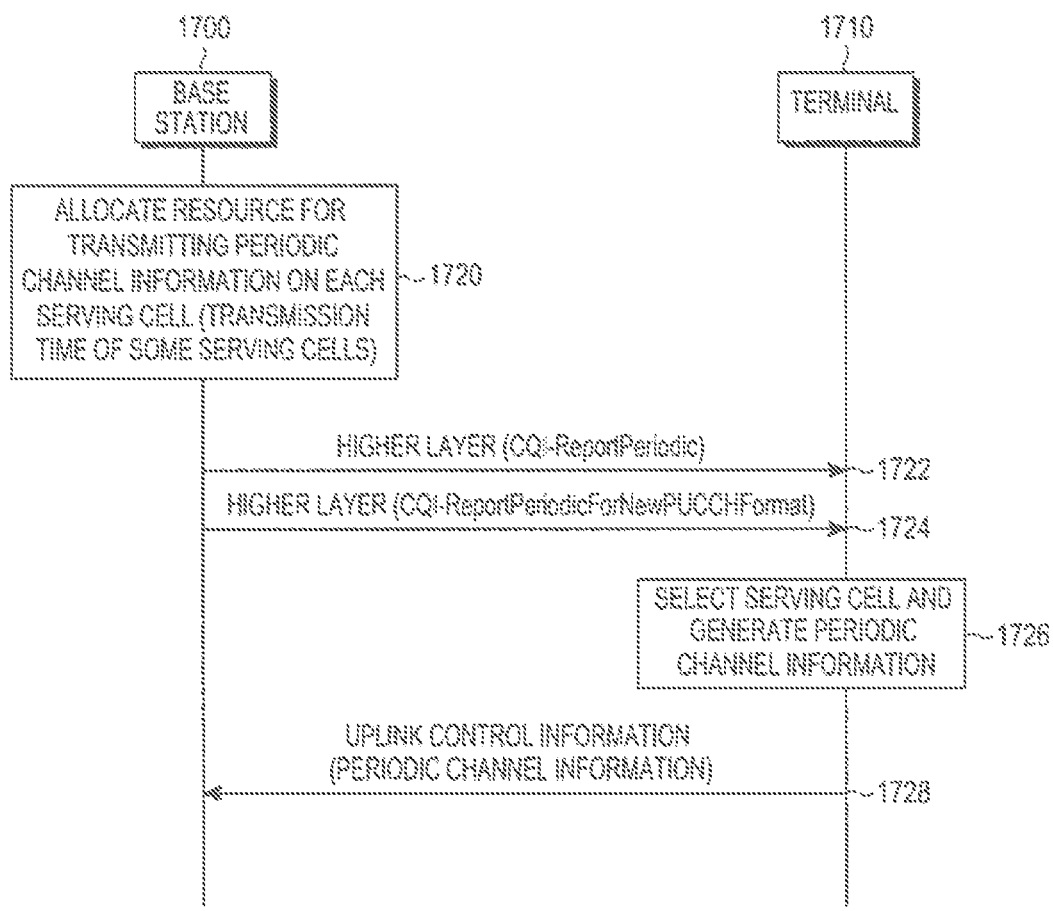
FIG. 17 is a view illustrating a method for communicating periodic channel information by a base station and a terminal according to an embodiment of the present disclosure.

FIG. 17 is a view illustrating a method for communicating periodic channel information by a base station and a terminal according to an embodiment of the present disclosure.

Described with reference to FIG. 17 is a method for setting a transmission period and offset for periodic channel information transmission of each serving cell according to an embodiment of the present disclosure. The base station may have the same effect as that obtained by grouping serving cells in the embodiment described in connection with FIG. 16 by setting a transmission period and offset for periodic channel information transmission of a serving cell.

This embodiment is a method of making the channel information transmission times of different serving cells consistent with one another, so that when the pieces of channel information of the serving cells collide with each other in one subframe, the terminal also transmits the pieces of channel information of the serving cells through uplink control channel.

In the method according to this embodiment, the operations exemplified in FIG. 17 may be selectively included, and this embodiment need not be practiced in such a way that all of the operations are included.

The base station 1700 may allocate resources for transmission of periodic channel information of each serving cell (1720). At this time, the base station 1700 may make the channel information transmission times of some serving cells consistent with one another.

Although the base station makes a configuration so that channel information transmission periods and offsets of different serving cells are the same, the base station may transmit at least one higher layer signal to the terminal to prevent the terminal to transmit only channel information of one cell while dropping the others (1722 and 1724). The higher layer signal is a signal instructing the terminal to together multiplex and transmit all pieces of channel information even when the base station makes a configuration so that channel information transmission periods and offsets of different serving cells are the same. The higher layer signal transmitted from the base station may be either or both of a configuration of uplink control format allowing a great amount of feedback to be transmitted through uplink control channel (including resource configuration, channel information transmission period, and offset information for transmission of uplink control format) and a configuration of uplink control channel having an uplink data channel structure (including resource configuration, channel information transmission period, and offset information for transmission of uplink control channel), or it may be a particular signal through a higher layer signal.

The terminal 1710 having received the higher layer signal may select at least one serving cell among multiple serving cells and generate periodic channel information of the selected serving cell (1726).

The terminal 1710 may transmit the control information (UCI) including the generated periodic channel information on uplink through the resource indicated by the higher layer signal (1728).

According to the present disclosure, the higher layer signal for configuration of uplink control channel having the uplink data channel structure is referred to as CQI-ReportPeriodicForNewPUCCHFormat 1724, and the higher layer signal for configuration of uplink control format is referred to as CQI-ReportPeriodic 1722.

CQI-ReportPeriodicForNewPUCCHFormat 1724 may be configured in addition to the higher layer signal (CQI-ReportPeriodic 1722 including the resource configuration for PUCCH format 2 transmission) for PUCCH format 2, which is an uplink control format allowing the terminal to transmit the channel information of only one cell.

In case CQI-ReportPeriodicForNewPUCCHFormat 1724 and CQI-ReportPeriodic 1722 are simultaneously configured (or on and activated at the same time), the terminal 1710 may determine whether the pieces of channel information of multiple cells should be simultaneously transmitted in one subframe. In case the pieces of channel information of multiple cells are not required to be simultaneously transmitted and rather the channel information of only one cell should be transmitted, the terminal 1710 transmits the periodic channel information of the single cell according to the transmission resource of PUCCH format 2 configured in CQI-ReportPeriodic 1722, and in case the pieces of channel information of the multiple cells should be simultaneously transmitted, the terminal 1710 may multiplex and transmit the pieces of channel information of the multiple cells according to the transmission resource of the 'new PUCCH format' configured in CQI-ReportPeriodicForNewPUCCHFormat 1724.

Further, in case only CQI-ReportPeriodicForNewPUCCHFormat 1724 is configured (or on and activated), and CQI-ReportPeriodic 1722 is not (or off and deactivated), the terminal 1710 may always transmit pieces of channel information according to the transmission resource of the new PUCCH format configured in CQI-ReportPeriodicForNewPUCCHFormat 1724 regardless of whether the pieces of channel information of the multiple cells should be simultaneously transmitted in one subframe or the channel information of only one cell should be transmitted.

Further, in case CQI-ReportPeriodicForNewPUCCHFormat 1724 is not configured (or set to be off and deactivated), and CQI-ReportPeriodic 1722 is configured (or on and activated), if the pieces of channel information of multiple cells should be simultaneously transmitted in one subframe, the terminal 1710 may select and transmit the channel information of a cell with the highest priority according to the transmission resource of PUCCH format 2 configured in CQI-ReportPeriodic 1722. In case the pieces of channel information of multiple cells are not required to be simultaneously transmitted and the channel information of only one cell should be transmitted, the terminal 1710 may transmit the channel information of the single cell according to the transmission resource of PUCCH format 2 configured in CQI-ReportPeriodic 1722.

The base station 1700 may make a setting using the above-exemplified higher layer signal 1724 or 1722 so that the periods and offsets of transmission of periodic pieces of channel information of different serving cells which should together receive pieces of channel information in one subframe are the same (1720). The base station 1700 allows the periodic channel information transmission times (i.e., periods and offsets) of the serving cells to be consistent, allowing for such an effect as if the base station 1700 intentionally grouped the serving cells that desire to simultaneously receive the pieces of channel information. The uplink control channel through which control information is transmitted may be a PUSCH that is an uplink data channel to transmit a great amount of feedback, and it may also be transmitted through a new uplink control format defined by the higher layer signal.

The resource information of PUSCH channel may be previously transmitted from the base station 1700 to the terminal 1710 via the higher layer signal 1724 or 1722. Since the number of serving cells whose periodic channel information transmission times have been intentionally rendered to be identical is previously determined by the base station 1700, it is possible to previously configure resource information of PUSCH channel and to transmit the resource information to the terminal 1710 via the higher layer signal 1724 or 1722. Accordingly, the terminal 1710 may transmit periodic channel information of the serving cells using the resource information. Accordingly, the base station 1700 may optimize the transmission resource occupancy without waste of transmission resources.

As an example, the base station 1700 may make a setting so that the Pcell 1611, the Scell1 1612, the Scell3 1613, and the Scell4 1614 which are intended to be together received in one subframe as shown in FIG. 16 have the same period and offset of the periodic channel information transmission. Here, if the periodic channel information pieces of the serving cells are set to have the same transmission period and offset, the terminal 1710 does not drop depending on the priority of the periodic channel information pieces even when the periodic channel information pieces have the same transmission time, and may use a control channel format or PUSCH by which a great amount of control information may be transmitted to transmit together the periodic channel information pieces in one subframe.

In case the pieces of channel information supposed to be transmitted by the terminal 1710 in one subframe exceeds the payload size in which the new PUCCH format may send out or the payload size that may be included in the PUSCH PRB upon transmission through the PUSCH channel, the terminal 1710 may select a particular serving cell and may transmit the channel information of only the selected serving cell. The selection of the serving cell whose periodic channel information is to be transmitted by the terminal 1710 may be performed depending on the importance of channel information (e.g., RI>wideband CQI>subband CQI), and accordingly, if the pieces of channel information have the same importance, the selection may be performed depending on serving cell indexes (e.g., a lower index indicates a higher importance). The terminal 1710 may drop the channel information pieces of the serving cells which cannot be transmitted, rather than transmitting.

Now, the present disclosure proposes a specific method for defining transmission/reception operations by a low-cost terminal with a limited bandwidth regarding the bandwidth maximally processable within the whole channel bandwidth or system transmission bandwidth and operating normal LTE terminal and low-cost terminal in the same system.

Hereinafter, the frequency region defined by the bandwidth available by a low-cost terminal is referred to as a subband or narrowband.

Figure 18:
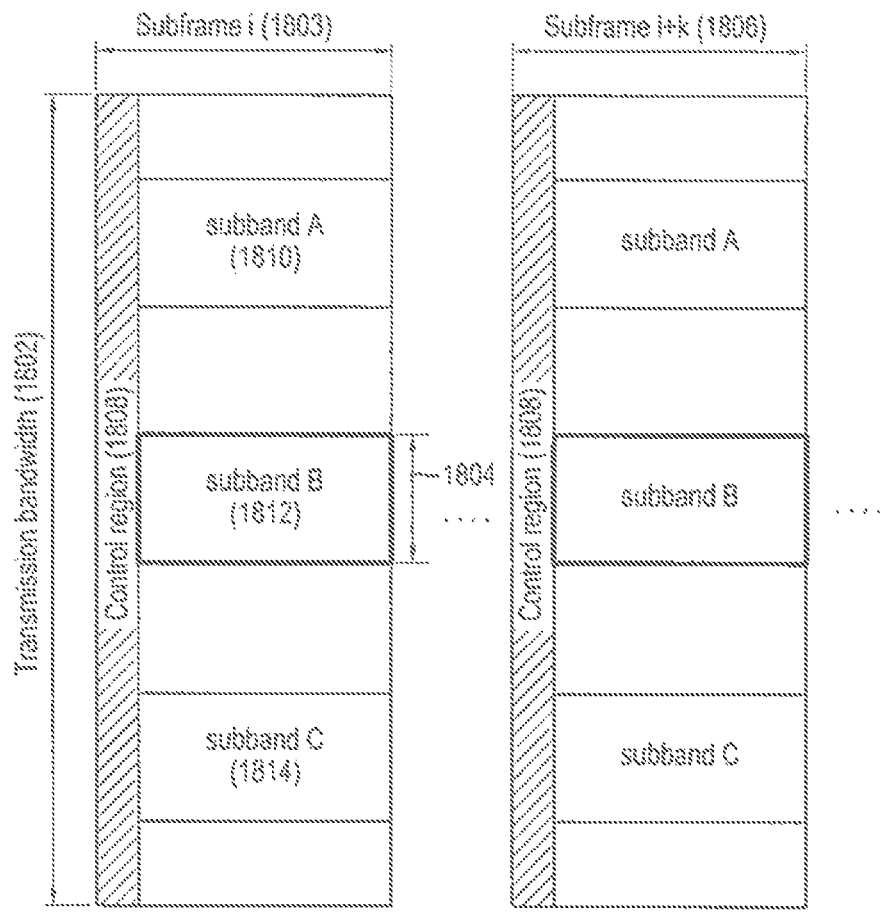
FIG. 18 is a concept view illustrating an example of configuring and operating subband where the low-cost terminal operates within the system transmission bandwidth according to an embodiment of the present disclosure.

FIG. 18 is a concept view illustrating an example of configuring and operating subband where the low-cost terminal operates within the system transmission bandwidth according to an embodiment of the present disclosure.

FIG. 18 illustrates a scheme of previously configuring and operating a subband where a low-cost terminal operates in the system transmission bandwidth.

The size 1804 of subband where the low-cost terminal operates cannot be larger than the system transmission bandwidth 1802, and is generally assumed as the minimum transmission bandwidth supported by the LTE system, i.e., 1.4 MHz (six consecutive PRBs). The subband is relatively a narrow band, and thus, the number of low-cost terminals supported with one subband may be limited. If the number of low-cost terminals to be supported by the system increases, a number of low-cost terminals may be simultaneously served by configuring/operating a plurality of subbands. FIG. 18 illustrates an example in which three subbands, i.e., subband A 1810, subband B 1812, and subband C 1814 are configured in the system transmission bandwidth.

The low-cost terminal performs data or control signal communication operation through one subband at some moment. Since control channels for normal terminals are broadband-transmitted over the system transmission bandwidth in the control channel region 1808 of each subframe, the low-cost terminal cannot receive the control channels for normal terminals. Here, the normal terminal is a terminal with its used transmission bandwidth not limited to the subband region and may refer to a normal LTE terminal. Control channels and data channels for low-cost terminal may be transmitted, mapped to the subband region except the control channel region 1808. Here, the control channel and data channel for low-cost terminal may be transmitted in the same or different subframes. In case the control channel and data channel for low-cost terminal are transmitted in different subframes, a relative time relation may be previously defined as a fixed value or may be known to the terminal through signaling by the base station.

Control channels for normal LTE terminal are spread over the system transmission bandwidth in the control channel region 1808, mapped, and transmitted, and data channels and EPDCCH for normal LTE terminal may be mapped and transmitted according to the scheduling operation by the base station in the remaining region except the subband where the low-cost terminal operates and the control channel region 1808. However, although a subband is assigned for low-cost terminal, in case control channel or data channel for low-cost terminal is not transmitted at some moment, the base station may use the subband as data channel for normal LTE terminal in order to efficiently utilize radio resources.

Subband control information such as the number or position of subbands may be previously configured and operated. The subband control information may be configured independently for downlink and uplink. Although FIG. 18 primarily illustrates for downlink, it would not harm the representation of overall concept for uplink. However, uplink does not include a separate control channel region like the control region 1808. The base station gives the subband control information to the low-cost terminal through signaling. The subband control information may be included in MIB (master information block) or SIB (system information block) for low-cost terminal or radio resource control (RRC) signaling for low-cost terminal. The signaling may be commonly known to a plurality of low-cost terminals. Accordingly, the base station need inform each low-cost terminal of the subband the terminal should specifically operate among the known subbands through individual additional signaling to each low-cost terminal. For example, low-cost terminal A may be set to operate on subband A 1810, low-cost terminal B on subband B 1812, and low-cost terminal C on subband C 1814. Accordingly, each low-cost terminal may perform transmission/reception operation only in designated subband.

While the low-cost terminal proceeds with initial access, the terminal may receive primary synchronization signal (PSS)/secondary synchronization signal (SSS) and physical broadcast channel (PBCH) that are transmitted, mapped with a middle 1.4 MHz band (e.g., the band corresponding to subband B 1812 in FIG. 18) in the system bandwidth. The low-cost terminal may detect the PSS/SSS to obtain time-frequency sync and cell ID and obtain necessary system information, MIB, through PBCH decoding. After the initial access is complete, the low-cost terminal switches frequency to the subband designated to the terminal and performs transmission/reception operation.

After the initial access is complete, the low-cost terminal may also perform time-frequency syncing, or to obtain MIB, it may perform PSS/SSS detection and PBCH decoding. For example, low-cost terminal A operating on subband A 1810, in order to obtain additional time-frequency sync or MIB after initial access, may stop operating on subband A 1810 and perform PSS/SSS detection and PBCH decoding on the middle 1.4 MHz band. Low-cost terminal A, after obtaining time-frequency sync or PBCH decoding, may resume operation on subband A 1810.

FIG. 18 illustrates an example in which the subband configuration for each low-cost terminal is maintained for a relatively long time. For example, subband configuration for low-cost terminal B remains at subband B 1812 without change from subframe i 1803 to subframe i+k 1806 (k>0). When desiring to change the subband configuration, the base station informs the terminal of change in subband configuration through the above-described MIB, SIB, RRC signaling or individual signaling to each low-cost terminal.

Although the low-cost terminal communicates data and control signals within a relatively small subband relative to the system transmission bandwidth, it may obtain system transmission bandwidth information and information on the number of CRS antenna ports for exact RE mapping of transmitted/received signals. CRS (cell-specific reference signal) is the reference signal (RS) that the base station transmits to the terminal to allow the terminal to reference in measuring downlink channel status or the base station transmits to the terminal to support operations by the terminal, such as channel estimation, upon transmission of downlink signals, and downlink data channel and control channel are mapped to other REs except the RE (resource element) where the CRS is mapped. The mapping pattern of CRS is determined depending on the number of transmit antennas of the base station and is defined as a logical antenna port. The low-cost terminal may be aware of the system transmission bandwidth information and the information on the number of CRS antenna ports through PBCH decoding.

Generally, in the LTE system, DCI per terminal has the same size if in the same DCI format. However, even if in the same DCI format, the size of DCI for low-cost terminal may be different from the size of DCI for normal terminal. That is, DCI for low-cost terminal may be configured compact to fit the size of subband where low-cost terminal operates. Accordingly, in case DCI for normal terminal and DCI for low-cost terminal are mapped to time-frequency resource of the same size, a relatively lower coding rate applies to the DCI for low-cost terminal (that is, error correction by channel coding is strongly reinforced), and thus, DCI for low-cost terminal may enjoy relatively more benefit in reception capability. Thus, the low-cost terminal assumes the DCI size determined depending on the size of subband, not the system transmission bandwidth, when performing DCI decoding. By contrast, the normal terminal assumes the DCI size determined depending on the system transmission bandwidth.

Figure 19:
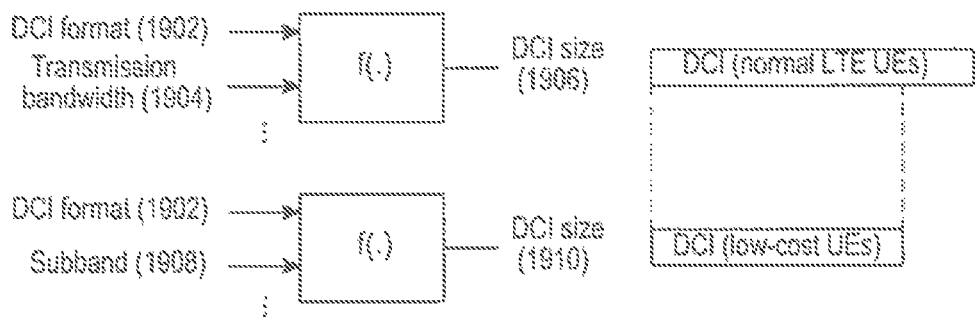
FIG. 19 is a concept view illustrating an example in which DCI size is varied depending on the type of terminal according to an embodiment of the present disclosure.

FIG. 19 is a concept view illustrating an example in which DCI size is varied depending on the type of terminal according to an embodiment of the present disclosure.

The DCI size may be determined to be different depending on the type of terminal (i.e., low-cost terminal or normal terminal). For normal terminal, DCI size 1906 is determined by DCI format 1902 or transmission bandwidth information 1904, and for low-cost terminal, DCI size 1910 is determined by DCI format 1902 or subband size 1908. The size 1908 of subband where the low-cost terminal operates is operated to be smaller than the system bandwidth 1904. Resultantly, even with the same DCI format, the DCI size 1910 of low-cost terminal is smaller than the DCI size 1906 of normal terminal.

Figure 20:
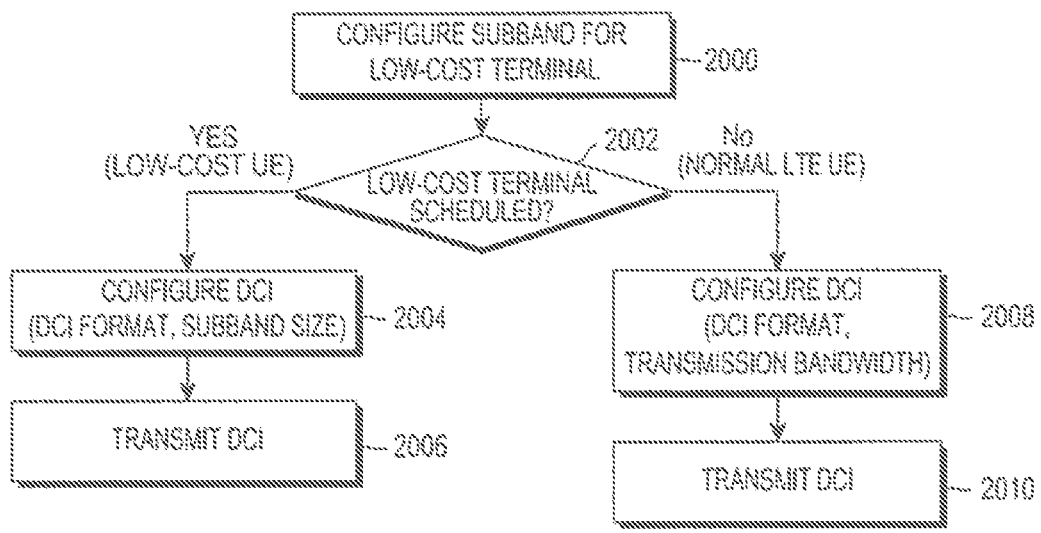
FIG. 20 is a view illustrating a scheduling procedure by a base station when a normal LTE terminal and a low-cost terminal co-exist in the same system according to an embodiment of the present disclosure.

FIG. 20 illustrates an example of a scheduling procedure by a base station when a normal LTE terminal and a low-cost terminal co-exist in the same system according to an embodiment of the present disclosure.

The procedure of base station described in connection with FIG. 18 is described in connection with FIG. 20.

In step 2000, the base station configures a subband where the low-cost terminal operates within the system transmission bandwidth and informs the low-cost terminal of that. The base station may configure and operate a plurality of subbands, and may notify the low-cost terminal of subband control information such as the number and position of subbands through higher layer signaling, such as MIB, SIB, or RRC signaling. Further, the base station may inform the low-cost terminal of the subband where each low-cost terminal operates through individual additional signaling.

In step 2002, when determining the scheduling for the terminal, the base station may determine whether the scheduling is for low-cost terminal or normal LTE terminal.

If the scheduling is for low-cost terminal, the base station configures DCI for low-cost terminal by referring to DCI format or subband size in step 2004. In step 2006, the base station transmits the configured DCI for low-cost terminal to the low-cost terminal through downlink control channel. The downlink control channel for the low-cost terminal may be transmitted, mapped to the time-frequency resource except the control channel region for normal LTE terminal within the subband where the low-cost terminal operates. The base station may configure and transmit downlink data for the low-cost terminal depending on the scheduling information indicated by the DCI.

If the scheduling is for normal LTE terminal, the base station configures DCI for normal LTE terminal by referring to DCI format or system transmission bandwidth in step 2008. Further in step 2010, the base station transmits the configured DCI to the normal LTE terminal through PDCCH or EPDCCH which is a downlink control channel for normal LTE terminal. The base station may configure and transmit downlink data for the normal LTE terminal depending on the scheduling information indicated by the DCI. PDCCH may be spread over the overall system transmission bandwidth 1802 during the control channel transmission period 1808 shown in FIG. 18 and may be mapped not overlapping for each terminal and may then be transmitted.

Figure 21:
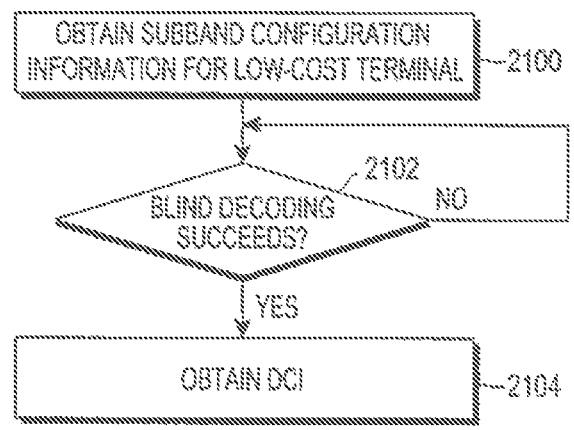
FIG. 21 is a view illustrating a procedure of obtaining DCI by a low-cost terminal operating according to an embodiment of the present disclosure.

FIG. 21 is a view illustrating a procedure of obtaining DCI by a low-cost terminal operating according to an embodiment of the present disclosure.

The procedure of the terminal exemplified in FIG. 18 is described in connection with FIG. 21.

In step 2100, the low-cost terminal obtains subband configuration information on the subband where the low-cost terminal operates from the base station and identifies the subband through which it performs transmission/reception operation with the base station.

In step 2102, the low-cost terminal attempts to obtain DCI through blind decoding on the downlink control channel for low-cost terminal within the subband obtained in step 2100.

If the low-cost terminal succeeds in the blind decoding, the low-cost terminal obtains detailed control information configuring the DCI in step 2104. If the obtained control information is downlink scheduling information, the low-cost terminal may receive downlink data channel for low-cost terminal by the scheduling information indicated by the DCI. If the obtained control information is uplink scheduling information, the low-cost terminal may transmit uplink data channel for low-cost terminal by the scheduling information indicated by the DCI.

If the low-cost terminal fails in the blind decoding, it may perform operation 2102 at the next time of blind decoding.

Figure 22:
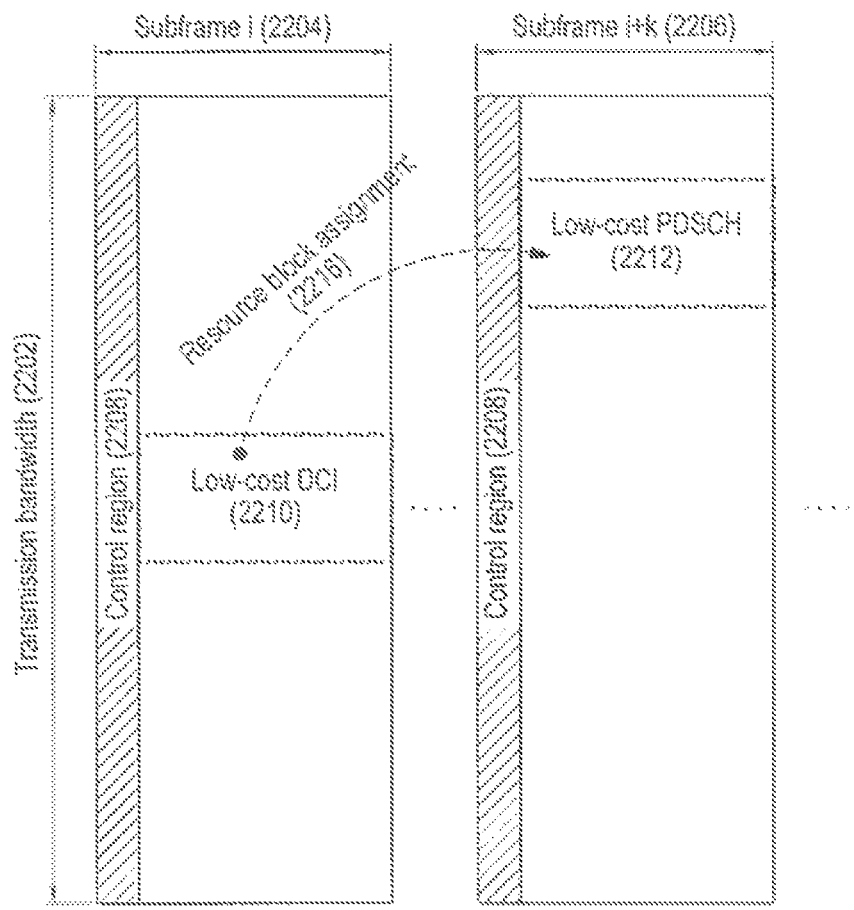
FIG. 22 is a concept view illustrating an example of operating without explicitly configuring a subband where a low-cost terminal operates in a system transmission bandwidth according to an embodiment of the present disclosure.

FIG. 22 is a concept view illustrating an example of operating without explicitly configuring a subband where a low-cost terminal operates in a system transmission bandwidth according to an embodiment of the present disclosure.

Referring to FIG. 22, a method of operating a low-cost terminal with a limited maximum processable bandwidth within the system transmission bandwidth without explicitly configuring a subband where the low-cost terminal operates is exemplified.

The low-cost terminal performs data or control signal communication operation within a maximally processable bandwidth at some moment. The size of the maximally processable bandwidth by the low-cost terminal cannot be larger than the system transmission bandwidth 2202, and is generally assumed as the minimum transmission bandwidth supported by the LTE system, i.e., 1.4 MHz (six consecutive PRBs). The base station, upon scheduling for the low-cost terminal, should not allocate RBs exceeding the maximally processable bandwidth of the low-cost terminal. If the low-cost terminal is allocated RBs exceeding the maximally processable bandwidth, the low-cost terminal determines that the scheduling information is wrong and disregards it. Since control channels for normal terminal are broadband transmitted over the system transmission bandwidth 2202 in the control channel region 2208 of each subframe, the low-cost terminal cannot receive the control channels for normal terminals. Control channels and data channels for low-cost terminal may be transmitted, mapped to the remaining region except the control channel region 2208. Although FIG. 22 primarily illustrates for downlink, it would not harm the representation of overall concept for uplink. However, uplink does not include a separate control channel region like the control channel region 2208.

In the instant embodiment, no separate subband is previously configured for low-cost terminal, and (in case the limitations for RB allocation are met), the freedom of resource utilization is advantageously larger than that in the embodiment described in connection with FIG. 18.

The low-cost terminal, while proceeding with initial access, may receive the PSS/SSS and PBCH transmitted, mapped with the middle 1.4 MHz band (e.g., the band corresponding to 2210 of FIG. 22) in the system bandwidth. The low-cost terminal may detect the PSS/SSS to obtain time-frequency sync and cell ID and obtain necessary system information, MIB, through PBCH decoding. After the initial access is complete, the low-cost terminal may also perform time-frequency syncing, or to obtain MIB, it may perform PSS/SSS detection and PBCH decoding.

As described in connection with the embodiment of FIG. 18, although the low-cost terminal communicates data and control signals within a relatively small bandwidth relative to the system transmission bandwidth, it may obtain system transmission bandwidth information and information on the number of CRS antenna ports for exact RE mapping of transmitted/received signals.

Unlike in FIG. 18, DCI size for low-cost terminal and DCI size for normal terminal if they are in the same DCI format are kept the same in FIG. 22. That is, the base station applies the consistent DCI configuration method regardless of the type of terminal (that is, regardless of whether the terminal is normal terminal or low-cost terminal), leading to minimized changes to the implementation of legacy base station and reduced complexity of base station implementation. The low-cost terminal assumes DCI size determined system transmission bandwidth, but not the maximum processable bandwidth of low-cost terminal when performing DCI decoding.

The resource information in the frequency domain which is mapped with downlink data or uplink data of the low-cost terminal may be provided from the base station to the low-cost terminal through 'resource block assignment' information 2216 configuring the DCI.

Referring to FIG. 22, the base station maps and transmits the DCI for the low-cost terminal in the DCI region 2210 of subframe i 2204 and maps and transmits the downlink data for the low-cost terminal in the PDSCH region 2212 of subframe i+k 2206 (k>0). The frequency band size of the DCI region 2210 and the PDSCH region 2212 cannot exceed the maximum processable bandwidth of the low-cost terminal.

The position of the PDSCH region 2212 which is mapped to the DCI region 2210 and transmitted may be indicated by 'resource block assignment' information 2216 transmitted through the DCI region 2210. The information on the DCI region 2210 which is in the frequency domain where the DCI is mapped and transmitted may be previously known to the low-cost terminal by the base station. k is determined considering the time taken for the low-cost terminal to change frequencies, and it may be a fixed value or may be known to the terminal by the base station through separate signaling. In case k=0, that is, in case the DCI and downlink data (PDSCH) are mapped to the same subframe and transmitted, the bandwidth sum of the DCI region 2210 and the PDSCH region 2212 cannot exceed the maximum processable bandwidth of the low-cost terminal.

Figure 23:
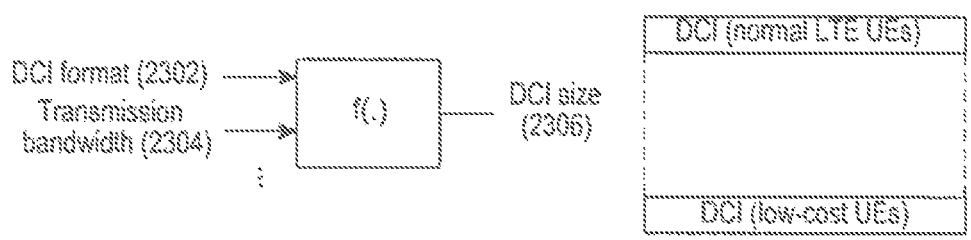
FIG. 23 is a concept view illustrating a method for determining a DCI size according to an embodiment of the present disclosure.

FIG. 23 is a concept view illustrating a method for determining a DCI size according to an embodiment of the present disclosure.

Based on the embodiment exemplified in FIG. 22, in FIG. 23, for both normal terminal and low-cost terminal, DCI size 2306 is determined by DCI format 2302 and transmission bandwidth 2304. Resultantly, if in the same DCI format, DCI size for low-cost terminal and DCI size for normal terminal are the same.

Figure 24:
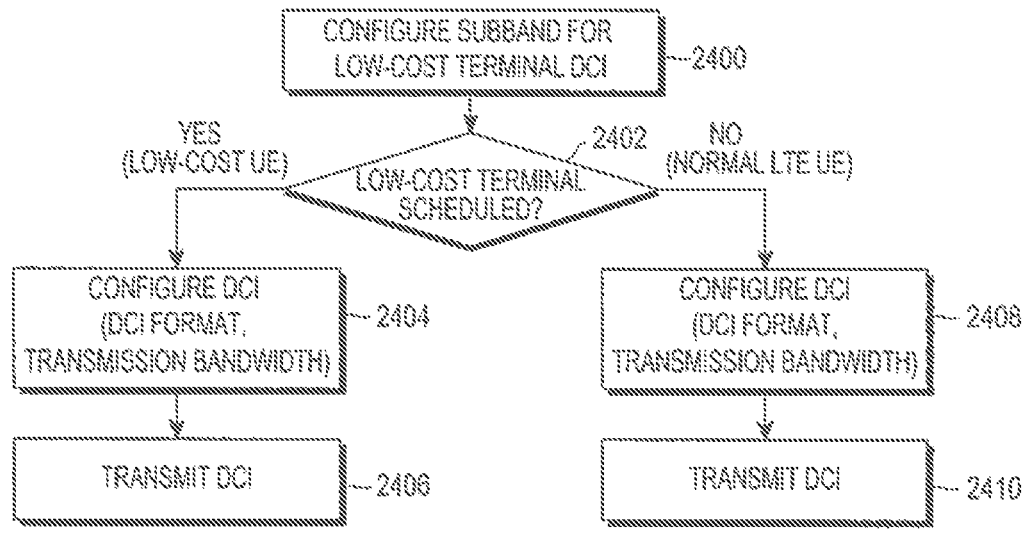
FIG. 24 is a view illustrating a scheduling procedure by a base station when a normal LTE terminal and a low-cost terminal co-exist in the same system according to an embodiment of the present disclosure.

FIG. 24 illustrates an example of a scheduling procedure by a base station when a normal LTE terminal and a low-cost terminal co-exist in the same system according to an embodiment of the present disclosure.

The procedure of base station described as an example in connection with FIG. 22 is described in connection with FIG. 24.

In step 2400, the base station configures a subband where the DCI of the low-cost terminal is mapped and transmitted in the system transmission bandwidth of the base station and informs the low-cost terminal of the subband. The subband control information such as the position of the configured may be known to the low-cost terminal through higher layer signaling, such as MIB, SIB, or RRC signaling. Further, the base station may individually provide the subband control information to the low-cost terminal through additional signaling.

In step 2402, when determining the scheduling for the terminal, the base station may determine whether the scheduling to be determined is for low-cost terminal or normal LTE terminal.

If the scheduling is for low-cost terminal, the base station configures DCI for low-cost terminal by referring to DCI format or transmission bandwidth in step 2404. In step 2406, the base station may map the configured DCI of the low-cost terminal to the time-frequency resources except the control channel region for the normal LTE terminal in the subband configured in step 2400 and transmit to the low-cost terminal. The base station may configure downlink data (PDSCH) for the low-cost terminal according to the scheduling information (i.e., the resource block allocation information) informed by the DCI and transmit the same.

If the scheduling is for normal LTE terminal, the base station configures DCI for the normal LTE terminal by referring to DCI format or transmission bandwidth in step 2408. In step 2410, the base station may transmit the configured DCI to the normal LTE terminal through PDCCH or EPDCCH which is a downlink control channel for normal LTE terminal. The base station may configure and transmit downlink data for the normal LTE terminal depending on the scheduling information known by the DCI. The PDCCH may be spread over the overall system transmission bandwidth 2202 during the control channel region 2208 shown in FIG. 22 and may be mapped without overlapping for each terminal and may then be transmitted.

Figure 25:
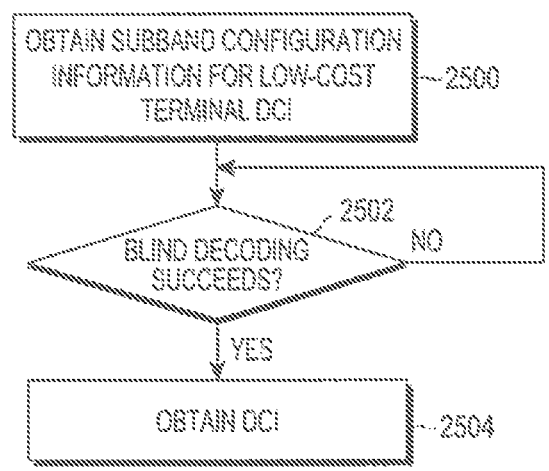
FIG. 25 is a view illustrating a procedure of obtaining DCI by a low-cost terminal operating according to an embodiment of the present disclosure.

FIG. 25 is a view illustrating a procedure of obtaining DCI by a low-cost terminal operating according to an embodiment of the present disclosure.

The procedure of the terminal exemplified in FIG. 22 is described in connection with FIG. 25.

In step 2500, the low-cost terminal obtains subband configuration information on the subband which is mapped with the DCI for low-cost terminal and transmitted from the base station and identifies the subband through which it should receive the DCI from the base station.

In step 2502, the low-cost terminal attempts to obtain DCI through blind decoding on the downlink control channel for low-cost terminal within the subband obtained in step 2500.

If the low-cost terminal succeeds in the blind decoding, the low-cost terminal obtains detailed control information configuring the DCI in step 2504. If the obtained control information is downlink scheduling information, the low-cost terminal may receive downlink data channel for low-cost terminal by the scheduling information indicated by the DCI. If the obtained control information is uplink scheduling information, the low-cost terminal may transmit uplink data channel for low-cost terminal by the scheduling information indicated by the DCI.

If the low-cost terminal fails in the blind decoding, it may perform operation 2502 at the next time of blind decoding.

Figure 26:
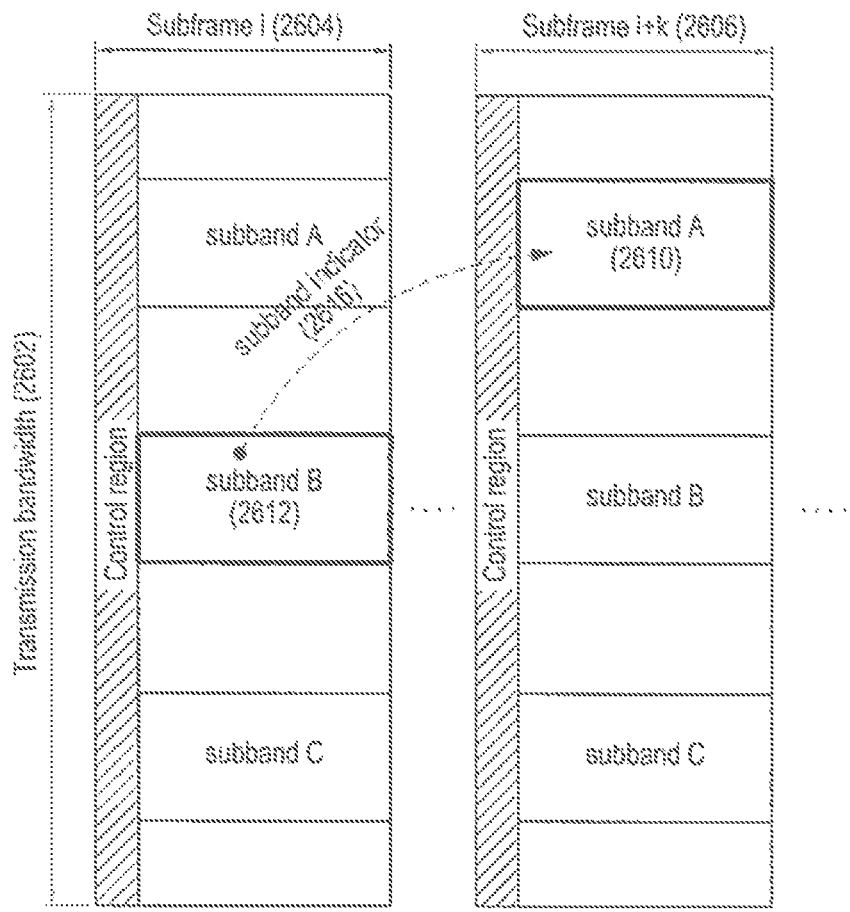
FIG. 26 is a concept view illustrating an example of previously configuring and dynamically varying a subband where a low-cost terminal operates in a system transmission bandwidth according to an embodiment of the present disclosure.

FIG. 26 is a concept view illustrating an example of previously configuring and dynamically varying a subband where a low-cost terminal operates in a system transmission bandwidth according to an embodiment of the present disclosure.

Described with reference to FIG. 26 is an exemplary method for previously configuring and operating subbands where the low-cost terminal operates in the system transmission bandwidth while dynamically changing the subbands where the low-cost terminal operates.

The size of subband where the low-cost terminal operates cannot be larger than the system transmission bandwidth 2602, and is generally assumed as the minimum transmission bandwidth supported by the LTE system, i.e., 1.4 MHz (six consecutive PRBs). The base station may simultaneously serve a number of low-cost terminals by configuring/operating a plurality of subbands. FIG. 26 illustrates an example in which three subbands A, B, and C 1010, 1012, and 1014 are configured in the system transmission bandwidth 2602. The low-cost terminal may perform data or control signal communication operation through one subband of the subbands at some moment.

In this embodiment, the base station may designate one of the subbands, maps it with DCI for low-cost terminal and transmits, and dynamically indicate the subband mapped with the data for low-cost terminal by including a subband indicator 2616 in the DCI. The 'subband indicator' may be included in, e.g., the resource block assignment information included in the DCI. The subband mapped with the DCI may be previously known to the low-cost terminal by the base station, leading to reduced complexity of DCI decoding of low-cost terminal. The 'subband indicator' 2616 is information indicating the subband where the data of the low-cost terminal is mapped and transmitted among the subbands configured for use by the low-cost terminal. The subband indicator may also be called a 'subband index,' 'narrowband indicator,' or 'narrowband index.' The 'subband indicator' 2616 may also be configured in various methods as follows.

Method 1. adding to existing DCI as additional control information.

Method 2. switching some control information of existing DCI into 'subband indicator.' For example, the carrier indicator field (CIF) defined for carrier aggregation (CA) may be switched and used as a subband indicator for low-cost terminal. (this is why the CA does not apply to low-cost terminals.)

Method 3. combining 'subband indicators' for several terminals to configure group control information. In this case, unlike in methods 1 and 2, DCI for scheduling is required separately from the 'subband indicator.'

The information on the frequency domain 2612 where the 'subband indicator' is mapped and transmitted is previously designated and known to the low-cost terminal by the base station. Referring to FIG. 26, the base station maps and transmits the 'subframe indicator' for the low-cost terminal in subframe B 2612 of subframe i 2604 and maps and transmits the downlink data for the low-cost terminal in subband A 2610 of subframe i+k 2606 (k>0). k is determined considering the time taken for the low-cost terminal to change frequencies, and it may be a fixed value or may be known to the terminal by the base station through separate signaling. In case k=0, that is, in case the 'subband indicator' and downlink data are mapped and transmitted in the same subframe, the subband where the subband indicator is delivered is the same as the subband where the downlink data is delivered. After completing the reception of downlink data, the low-cost terminal may take the following approaches.

Method A. The low-cost terminal goes back to the subband where the 'subband indicator' is mapped and transmitted (i.e., changes frequencies) to attempt to detect a next 'subband indicator.'

Method B. The low-cost terminal, without changing subbands, prepares to receive next downlink data or transmit uplink data within the subband indicated by the 'subband indicator.'

Regardless of method A or B, the low-cost terminal may obtain time-frequency sync or change frequency into the center frequency of the system transmission bandwidth to obtain MIB to detect PSS/SSS and decode PBCH.

Although the low-cost terminal communicates data and control signals within a relatively small bandwidth relative to the system transmission bandwidth, it may obtain system transmission bandwidth information and information on the number of CRS antenna ports for exact RE mapping of transmitted/received signals.

The scheduling procedure of the base station according to FIG. 26 may be described with reference to FIG. 20. However, according to the embodiment shown in FIG. 26, upon configuring DCI for low-cost terminal in step 2004 of FIG. 20, an additional subband indicator may be configured by method 1 or method 2 or separate group control information obtained by combining subband indicators for several terminals may be configured by method 3.

The procedure of obtaining the DCI by the low-cost terminal according to FIG. 26 may be described with reference to FIG. 21. However, according to the embodiment shown in FIG. 26, in step 2102 or previous steps of FIG. 21, the low-cost terminal may additionally perform the procedure of receiving the 'subband indicator.'

Figure 27:
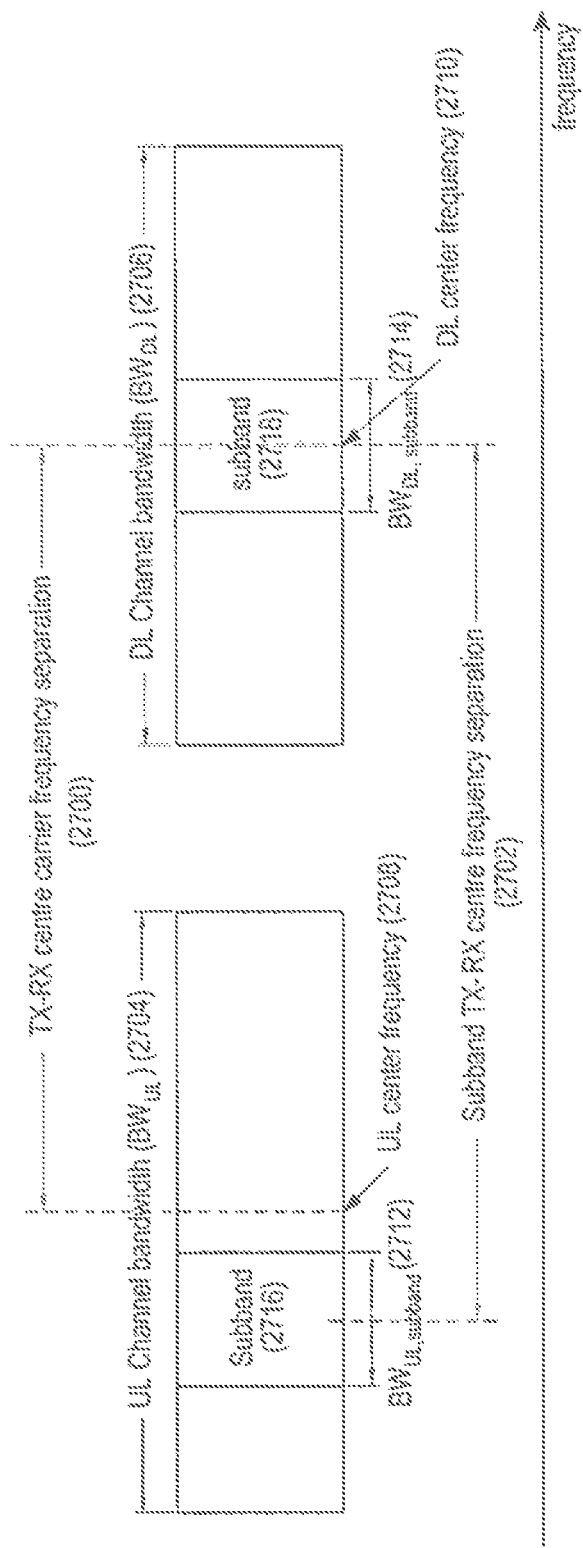
FIG. 27 is a concept view illustrating an example of a method for indicating a subband in an FDD system according to an embodiment of the present disclosure.

FIG. 27 is a concept view illustrating an example of a method for indicating a subband in an FDD system according to an embodiment of the present disclosure.

In the frequency division duplex (FDD) system where uplink and downlink are separately operated in the frequency domain, the interval in center frequency between uplink frequency and downlink frequency (TX-RX carrier centre frequency separation) is defined for each frequency band where LTE system operates. Described with respect to FIG. 27 is described, as an example, a scheme of utilizing the center frequency interval (subband Tx-Rx centre frequency separation) between uplink subband and downlink subband in case the uplink subband and downlink subband of the low-cost terminal are each operated within each of uplink and downlink transmission bandwidths.

FIG. 27 illustrates the interval between uplink center frequency (UL center frequency) 2708 and downlink center frequency (DL center frequency) 2710, i.e., 'TX-RX carrier centre frequency separation' 2700 between the uplink frequency and the downlink frequency, uplink bandwidth ($BW_{UL}$) 2704, downlink bandwidth ($BW_{DL}$) 2706, low-cost terminal's uplink subband bandwidth ($BW_{UL,subband}$) 2712, low-cost terminal's downlink subband bandwidth ($BW_{DL,subband}$) 2714, interval in center frequency between uplink subband and downlink subband ('subband Tx-Rx centre frequency separation') 2702.

'TX-RX carrier centre frequency separation' 2700 and 'subband Tx-Rx centre frequency separation' 2702 may have different values. Since the uplink subband 2716 and downlink subband 2718 of the low-cost terminal may be positioned in the uplink bandwidth 2704 and the downlink bandwidth 2706, respectively, the interval in center frequency between the uplink subband and downlink subband (subband Tx-Rx centre frequency separation) meets the relation determined by the following Equation 1.

$$\text{'TX-RX carrier centre frequency separation'} - (BW_{UL}/2 - BW_{UL,subband}/2) - (BW_{DL}/2 - BW_{DL,subband}/2) \leq \text{'subband Tx-Rx centre frequency separation'} \leq \text{'TX-RX carrier centre frequency separation'} + (BW_{UL}/2 - BW_{UL,subband}/2) + (BW_{DL}/2 - BW_{DL,subband}/2)$$

[Equation 1]

Accordingly, the base station may apply the following methods to inform the low-cost terminal of the position of downlink subband and uplink subband.

Method 1. The base station informs each of the low-cost terminal of the position of downlink subband and uplink subband through signaling.

Method 2. The base station informs each of the low-cost terminal of the position of downlink subband and interval in center frequency between the uplink subband and the downlink subband (subband Tx-Rx centre frequency separation) through signaling. In such case, the terminal may calculate the position of the uplink subband from the signaling value.

Method 3. The base station informs each of the low-cost terminal of the position of uplink subband and interval in center frequency between the uplink subband and the downlink subband ('subband Tx-Rx centre frequency separation') through signaling. In such case, the terminal may calculate the position of the downlink subband from the signaling value.

In a variation to the example shown in FIG. 27, the number of uplink subbands and the number of downlink subbands may be set to be different depending on asymmetry in traffic volume between uplink and downlink.

Figure 28:
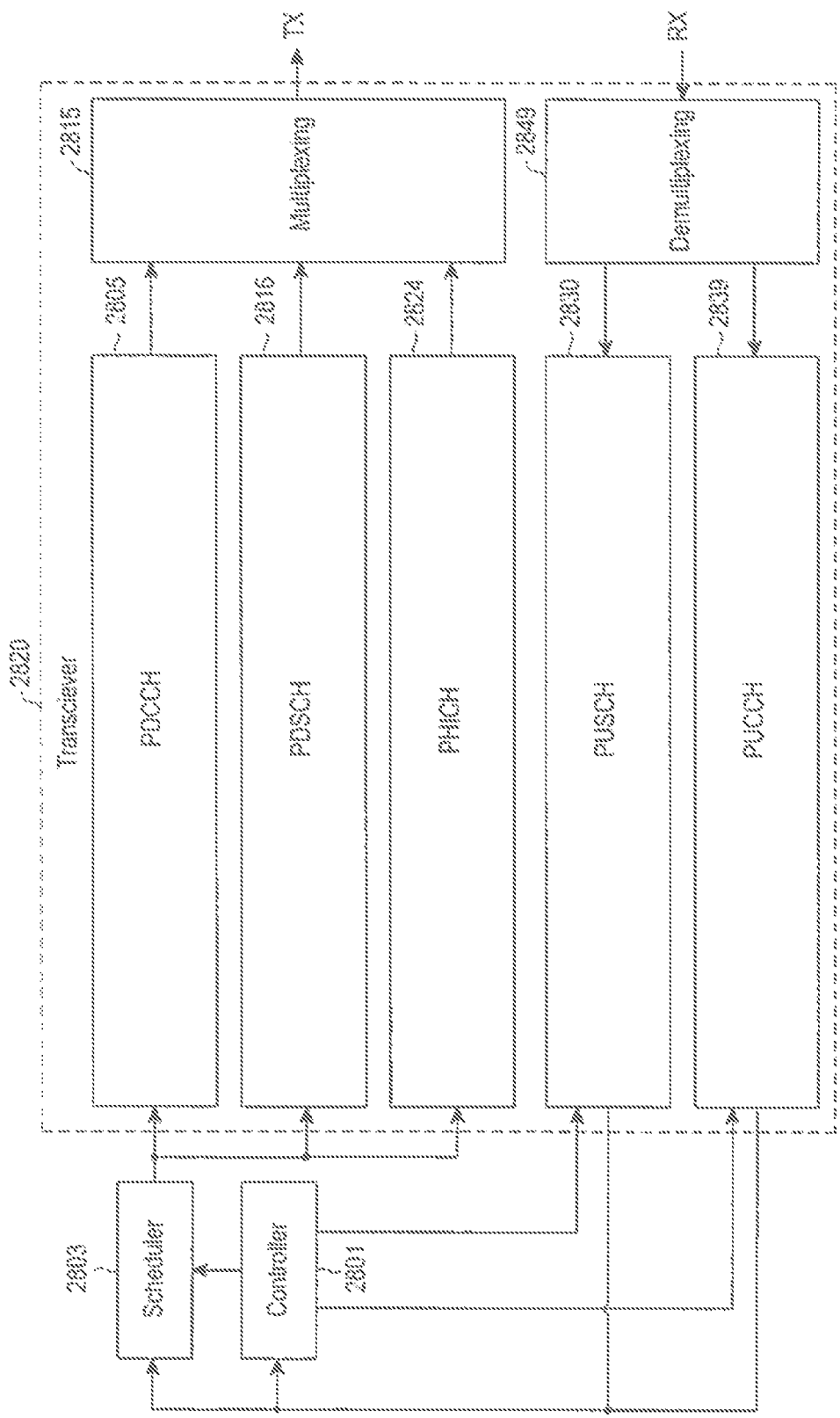
FIG. 28 is a view illustrating an exemplary configuration of a base station for implementing an embodiment of the present disclosure.

FIG. 28 is a view illustrating an exemplary configuration of a base station for implementing an embodiment of the present disclosure.

Here, the base station may be an LTE base station or an LAA base station. According to the present disclosure, the base station may include a controller 2801 and a transceiver 2820.

The transceiver 2820 may include a transmitter including at least one of a PDCCH block 2805, a PDSCH block 2816, a PHICH block 2824, and a multiplexer 2815 and a receiver including at least one of a PUSCH block 2830, a PUCCH block 2839, and a demultiplexer 2849.

The controller 2801 may perform repetitive transmission and DL/UL HARQ timing control according to FIGS. 2 to 14 of the present disclosure. Further, the controller 2801 may perform the cell grouping and channel information mapping control, resource allocation for periodic channel information transmission and transmission of higher layer signals according to FIGS. 15 to 17 of the present disclosure. Further, the controller 2801 may perform the DCI transmission and subband allocation of the low-cost terminal according to FIGS. 18 to 27 of the present disclosure depending on the type of the terminal.

The base station may further include at least one of a scheduler 2803, a DCI composer, a storage unit, and an antenna. The scheduler may perform the control of DL/UL HARQ timing. The DCI composer may configure DCI as described in connection with the above embodiments of the present disclosure depending on the type of terminal to be scheduled by the base station.

Here, the repetitive transmission follows the methods described above according to the present disclosure, the DL HARQ timing means the PDSCH transmission timing for the downlink scheduling repetitive transmission and the PUCCH transmission timing for the PDSCH repetitive transmission, and the UL HARQ timing includes the PUSCH transmission timing for the uplink scheduling information repetitive transmission and the UL grant/PHICH transmission timing for the PUSCH repetitive transmission.

The controller 2801 may adjust timing relations between physical channels for the terminal, which the controller 2801 is to schedule, by referencing, e.g., the volume of data to be transmitted to the terminal and the amount of resources available in the system and control the scheduler 2803, the PDCCH block 2805, the PDSCH block 2816, the PHICH block 2824, the PUSCH block 2830, and the PUCCH block 2839. The control of the repetitive transmission and UL HARQ timing follows the methods described in connection with specific embodiments of the present disclosure.

The PDCCH block 2805 may configure control information under the control of the scheduler 2803 to perform repetitive transmission as described above in connection with specific embodiments of the present disclosure, and the control information may be multiplexed with other signals by the multiplexer 2815.

The PDSCH block 2816 may generate data under the control of the scheduler 2803. The data, together with other signals, may be multiplexed by the demultiplexer 2815.

The PHICH block 2824 may generate the HARQ ACK/NACK for PUSCH received from the UE under the control of the scheduler 2803 with the HARQ-ACK for PUSCH repetitive transmission to perform repetitive transmission as described above in connection with specific embodiments of the present disclosure. The HARQ ACK/NACK together with other signals may be multiplexed by the multiplexer 2815.

The multiplexed signals are generated into OFDM signals that are then transmitted to the UE.

The PUSCH block 2830 may obtain PUSCH data for signals received from the UE by repetitive transmission as described above in connection with specific embodiments of the present disclosure. Whether there is an error in the result of decoding the PUSCH data may be notified to the scheduler 2803 to adjust downlink HARQ ACK/NACK generation and is applied to the controller 2801 to allow the HARQ ACK/NACK transmission timing to be adjusted.

The PUCCH block 2830 obtains uplink ACK/NACK or CQI from the signal received from the UE through the HARQ-ACK payload size and PUCCH format or signal received from the UE based on the PUCCH transmission timing as described above in connection with specific embodiments of the present disclosure. The obtained uplink ACK/NACK or CQI is applied to the scheduler 2803 and is used to determine whether to re-transmit the PDSCH and a modulation and coding scheme (MCS). The obtained uplink ACK/NACK may be applied to the controller 2801 to adjust the transmission timing of PDSCH.

Figure 29:
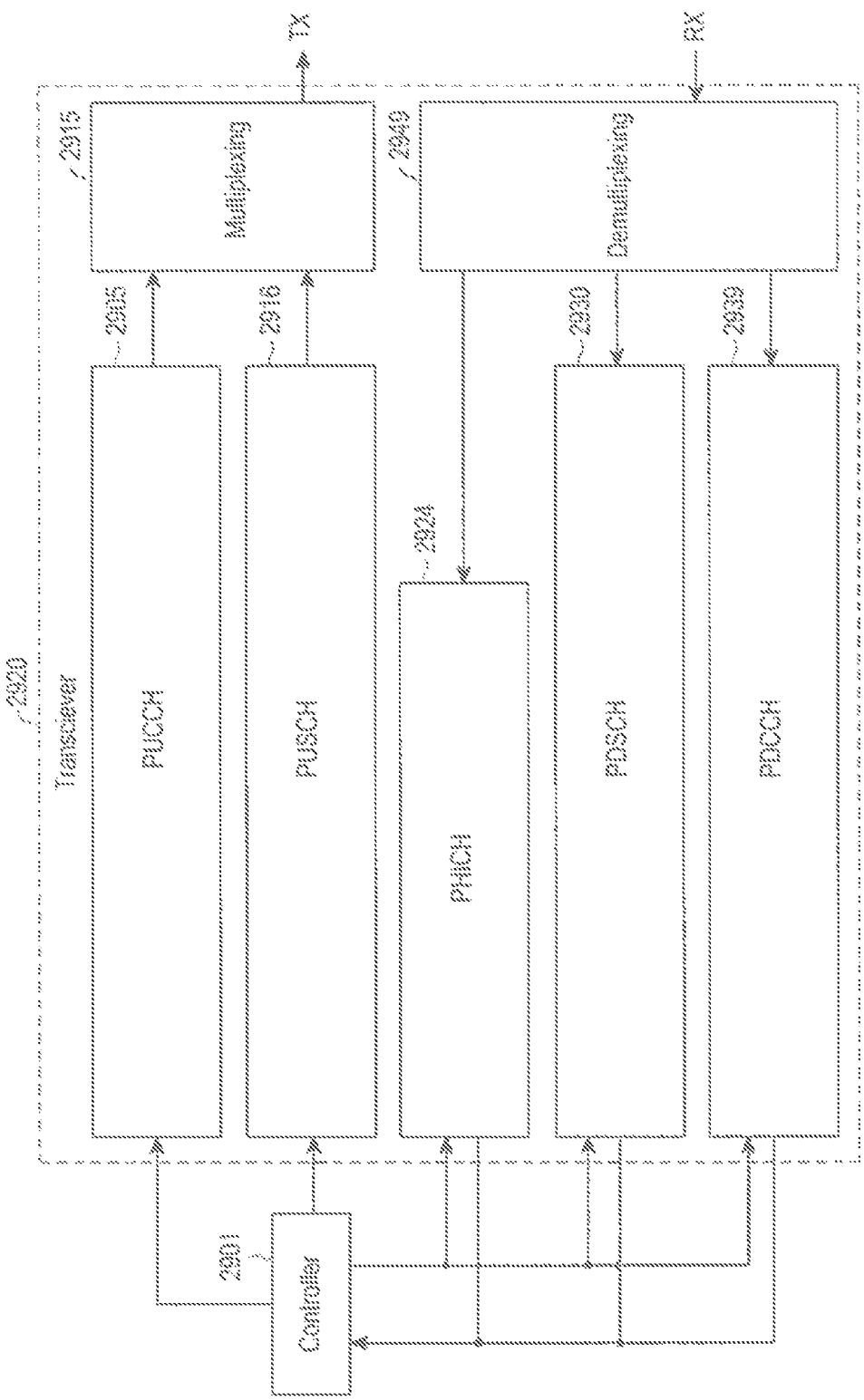
FIG. 29 is a view illustrating an exemplary configuration of a terminal for implementing an embodiment of the present disclosure.

FIG. 29 is a view illustrating an exemplary configuration of a terminal for implementing an embodiment of the present disclosure.

According to the present disclosure, the terminal may include a controller 2901 and a transceiver 2920.

The transceiver 2920 may include a transmitter including at least one of a PUCCH block 2905, a PUSCH block 2916, and a multiplexer 2915 and a receiver including at least one of a PHICH block 2924, a PDSCH block 2930, a PDCCH block 2939, and a demultiplexer 2949.

The controller 2901 may perform repetitive transmission according to FIGS. 2 to 14 of the present disclosure. Further, the controller 2901 may control the cell grouping and channel information mapping according to FIGS. 15 to 17 of the present disclosure and may perform a periodic channel information transmission operation. Further, the controller 2901 may perform the operations of obtaining the DCI of the low-cost terminal and communication through a subband according to FIGS. 18 to 27 of the present disclosure.

The terminal may further include at least one of a storage unit and an antenna.

According to the present disclosure, the controller 2901 controlling repetitive transmission and DL/UL HARQ timing may control the PDSCH block 2930, PDCCH block 2939, PUCCH block 2905, and PUSCH block 2916 according to repetitive transmission and UL HARQ timing. Here, the repetitive transmission follows the methods described above according to the present disclosure, the DL HARQ timing means the PDSCH transmission timing for the downlink scheduling repetitive transmission and the PUCCH transmission timing for the PDSCH repetitive transmission, and the UL HARQ timing means the PUSCH transmission timing for the uplink scheduling information repetitive transmission and the UL grant/PHICH transmission timing for the PUSCH repetitive transmission.

The PUCCH block 2905 configures HARQ ACK/NACK or CQI with the uplink control information (UCI) under the control of the controller 2901 controlling the storing of downlink data in a soft buffer for repetitive transmission according to an embodiment of the present disclosure, and the HARQ ACK/NACK or CQI is multiplexed with other signals by the multiplexer 2915 and transmitted to the base station.

The PUSCH block 2916 may extract the data to transmit through repetitive transmission according to an embodiment of the present disclosure, and the extracted data may be multiplexed with other signals by the multiplexer 2915. The multiplexed signals may be generated into single carrier frequency division multiple access (SC-FDMA) signals that may then be transmitted to the base station considering UL HARQ timing.

The PHICH block 2924 in the receiver separates, through the demultiplexer 2949, the PHICH signal from the signals received as per repetitive transmission and UL HARQ timing from the base station according to the present disclosure and then obtains whether to HARQ ACK/NACK for the PUSCH.

For the repetitive transmission according to an embodiment of the present disclosure, the PDSCH block 2930 separates the PDSCH signal through the demultiplexer 2949 for the signal received from the base station and then obtains PDSCH data, notifies the PUCCH block 2905 whether there is an error in the result of decoding the data to adjust generation of the uplink HARQ ACK/NACK, and applies whether there is an error in the decoding result to the controller 2901 to allow timing to be adjusted upon transmission of the uplink HARQ ACK/NACK.

The PDCCH block 2939 may separate the PDCCH signal through the demultiplexer 2949 and then decode the DCI format to obtain the DCI from the decoded signal.

It should be noted that the configuration of subframe, system configuration, and examples of control methods as shown in FIGS. 2 to 29 are not intended as limiting the scope of the present disclosure. In other words, all the components or operational steps illustrated in FIGS. 2 to 29 should not be construed as essential components to practice the present disclosure, and the present disclosure may be rather implemented with only some of the components without departing from the gist of the present disclosure.

The above-described operations may be realized by equipping a memory device retaining their corresponding codes in an entity, function, base station, or any component of a terminal in a communication system. That is, the controller in the entity, the function, the base station, or the terminal may execute the above-described operations by reading and executing the program codes stored in the memory device by a processor or central processing unit (CPU).

As described herein, various components or modules in the entity, function, eNB, or UE may be operated using a hardware circuit, e.g., a complementary metal oxide semiconductor-based logic circuit, firmware, software, and/or using a hardware circuit such as a combination of hardware, firmware, and/or software embedded in a machine-readable medium. As an example, various electric structures and methods may be executed using electric circuits such as transistors, logic gates, or ASICs.

Although specific embodiments of the present disclosure have been described above, various changes may be made thereto without departing from the scope of the present disclosure. Thus, the scope of the present disclosure should not be limited to the above-described embodiments, and should rather be defined by the following claims and equivalents thereof.

What is claimed is:

1. A method for performing repetitive transmission of information by a base station in a communication system operating in a time division duplex (TDD) based cell, the method comprising:
   transmitting a physical downlink control channel (PDCCH) on a first plurality of downlink subframes; and
   repeatedly receiving a physical uplink shared channel (PUSCH) corresponding to the PDCCH from a terminal on a plurality of uplink subframes,
   wherein transmission timing of the PUSCH is identified based on an uplink-downlink configuration of the TDD based cell, and
   wherein, in a case that a last subframe of the PDCCH does not have a corresponding uplink subframe based on the uplink-downlink configuration of the TDD based cell, transmission timing of a starting subframe of the PUSCH is adjusted to an uplink subframe which corresponds to a first downlink subframe after the last subframe of the PDCCH.

2. The method of claim 1, further comprising:
   repeatedly transmitting an HARQ-acknowledge (HARQ-ACK) corresponding to the PUSCH on a second plurality of downlink subframes,
   wherein transmission timing of the HARQ-ACK is identified based on the uplink-downlink configuration of the TDD based cell.

3. The method of claim 1, wherein the transmission timing of the PUSCH is identified based on following table:

| TDD UL/DL- Configuration | DL subframe number n | | | | | | | | | |
|---|---|---|---|---|---|---|---|---|---|---|
| | 0 | 1 | 2 | 3 | 4 | 5 | 6 | 7 | 8 | 9 |
| 0 |   | 4 | 6 |   |   |   | 4 | 6 |   |   |
| 1 |   |   | 6 |   | 4 |   |   | 6 |   | 4 |
| 2 |   |   |   | 4 |   |   |   |   | 4 |   |
| 3 | 4 |   |   |   |   |   |   |   | 4 | 4 |
| 4 |   |   |   |   |   |   |   |   | 4 | 4 |
| 5 |   |   |   |   |   |   |   |   | 4 |   |
| 6 | 7 | 7 |   |   |   | 7 | 7 |   |   | 5. |

4. The method of claim 1, wherein the PDCCH is repeatedly transmitted on the first plurality of downlink subframes.

5. The method of claim 1, wherein the first downlink subframe after the last subframe of the PDCCH is determined as an earliest subsequent downlink subframe having the corresponding uplink subframe based on the identified transmission timing of the PUSCH.

6. A method for performing repetitive transmission of information by a terminal in a communication system operating in a time division duplex (TDD) based cell, the method comprising:
   detecting a physical downlink control channel (PDCCH) on a first plurality of downlink subframes; and
   repeatedly transmitting a physical uplink shared channel (PUSCH) corresponding to the PDCCH to a base station on a plurality of uplink subframes,
   wherein transmission timing of the PUSCH is identified based on an uplink-downlink configuration of the TDD based cell, and
   wherein in a case that a last subframe of the PDCCH does not have a corresponding uplink subframe based on the uplink-downlink configuration of the TDD based cell, transmission timing of a starting subframe of the PUSCH is adjusted to an uplink subframe which corresponds to a first downlink subframe after the last subframe of the PDCCH.

7. The method of claim 6, further comprising:
   repeatedly receiving an HARQ-acknowledge (HARQ-ACK) corresponding to the PUSCH in a second plurality of downlink subframes,
   wherein transmission timing of the HARQ-ACK is identified based on the uplink-downlink configuration of the TDD based cell.

8. The method of claim 6, wherein the transmission timing of the PUSCH is identified based on following table:

| TDD UL/DL- Configuration | DL subframe number n | | | | | | | | | |
|---|---|---|---|---|---|---|---|---|---|---|
| | 0 | 1 | 2 | 3 | 4 | 5 | 6 | 7 | 8 | 9 |
| 0 |   | 4 | 6 |   |   |   | 4 | 6 |   |   |
| 1 |   |   | 6 |   | 4 |   |   | 6 |   | 4 |
| 2 |   |   |   | 4 |   |   |   |   | 4 |   |
| 3 | 4 |   |   |   |   |   |   |   | 4 | 4 |
| 4 |   |   |   |   |   |   |   |   | 4 | 4 |
| 5 |   |   |   |   |   |   |   |   | 4 |   |
| 6 | 7 | 7 |   |   |   | 7 | 7 |   |   | 5. |

9. The method of claim 6, wherein the PDCCH is repeatedly transmitted from the base station on the first plurality of downlink subframes.

10. The method of claim 6, wherein the first downlink subframe after the last subframe of the PDCCH is determined as an earliest subsequent downlink subframe having the corresponding uplink subframe based on the identified transmission timing of the PUSCH.

11. A base station in a communication system operating in a time division duplex (TDD) based cell, the base station comprising:
   a controller controlling an operation of transmitting a physical downlink control channel (PDCCH) on a first plurality of downlink subframes and controlling an operation of repeatedly receiving a physical uplink shared channel (PUSCH) corresponding to the PDCCH from a terminal on a plurality of uplink subframes; and
   a transceiver transmitting and receiving data under the control of the controller,
   wherein transmission timing of the PUSCH is identified based on an uplink-downlink configuration of the TDD based cell, and
   wherein in a case that a last subframe of the PDCCH does not have a corresponding uplink subframe based on the uplink-downlink configuration of the TDD based cell, transmission timing of a starting subframe of the PUSCH is adjusted to an uplink subframe which corresponds to a first downlink subframe after the last subframe of the PDCCH.

12. The base station of claim 11, wherein the transmission timing of the PUSCH is identified based on following table:

| TDD UL/DL- Configuration | DL subframe number n | | | | | | | | | |
|---|---|---|---|---|---|---|---|---|---|---|
| | 0 | 1 | 2 | 3 | 4 | 5 | 6 | 7 | 8 | 9 |
| 0 |   | 4 | 6 |   |   |   | 4 | 6 |   |   |
| 1 |   |   | 6 |   | 4 |   |   | 6 |   | 4 |

-continued

| TDD UL/DL- Configuration | DL subframe number n | | | | | | | | | |
|---|---|---|---|---|---|---|---|---|---|---|
| | 0 | 1 | 2 | 3 | 4 | 5 | 6 | 7 | 8 | 9 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5. |

13. The base station of claim 11, wherein the PDCCH is repeatedly transmitted on the first plurality of downlink subframes.

14. The base station of claim 11, wherein the controller is configured to control an operation of repeatedly transmitting an HARQ-acknowledge (HARQ-ACK) corresponding to the PUSCH on a second plurality of downlink subframes,
wherein transmission timing of the HARQ-ACK is identified based on the uplink-downlink configuration of the TDD based cell.

15. The base station of claim 11, wherein the first downlink subframe after the last subframe of the PDCCH is determined as an earliest subsequent downlink subframe having the corresponding uplink subframe based on the identified transmission timing of the PUSCH.

16. A terminal in a communication system operating in a time division duplex (TDD) based cell, the terminal comprising:
a controller controlling an operation of detecting a physical downlink control channel (PDCCH) on a first plurality of downlink subframes and controlling an operation of repeatedly transmitting a physical uplink shared channel (PUSCH) corresponding to the PDCCH to a base station a plurality of on uplink subframes; and
a transceiver receiving and transmitting data under the control of the controller,
wherein transmission timing of the PUSCH is identified based on an uplink-downlink configuration of the TDD based cell, and
wherein in a case that a last subframe of the PDCCH does not have a corresponding uplink subframe based on the uplink-downlink configuration of the TDD based cell, transmission timing of a starting subframe of the PUSCH is adjusted to an uplink subframe which corresponds to a first downlink subframe after the last subframe of the PDCCH.

17. The terminal of claim 16, wherein the transmission timing of the PUSCH is identified based on following table:

| TDD UL/DL- Configuration | DL subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5. |

18. The terminal of claim 16, wherein the PDCCH is repeatedly transmitted from the base station on the first plurality of downlink subframes.

19. The terminal of claim 16, wherein the controller is configured to control an operation of repeatedly receiving an HARQ-acknowledge (HARQ-ACK) corresponding to the PUSCH on a second plurality of downlink subframes,
wherein transmission timing of the HARQ-ACK is identified based on the uplink-downlink configuration of the TDD based cell.

20. The terminal of claim 16, wherein the first downlink subframe after the last subframe of the PDCCH is determined as an earliest subsequent downlink subframe having the corresponding uplink subframe based on the identified transmission timing of the PUSCH.

* * * * *